United States Patent
Chamieh et al.

(10) Patent No.: US 10,083,013 B2
(45) Date of Patent: *Sep. 25, 2018

(54) PRODUCER GRAPH ORIENTED PROGRAMMING AND EXECUTION

(71) Applicant: MUREX S.A.S., Paris (FR)

(72) Inventors: Fady Chamieh, Paris (FR); Elias Edde, Paris (FR)

(73) Assignee: MUREX S.A.S., Paris (FR)

(*) Notice: Subject to any disclaimer, the term of this patent is extended or adjusted under 35 U.S.C. 154(b) by 63 days.

This patent is subject to a terminal disclaimer.

(21) Appl. No.: 14/160,271

(22) Filed: Jan. 21, 2014

(65) Prior Publication Data

US 2014/0137086 A1    May 15, 2014

Related U.S. Application Data

(63) Continuation of application No. 13/455,756, filed on Apr. 25, 2012, now Pat. No. 8,645,929, which is a
(Continued)

(51) Int. Cl.
*G06F 8/30* (2018.01)
*G06F 8/41* (2018.01)
(Continued)

(52) U.S. Cl.
CPC ............. *G06F 8/315* (2013.01); *G06F 8/30* (2013.01); *G06F 8/41* (2013.01); *G06F 9/4488* (2018.02);
(Continued)

(58) Field of Classification Search
CPC .. G06F 9/45508; G06F 9/4428; G06F 9/4436; G06F 8/41; G06F 8/315;
(Continued)

(56) References Cited

U.S. PATENT DOCUMENTS

| | | | |
|---|---|---|---|
| 4,558,413 A | 12/1985 | Schmidt et al. | |
| 5,133,063 A | 7/1992 | Naito et al. | |

(Continued)

FOREIGN PATENT DOCUMENTS

| | | | |
|---|---|---|---|
| BR | PI0719730 A2 | 3/2014 | |
| CN | 101589366 B | 11/2013 | |

(Continued)

OTHER PUBLICATIONS

"A Typesafe Enum Facility for the Java Progamming Language: Proposed Final Draft," Jul. 12, 2004, 6 pages, Sun Microsystems, Inc., Palo Alto, California.
(Continued)

*Primary Examiner* — Jacob D Dascomb
(74) *Attorney, Agent, or Firm* — Nicholson De Vos Webster & Elliott, LLP

(57) ABSTRACT

A method and apparatus for producer graph oriented programming and execution. According to one aspect of the invention, a runtime is provided that interprets producer dependency declarations for methods. The producer dependency declarations identify at run time a set of zero or more producers, where a producer is a runtime instantiatable construct that includes at least an instance and a method associated with that instance. The runtime automatically generates and executes, responsive to receiving a designation of a producer of interest whose method has a producer dependency declaration, a producer graph. The producer graph initially includes the producer of interest and is generated, from the producer of interest to source producers, through instantiation of producers based on the producer dependency declarations of the methods of the producers already in the producer graph. The runtime sequences the execution of the producers in the producer graph as indicated by the producer graph.

30 Claims, 41 Drawing Sheets

Related U.S. Application Data continuation of application No. 11/633,098, filed on Dec. 1, 2006, now Pat. No. 8,191,052.

(51) Int. Cl.
*G06F 9/455* (2018.01)
*G06F 9/448* (2018.01)

(52) U.S. Cl.
CPC ........ *G06F 9/4494* (2018.02); *G06F 9/45508* (2013.01)

(58) Field of Classification Search
CPC .......... G06F 8/24; G06F 8/316; G06F 9/4494; G06F 9/4488; G06F 8/30
See application file for complete search history.

(56) References Cited

U.S. PATENT DOCUMENTS

| | | |
|---|---|---|
| 5,155,836 A | 10/1992 | Jordan et al. |
| 5,313,387 A | 5/1994 | McKeeman et al. |
| 5,371,851 A | 12/1994 | Pieper et al. |
| 5,410,696 A | 4/1995 | Seki et al. |
| 5,481,740 A | 1/1996 | Kodosky |
| 5,481,741 A | 1/1996 | McKaskle et al. |
| 5,490,246 A | 2/1996 | Brotsky et al. |
| 5,497,500 A | 3/1996 | Rogers et al. |
| 5,504,917 A | 4/1996 | Austin |
| 5,524,205 A | 6/1996 | Lomet et al. |
| 5,652,909 A | 7/1997 | Kodosky |
| 5,659,747 A | 8/1997 | Nakajima |
| 5,758,160 A | 5/1998 | McInerney et al. |
| 5,819,293 A | 10/1998 | Comer et al. |
| 5,822,593 A | 10/1998 | Lamping et al. |
| 5,838,976 A | 11/1998 | Summers |
| 5,883,623 A | 3/1999 | Cseri et al. |
| 5,893,123 A | 4/1999 | Tuinenga et al. |
| 5,966,072 A | 10/1999 | Stanfill et al. |
| 5,978,830 A | 11/1999 | Nakaya et al. |
| 5,990,906 A | 11/1999 | Hudson et al. |
| 6,003,037 A | 12/1999 | Kassabgi et al. |
| 6,026,235 A | 2/2000 | Shaughnessy et al. |
| 6,067,415 A | 5/2000 | Uchihira |
| 6,111,575 A | 8/2000 | Martinez et al. |
| 6,145,121 A | 11/2000 | Levy et al. |
| 6,223,171 B1 | 4/2001 | Chaudhuri et al. |
| 6,233,733 B1 | 5/2001 | Ghosh |
| 6,385,770 B1 | 5/2002 | Sinander |
| 6,407,753 B1 | 6/2002 | Budinsky et al. |
| 6,427,234 B1 | 7/2002 | Chambers et al. |
| 6,493,868 B1 | 12/2002 | Dasilva et al. |
| 6,571,388 B1 | 5/2003 | Venkatraman et al. |
| 6,618,851 B1 | 9/2003 | Zundel et al. |
| 6,665,866 B1 | 12/2003 | Kwiatkowski et al. |
| 6,763,515 B1 | 7/2004 | Vazquez et al. |
| 6,826,523 B1 | 11/2004 | Guy et al. |
| 6,826,752 B1 | 11/2004 | Thornley et al. |
| 6,889,227 B1 | 5/2005 | Hamilton et al. |
| 6,934,668 B2* | 8/2005 | Kodosky ............. G06F 8/34 702/57 |
| 6,957,191 B1 | 10/2005 | Belcsak et al. |
| 6,959,429 B1 | 10/2005 | Hatcher et al. |
| 6,966,013 B2 | 11/2005 | Blum et al. |
| 6,995,765 B2 | 2/2006 | Boudier |
| 7,017,084 B2 | 3/2006 | Ng et al. |
| 7,039,923 B2 | 5/2006 | Kumar et al. |
| 7,055,130 B2* | 5/2006 | Charisius ............. G06F 8/20 717/108 |
| 7,096,458 B2 | 8/2006 | Bates et al. |
| 7,143,392 B2 | 11/2006 | Ii et al. |
| 7,200,838 B2 | 4/2007 | Kodosky et al. |
| 7,203,743 B2 | 4/2007 | Shah-Heydari |
| 7,299,450 B2 | 11/2007 | Livshits et al. |
| 7,367,015 B2 | 4/2008 | Evans et al. |
| 7,376,758 B2* | 5/2008 | Bonwick ............. G06F 3/0611 710/5 |
| 7,539,992 B2* | 5/2009 | Takemura ........... G06F 8/10 703/21 |
| 7,831,956 B2 | 11/2010 | Kimmerly |
| 7,865,872 B2 | 1/2011 | Chamieh et al. |
| 7,917,898 B2 | 3/2011 | Zhao et al. |
| 8,191,052 B2 | 5/2012 | Chamieh et al. |
| 8,307,337 B2 | 11/2012 | Chamieh et al. |
| 8,332,827 B2 | 12/2012 | Edde et al. |
| 8,607,207 B2 | 12/2013 | Chamieh et al. |
| 8,645,929 B2 | 2/2014 | Chamieh et al. |
| 9,201,766 B2 | 12/2015 | Edde et al. |
| 9,424,050 B2 | 8/2016 | Chamieh et al. |
| 2001/0001882 A1 | 5/2001 | Hamilton et al. |
| 2002/0072890 A1 | 6/2002 | Crouse, II et al. |
| 2002/0184401 A1 | 12/2002 | Kadel et al. |
| 2002/0188616 A1 | 12/2002 | Chinnici et al. |
| 2003/0014464 A1 | 1/2003 | Deverill et al. |
| 2003/0033132 A1 | 2/2003 | Algieri et al. |
| 2003/0084063 A1 | 5/2003 | DelMonaco et al. |
| 2003/0084425 A1 | 5/2003 | Glaser |
| 2003/0106040 A1 | 6/2003 | Rubin et al. |
| 2003/0145125 A1 | 7/2003 | Horikawa |
| 2004/0073892 A1 | 4/2004 | Fallah et al. |
| 2004/0143819 A1 | 7/2004 | Cheng et al. |
| 2004/0154008 A1 | 8/2004 | Bak et al. |
| 2004/0172626 A1 | 9/2004 | Jalan et al. |
| 2004/0205524 A1 | 10/2004 | Richter et al. |
| 2004/0221262 A1 | 11/2004 | Hampapuram et al. |
| 2004/0230770 A1 | 11/2004 | Odani et al. |
| 2004/0258187 A1 | 12/2004 | Jeong et al. |
| 2004/0268327 A1 | 12/2004 | Burger et al. |
| 2005/0015353 A1 | 1/2005 | Kumar et al. |
| 2005/0081105 A1 | 4/2005 | Wedel et al. |
| 2005/0097464 A1 | 5/2005 | Graeber et al. |
| 2005/0114842 A1 | 5/2005 | Fleehart et al. |
| 2005/0125776 A1 | 6/2005 | Kothari et al. |
| 2005/0149908 A1 | 7/2005 | Klianev |
| 2005/0160415 A1* | 7/2005 | Kwon ................ G06F 9/45504 717/151 |
| 2005/0182782 A1 | 8/2005 | Anderson |
| 2005/0210445 A1* | 9/2005 | Gough et al. ............. 717/111 |
| 2005/0246681 A1 | 11/2005 | Little et al. |
| 2005/0273773 A1 | 12/2005 | Gold et al. |
| 2006/0004851 A1 | 1/2006 | Gold et al. |
| 2006/0015857 A1 | 1/2006 | Gold et al. |
| 2006/0053414 A1 | 3/2006 | Bhandari et al. |
| 2006/0059461 A1 | 3/2006 | Baker et al. |
| 2006/0074866 A1 | 4/2006 | Chamberlain et al. |
| 2006/0075383 A1 | 4/2006 | Moorthy et al. |
| 2006/0080660 A1 | 4/2006 | Radhakrishnan |
| 2007/0083551 A1* | 4/2007 | Jezierski ................ G06F 8/24 |
| 2007/0162903 A1* | 7/2007 | Babb et al. ............. 717/154 |
| 2007/0234276 A1* | 10/2007 | Ottoni .................. G06F 8/314 717/104 |
| 2008/0094399 A1 | 4/2008 | Heinkel et al. |
| 2008/0098375 A1* | 4/2008 | Isard .................. G06F 11/1438 717/149 |
| 2008/0134138 A1 | 6/2008 | Chamieh et al. |
| 2008/0134152 A1 | 6/2008 | Edde et al. |
| 2008/0134161 A1 | 6/2008 | Chamieh et al. |
| 2008/0134207 A1 | 6/2008 | Chamieh et al. |
| 2011/0173619 A1* | 7/2011 | Fish .................. G06F 17/30371 718/101 |
| 2012/0266146 A1 | 10/2012 | Chamieh et al. |
| 2013/0061207 A1 | 3/2013 | Chamieh et al. |
| 2013/0104109 A1 | 4/2013 | Edde et al. |
| 2013/0232475 A1 | 9/2013 | Chamieh et al. |

FOREIGN PATENT DOCUMENTS

| | | |
|---|---|---|
| CN | 101601012 B | 3/2014 |
| CN | 101617292 B | 9/2014 |
| EP | 0777181 A1 | 6/1997 |
| EP | 0883057 A2 | 12/1998 |
| EP | 1942411 A2 | 7/2008 |
| EP | 1942411 A3 | 7/2008 |
| EP | 1952216 | 8/2008 |
| EP | 1958062 B1 | 7/2009 |

(56) References Cited

FOREIGN PATENT DOCUMENTS

| | | |
|---|---|---|
| EP | 1942411 B1 | 2/2012 |
| EP | 2041655 B1 | 3/2014 |
| EP | 2365435 B1 | 4/2014 |
| EP | 2365436 B1 | 7/2014 |
| EP | 1952216 B1 | 9/2014 |
| JP | 06-332785 | 12/1994 |
| JP | H07-013766 A | 1/1995 |
| JP | 2000514219 A | 10/2000 |
| JP | 2001005678 A | 1/2001 |
| JP | 5354601 B2 | 11/2013 |
| JP | 5354602 B2 | 11/2013 |
| JP | 5354603 B2 | 11/2013 |
| RU | 2206119 C2 | 6/2003 |
| RU | 2245578 C2 | 1/2005 |
| RU | 2435201 C2 | 11/2011 |
| RU | 2438161 C2 | 12/2011 |
| RU | 2445682 C2 | 3/2012 |
| WO | 9800791 A1 | 1/1998 |
| WO | 0101206 A2 | 1/2001 |
| WO | 0201359 A2 | 1/2002 |
| WO | 2005121954 A1 | 12/2005 |
| WO | 2008064899 A2 | 6/2008 |
| WO | 2008064899 A3 | 6/2008 |
| WO | 2008064900 A2 | 6/2008 |
| WO | 2008064901 A2 | 6/2008 |
| WO | 2008064901 A3 | 6/2008 |
| WO | 2008064902 A2 | 6/2008 |
| WO | 2008064902 A3 | 6/2008 |
| WO | 2008064900 A3 | 7/2008 |

OTHER PUBLICATIONS

"An enhanced for loop for the Java Programming Language, Proposed Final Draft," Jul. 12, 2004, 4 pages, Sun Microsystems, Inc., Palo Alto, California.

"Autoboxing and Auto-Unboxing support for the Java Programming Language, Proposed Final Draft," Jul. 12, 2004, 7 pages, Sun Microsystems, Inc., Palo Alto, California.

"Dataflow language," Nov. 25, 2006, 5 pages, downloaded from //en.wikipedia.org/w/index.php?title=Dataflow_language &printable=yes on Nov. 29, 2006.

"dataflow language," 4 pages, downloaded from ://www.answers.com/main/ntquery?tname=dataflow%2Dlanguage&print=true on Nov. 29, 2006.

"Dataflow Programming," Apr. 24, 2005, 2 pages, downloaded from ://c2.com/cgi/wiki?DataflowProgramming on Nov. 29, 2006.

"javadoc—The Java API Documentation Generator," 2002, 54 pages, Sun Microsystems, Inc., downloaded from ://java.sun.com/j2se/1.5.0/docs/tooldocs/windows/javadoc.html on Jan. 28, 2006.

"JSR175: A Program Annotation Facility for the Java™ Programming Language: Proposed Final Draft," Aug. 12, 2004, 12 pages, Sun Microsystems, Inc., Palo Alto, California.

"LabVIEW FAQs," 2006, 3 pages, National Instruments Corporation, downloaded from ://www.ni.com/labview/faq.htm on Nov. 29, 2006.

"LabVIEW," Nov. 24, 2006, 8 pages, downloaded from ://en.wikipedia.org/w/index.php?title=LabVIEW&printable=yes on Nov. 29, 2006.

"LUCID (ID:960/luc002) dataflow language," 9 pages, downloaded from ://hopl.murdoch.edu.au/showlanguage2.prx?exp=960 on Dec. 1, 2006.

"Quals: Programming Languages," Jan. 1, 2005, 43 pages, downloaded from ://www.cs.wm.edu/~coppit/wiki/index.php?title=Quals:_Programming_Languages&printable=yes on Dec. 1, 2006.

"Visual programming language," Nov. 29, 2006, 4 pages, downloaded from ://en.wikipedia.org/w/index.php?title=Visual_programming_language&printable=yes on Nov. 29, 2006.

Gilad Bracha et al., "Adding Generics to the Java Programming Language: Participant Draft Specification," Apr. 27, 2001, 18 pages.

Command pattern, Nov. 18, 2006, 7 pages, downloaded from ://en.wikipedia.org/w/index.php?title=Command_pattern&printable=yes on Nov. 29, 2006.

Martin Fowler, "Inversion of Control Containers and the Dependency Injection pattern," Jan. 23, 2004, 21 pages, downloaded from ://martinfowler.com/articles/injection.html on Aug. 6, 2006.

James Gosling et al., "The Java Language Specification, Third Edition," May 2005, 684 pages, Addison-Wesley.

Finn Haugen, "Introduction to LabVIEW Simulation Module 2.0," Oct. 29, 2006, 28 pages, downloaded from ://techteach.no/publications/labview/sim_module/2_0/index.htm on Nov. 29, 2006.

Hibernate 3.0, 2005, 4 pages, JBoss Inc.

Hibernate Annotations, Reference Guide, Version: 3.2.0 CR1, May 13, 2006, 57 pages.

Hibernate EntityManager, User Guide, Version: 3.2.0 CR1, May 13, 2006, 52 pages.

Hibernate Reference Documentation, Version: 3.1.1, Jan. 18, 2006, 223 pages.

Hibernate Tools, Reference Guide, Version: 3.1.0.beta5, Aug. 22, 2005, 43 pages.

Invitation to Pay Additional Fees (includes Partial International Search Report), PCT/EP2007/010407, dated Jun. 10, 2008, 5 pages.

ISR and Written Opinion, PCT/EP2007/010407, dated Oct. 24, 2008, 19 pages.

ISR and Written Opinion, PCT/EP2007/010408, dated Jun. 10, 2008, 13 pages.

ISR and Written Opinion, PCT/EP2007/010409, dated Jun. 5, 2008, 23 pages.

International Search Report and Written Opinion, Application No. PCT/EP2007/010410, dated Jun. 4, 2008, 14 pages.

Rod Johnson et al., "Spring, java/j2ee Application Framework, Version 2.0 M5," 2004-2006, 442 pages.

Rod Johnson, "Introduction to the Spring Framework," May 2005, 27 pages, downloaded from ://www.theseverside.com/tt/articles/content/SpingFramework/article.html on Jun. 19, 2006.

Memento pattern, Nov. 20, 2006, 3 pages, downloaded from ://en.wikipedia.org/wlindex.php?title=Memento_pattern&printable=yes on Nov. 29, 2006.

NHibernate Reference Documentation, Version: 1.0.2, Jan. 15, 2006, 151 pages.

Partial European Search Report, Application No. 07254672.4, dated Jun. 12, 2008, 17 pages.

Seam—Contextual Components, A Framework for Java EE 5, Version: 1.0.CR2, Apr. 2006, 138 pages.

International Preliminary Report on Patentability, PCT/EP2007/010409, dated Jun. 3, 2009, 15 pages.

International Preliminary Report on Patentability, PCT/EP2007/010407, dated Jun. 3, 2009, 13 pages.

International Preliminary Report on Patentability, PCT/EP2007/010410, dated Jun. 3, 2009, 9 pages.

International Preliminary Report on Patentability, PCT/EP2007/010408, dated Jun. 3, 2009, 9 pages.

Non-Final Office Action, U.S. Appl. No. 11/607,216, dated Apr. 8, 2010, 35 pages.

Mohan et al., "Efficient Commit Protocols for the Tree of Processes Model of Distributed Transactions," ACM, New York, NY, USA, vol. 19, Issue 2, Apr. 1985, pp. 40-52.

Jagadish et al., "Recovering from Main-Memory Lapses," Citeseer, 1993, pp. 1-16.

1st Examination Report, European Patent Application No. 07254672.4, dated May 19, 2009, 8 pgs.

Result of Consultation, European Patent Application No. 07254672.4, dated Sep. 24, 2010, 15 pgs.

Summons to Attend Oral Proceedings, European Patent Application No. 07254672.4, dated Jun. 28, 2010, 11 pgs.

1st Examination Report, European Patent Application No. 07856310.3, dated May 15, 2009, 9 pgs.

Result of Consultation, European Patent Application No. 07856310.3, dated Sep. 24, 2010, 3 pgs.

Summons to Attend Oral Proceedings, European Patent Application No. 07856310.3, dated Jun. 29, 2010, 10 pgs.

(56) References Cited

OTHER PUBLICATIONS

1st Examination Report, European Patent Application No. 07856311.1, dated May 28, 2009, 8 pgs.
Result of Consultation, European Patent Application No. 07856311.1, dated Sep. 24, 2010, 3 pgs.
Summons to Attend Oral Proceedings, European Patent Application No. 07856311.1, dated Jun. 29, 2010, 11 pgs.
Bill Venners, "The Linking Model", Inside the Java Virtual Machine, Chapter 8, 1999, pp. 1-61, reprinted from ://www.artima.com/insidejvm/ed2/linkmodP.html on Sep. 20, 2010, Tata McGraw-Hill.
Bill Venners, "Thread Synchronization", Inside the Java Virtual Machine, Chapter 20, pp. 1-11, reprinted from ://www.artima.com/insidejvm/ed2/threadsynchP.html on Sep. 20, 2010.
Notice of Allowance, U.S. Appl. No. 11/607,216, dated Nov. 19, 2010, 29 pages.
Official Action, Russian Application No. 2009125011, dated Oct. 13, 2010, 12 pages.
Official Action, Russian Application No. 2009125050, dated Oct. 4, 2010, 25 pages.
Official Action, Russian Application No. 2009125013, dated Nov. 13, 2010, 17 pages.
Decision on Grant, Russian Application No. 2009125050, dated May 23, 2011, 27 pages.
Decision on Grant, Russian Application No. 2009125011, dated Jun. 21, 2011, 22 pages.
Extended European Search Report, Application No. 11167913.0, dated Oct. 24, 2011.
Rong Zhou et al., "Breadth-first heuristic search", pp. 385-408, Dec. 1, 2004, Artificial Intelligence 170 (2006), Elsevier B.V.
Decision on Grant, Russian Application No. 2009125013, dated Oct. 4, 2011, 26 pages.
Extended European Search Report, Application No. 11167918.9, dated Nov. 7, 2011.
Communication under Rule 71(3), European Application No. 07254672.4, dated Sep. 6, 2011.
Non-Final Office Action, U.S. Appl. No. 11/607,196, dated Dec. 21, 2011, 49 pages.
Non-Final Office Action, U.S. Appl. No. 11/607,199, dated Jan. 9, 2012, 37 pages.
Jane Cleland-Huang et al., "Event Based Traceability for Managing Evolutionary Change", Sep. 2003, 15 pages, IEEE Transactions on Software Engineering, vol. 29, No. 9, IEEE Computer Society.
Communication pursuant to Article 94(3) EPC, European Application No. 07856311.1, dated Jul. 25, 2011, 7 pages.
Communication pursuant to Article 94(3) EPC, European Application No. 07856310.3, dated Jul. 25, 2011, 8 pages.
Notice of Allowance, U.S. Appl. No. 11/633,098, dated Feb. 29, 2012, 42 pages.
Decision to grant a European patent pursuant to Article 97(1) EPC, Application No. 07254672.4, dated Jan. 26, 2012, 2 pages.
First Office Action, Chinese Application No. 200780050596.4, dated Feb. 29, 2012, 8 pages.
First Office Action, Chinese Application No. 200780050449.7, dated Apr. 6, 2012, 19 pages.
First Office Action, Chinese Application No. 200780050659.6, dated Apr. 23, 2012, 11 pages.
Notification of Reasons for Rejection, Japanese Application No. 2009538645, dated Jul. 5, 2012, 7 pages.
Notification of Reasons for Rejection, Japanese Application No. 2009538644, dated Jul. 5, 2012, 5 pages.
Notification of Reasons for Rejection, Japanese Application No. 2009538646, dated Jul. 5, 2012, 5 pages.
Notice of Allowance, U.S. Appl. No. 11/607,196, dated Aug. 14, 2012, 21 pages.
Notice of Allowance, U.S. Appl. No. 11/607,199, dated Sep. 26, 2012, 22 pages.
Second Office Action, Chinese Application No. 200780050659.6, dated Dec. 25, 2012, 9 pages.
Second Office Action, Chinese Application No. 200780050596.4, dated Jan. 24, 2013, 14 pages.
Second Office Action, Chinese Application No. 200780050449.7, dated Mar. 4, 2013, 8 pages.
Non-Final Office Action, U.S. Appl. No. 13/840,900, dated Jul. 16, 2013, 48 pages.
Third Office Action, Chinese Application No. 200780050596.4, dated Aug. 6, 2013, 13 pages.
Decision of Grant, Japanese Application No. 2009538644, dated Aug. 5, 2013, 3 pages.
Decision of Grant, Japanese Application No. 2009538645, dated Aug. 5, 2013, 3 pages.
Decision of Grant, Japanese Application No. 2009538646, dated Aug. 5, 2013, 3 pages.
Third Office Action, Chinese Application No. 200780050659.6, dated May 28, 2013, 7 pages.
Communication under Rule 71(3) EPC, European Application No. 07856310.3, dated Apr. 19, 2013, 241 pages.
Notification on the Grant for Patent Right, Chinese Application No. 200780050449.7, dated Aug. 28, 2013, 4 pages.
Notice of Allowance, U.S. Appl. No. 13/455,756, dated Oct. 1, 2013, 70 pages.
Notice of Allowance, U.S. Appl. No. 13/840,900, dated Oct. 10, 2013, 30 pages.
Communication under Rule 71(3) EPC, European Application No. 07856310.3, dated Sep. 27, 2013, 240 pages.
Fourth Office Action, Chinese Application No. 200780050659.6, dated Nov. 5, 2013, 8 pages.
Communication under Rule 71(3) EPC, European Application No. 11167918.9, dated Oct. 7, 2013, 241 pages.
Communication under Rule 71(3) EPC, European Application No. 11167913.0, dated Oct. 11, 2013, 245 pages.
Communication under Rule 71(3) EPC, European Application No. 07856311.1, dated Oct. 14, 2013, 179 pages.
Notification on the Grant for Patent Right, Chinese Application No. 200780050596.4, dated Dec. 3, 2013, 4 pages.
Communication under Rule 71(3) EPC, European Application No. 07856311.1, dated Apr. 3, 2014, 179 pages.
Fifth Office Action, Chinese Application No. 200780050659.6, dated Mar. 4, 2014, 3 pages.
Notification on the Grant for Patent Right, Chinese Application No. 200780050659.6, dated Jun. 9, 2014, 4 pages.
Communication under Rule 71(3) EPC, European Application No. 11167918.9, dated Feb. 18, 2014, 241 pages.
Decision to grant a European patent pursuant to Article 97(1) EPC, European Application No. 11167918.9, dated Jul. 3, 2014, 2 pages.
Decision to grant a European patent pursuant to Article 97(1) EPC, European Application No. 07856310.3, dated Feb. 20, 2014, 2 pages.
Decision to grant a European patent pursuant to Article 97(1) EPC, European Application No. 07856311.1, dated Aug. 28, 2014, 2 pages.
Non-Final Office Action, U.S. Appl. No. 13/710,372, dated Dec. 30, 2014, 50 pages.
Erich Gamma et al., "Design Patterns—Elements of Reusable Object Oriented Software," Addison Wesley, 1995.
Mark Grand, "Patterns in Java," Wiley Computer Publishing, 1998.
Non-Final Office Action, U.S. Appl. No. 13/669,837, dated Dec. 11, 2014, 51 pages.
Non-Final Office Action, U.S. Appl. No. 13/669,837, dated Jul. 30, 2015, 25 pages.
Notice of Allowance, U.S. Appl. No. 13/710,372, dated Aug. 10, 2015, 8 pages.
Bill Venners, "The Java Virtual Machine," 1999, 49 pages, Inside the Java Virtual Machine, Chapter 5, downloaded from www.artima.com/insidejvm/ed2/jvmP.html on Nov. 20, 2015.
Bill Venners, "The Lifetime of a Type," 1999, 27 pages, Inside the Java Virtual Machine, Chapter 7, downloaded from www.artima.com/insidejvm/ed2/lifetypeP.html on Nov. 20, 2015.
Bill Venners, Inside the Java Virtual Machine, 1998, 220 pages, Chapters 1, 5, 7, 8, and 19, The McGraw-Hill Companies, Inc.

(56) References Cited

OTHER PUBLICATIONS

Bill Venners, Inside the Java Virtual Machine, 1999, 178 pages, Second Edition, Chapters 5, 7, and 8, The McGraw-Hill Companies, Inc.
Notice of Allowance, U.S. Appl. No. 13/669,837, dated Jan. 12, 2016, 16 pages.
Notice of Allowance, U.S. Appl. No. 13/669,837, dated Jul. 13, 2016, 14 pages.

* cited by examiner

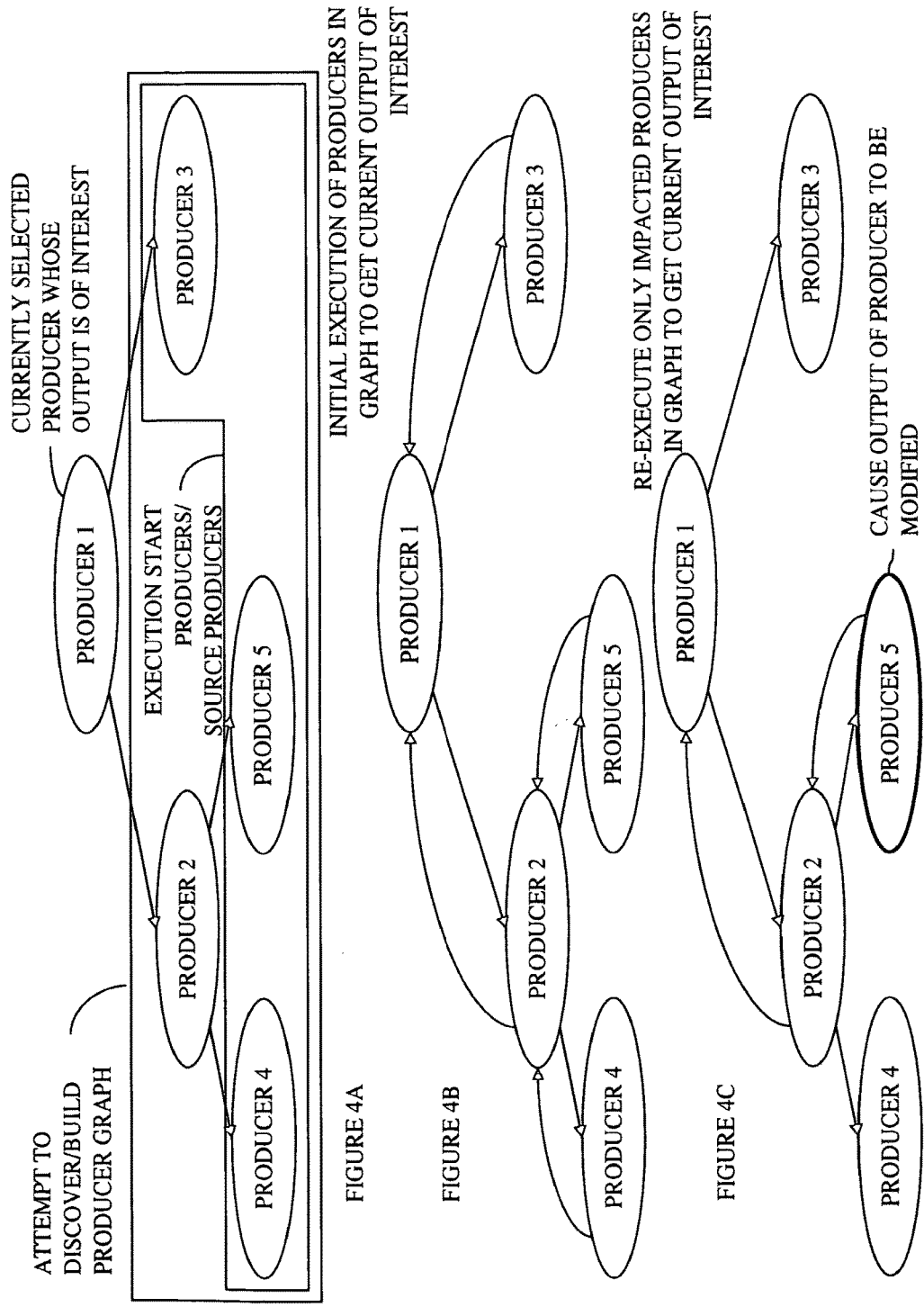

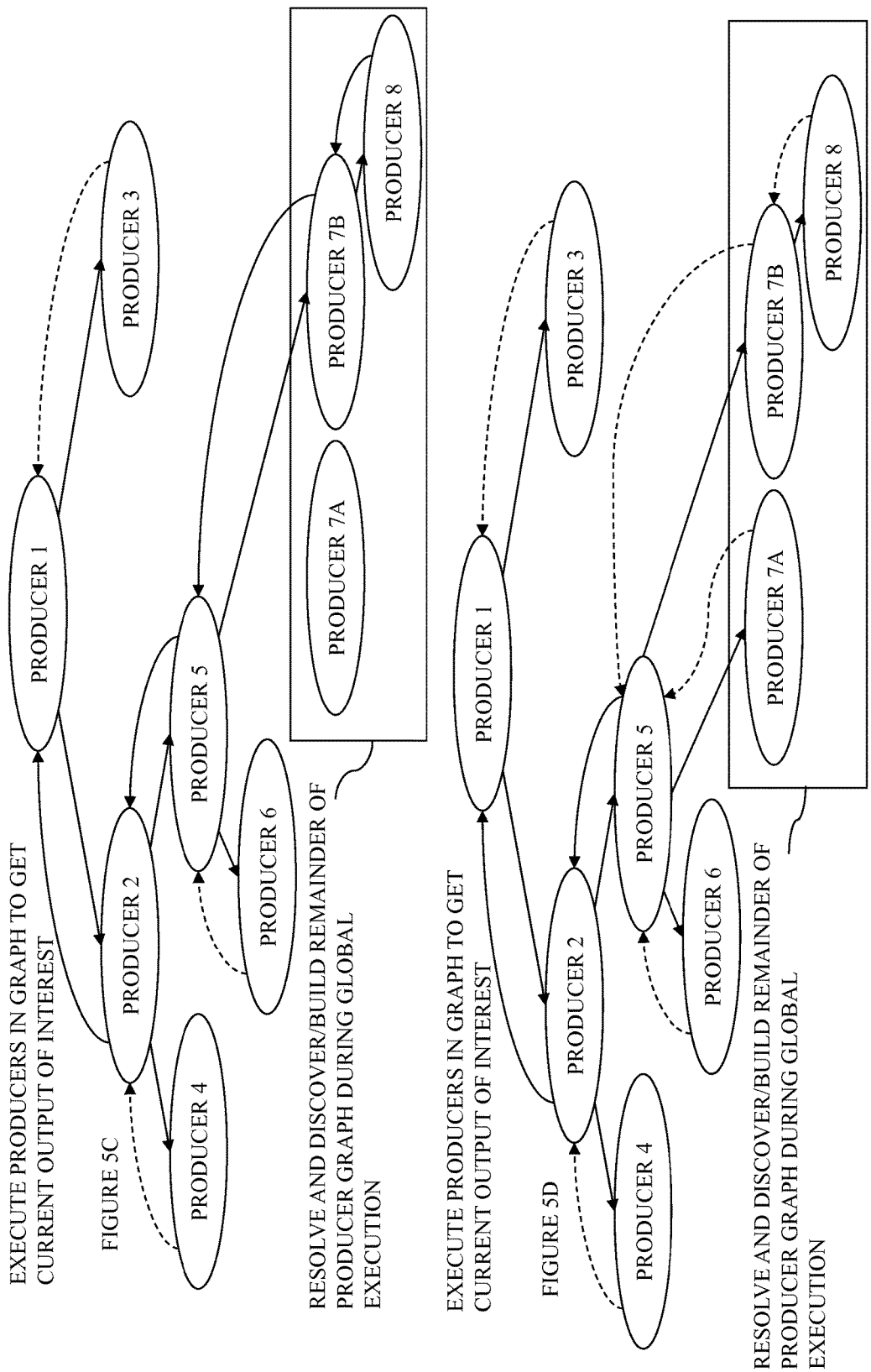

PRODUCER DEPENDENCY DEC. STATEMENT (ARGUMENTDEP. 1; ... ARG.DEP. N; ... FIELDDEP. 1 ...M; SEQ.DEP. 1..L; UPWARDDEP. 1..P; WEAKLYCONSTRAINEDDEP. 1..Q) 705
METHOD ALPHA (ARG. 1, ... ARG. N) 710

FIGURE 7B    ARGUMENT ID=1

PRODUCER DEPENDENCY DECLARATION STATEMENT (ARGUMENTDEP. 1; ....) 705
METHOD ALPHA (ARG. 1, ... ARG. N) 710

PRODUCER DEP. DEC. CODE 715

FIGURE 7D

PRODUCER DEPENDENCY DECLARATION STATEMENT (ARGUMENTDEP. 1; ....) 705
METHOD ALPHA (ARG. 1, ... ARG. N) 710

PRODUCER DEPENDENCY DECLARATION STATEMENT (...) 750
METHOD BETA (...) 755
PRODUCER DEP. DEC. CODE 760

FIGURE 7E

ARGUMENT ID=1
PRODUCER 720 → PRODUCER 725
DEPENDENCY DETERMINATION PRODUCER 765

PRODUCER 748 → DEPENDENCY DETERMINATION PRODUCER 772 → PRODUCER 720

FIGURE 7F

PRODUCER 785
DEPENDENCY DETERMINATION PRODUCER 775
PRODUCER 780
PRODUCER 720

FIGURE 7G

POPULATED BASED ON   IF OVERRIDE DATE OF BIRTH, THEN WILL RESULT IN A SET AND
INSTANCE SELECTION 858   EXECUTE AND AGE WILL RECALCULATE 860

MENU BAR 850

| CLASSES WITH THEIR GET PROPERTY METHODS 852 | CONFIGURATION AND MAPPING VIEWER 854 | | | | | | | | | |
|---|---|---|---|---|---|---|---|---|---|---|
| | CUSTOMER | INSTANCE SELECTION 854 | | | | | | | | |
| PERSON | FIRST NAME | JOHN | | | | | | | | |
| FIRSTNAME | LAST NAME | SMITH | | | | | | | | |
| LASTNAME | DATE OF BIRTH | 7/20/1990 | | | | | | | | |
| GENDER | AGE | 16 | | | | | | | | |
| HOMEADDRESS | | | | | | | | | | |
| PROFESSIONALADDRESS | | | | | | | | | | |
| DATEOFBIRTH | | | | | | | | | | |
| AGE | | | | | | | | | | |
| ADDRESS | | | | | | | | | | |
| CITY | | | | | | | | | | |
| STATE | | | | | | | | | | |
| ZIPCODE | | | | | | | | | | |

FIGURE 8D

POPULATED BASED ON INSTANCES OF CLASS PERSON 868

IF OVERRIDE DATE OF BIRTH, THEN WILL RESULT IN A SET AND EXECUTE AND AGE WILL RECALCULATE 870

MENU BAR 850

CONFIGURATION AND MAPPING VIEWER 854

| CLASSES WITH THEIR GET PROPERTY METHODS 852 | | | | | | | | | |
|---|---|---|---|---|---|---|---|---|---|
| PERSON | CUSTOMER LIST | | | | | | | | |
| FIRSTNAME | FIRST NAME | LAST NAME | DATE OF BIRTH | AGE | | | | | |
| LASTNAME | STEVE | COLLINS | 7/20/1990 | 16 | | | | | |
| GENDER | JENNIFER | ADAMS | 7/20/1990 | 16 | | | | | |
| HOMEADDRESS | JOHN | SMITH | 7/20/1985 | 21 | | | | | |
| PROFESSIONAL ADDRESS | | | | | | | | | |
| DATEOFBIRTH | | | | | | | | | |
| AGE | | | | | | | | | |
| ADDRESS | | | | | | | | | |
| CITY | | | | | | | | | |
| STATE | | | | | | | | | |
| ZIPCODE | | | | | | | | | |

FIGURE 8F

| OBJECT ORIENTED SOURCE CODE WITH PRODUCER DEPENDENCY DECLARATIONS FOR METHODS 905 |
|---|
| RUNTIME WITH PRODUCER GRAPH ORIENTED PROGRAMMING SUPPORT 910 |
| RUNTIME WITH CLASS LOADING, DYNAMIC CLASS INSTANTIATION, DYNAMIC SINGLE METHOD INVOCATION, AND CLASS/METHOD INTROSPECTION 915 |
| OPERATING SYSTEM 920 |

FIGURE 9A

| OBJECT ORIENTED SOURCE CODE WITH PRODUCER DEPENDENCY DECLARATIONS FOR METHODS 925 |
|---|
| RUNTIME WITH CLASS LOADING, DYNAMIC CLASS INSTANTIATION, DYNAMIC SINGLE METHOD INVOCATION, AND CLASS/METHOD INTROSPECTION, AS WELL AS WITH PRODUCER GRAPH ORIENTED PROGRAMMING SUPPORT 930 |
| OPERATING SYSTEM 935 |

FIGURE 9B

| OBJECT ORIENTED SOURCE CODE WITH PRODUCER DEPENDENCY DECLARATIONS FOR METHODS 940 |
|---|
| OPERATING SYSTEM RUNTIME WITH CLASS LOADING, DYNAMIC CLASS INSTANTIATION, DYNAMIC SINGLE METHOD INVOCATION, AND CLASS/METHOD INTROSPECTION, AS WELL AS WITH PRODUCER GRAPH ORIENTED PROGRAMMING SUPPORT 945 |

FIGURE 9C

| CLASS KEY 1110 | CLASS REFERENCE 1115 |
|---|---|
| | |

FIGURE 11A

| INSTANCE KEY 1120 | INSTANCE REFERENCE 1125 |
|---|---|
| | |

FIGURE 11B

| CLASS REFERENCE 1135 | INSTANCE REFERENCE 1140 | METHOD REFERENCE 1145 | PARENT PRODUCER(S) LINK(S) 1150 INCLUDING FOR EACH LINK A PARENT PRODUCER REFERENCE AND A DEPENDENCY DETERMINATION PRODUCER REFERENCE | CHILD PRODUCER(S) LINK(S) 1160, INCLUDING FOR EACH LINK CHILD PRODUCER REFERENCE(S), A DEPENDENCY DETERMINATION PRODUCER REFERENCE, A LINK MODE AND A STICKY INDICATOR | PRODUCER OUTPUT CACHING & OVERRIDE PRODUCER OUTPUT INDICATIONS 1170 | INCREMENTAL EXECUTION MARKING 1180 |
|---|---|---|---|---|---|---|
| | | | | | | |

FIGURE 11C

| METHOD KEY 1190 | METHOD REFERENCE 1192 | ARG. 1194 | FIELD 1196 | SEQ. 1195 | UPWARD 1193 | WEAKLY CONSTRAINED 1199 | OUTPUT CLASS 1197 | ADDITIONAL ANNOTATIONS 1198 |
|---|---|---|---|---|---|---|---|---|
| | | | | | | | | |

FIGURE 11D

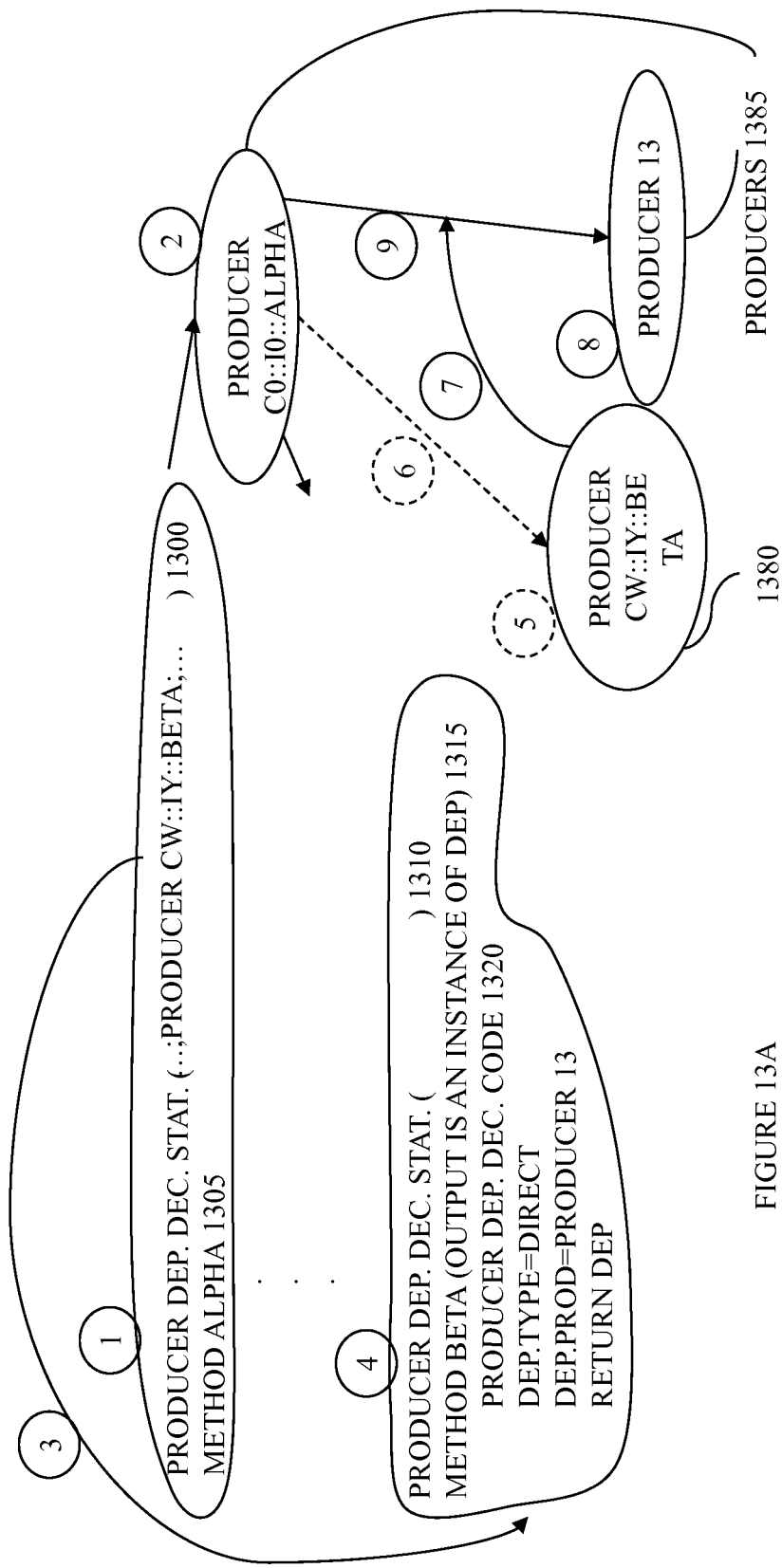

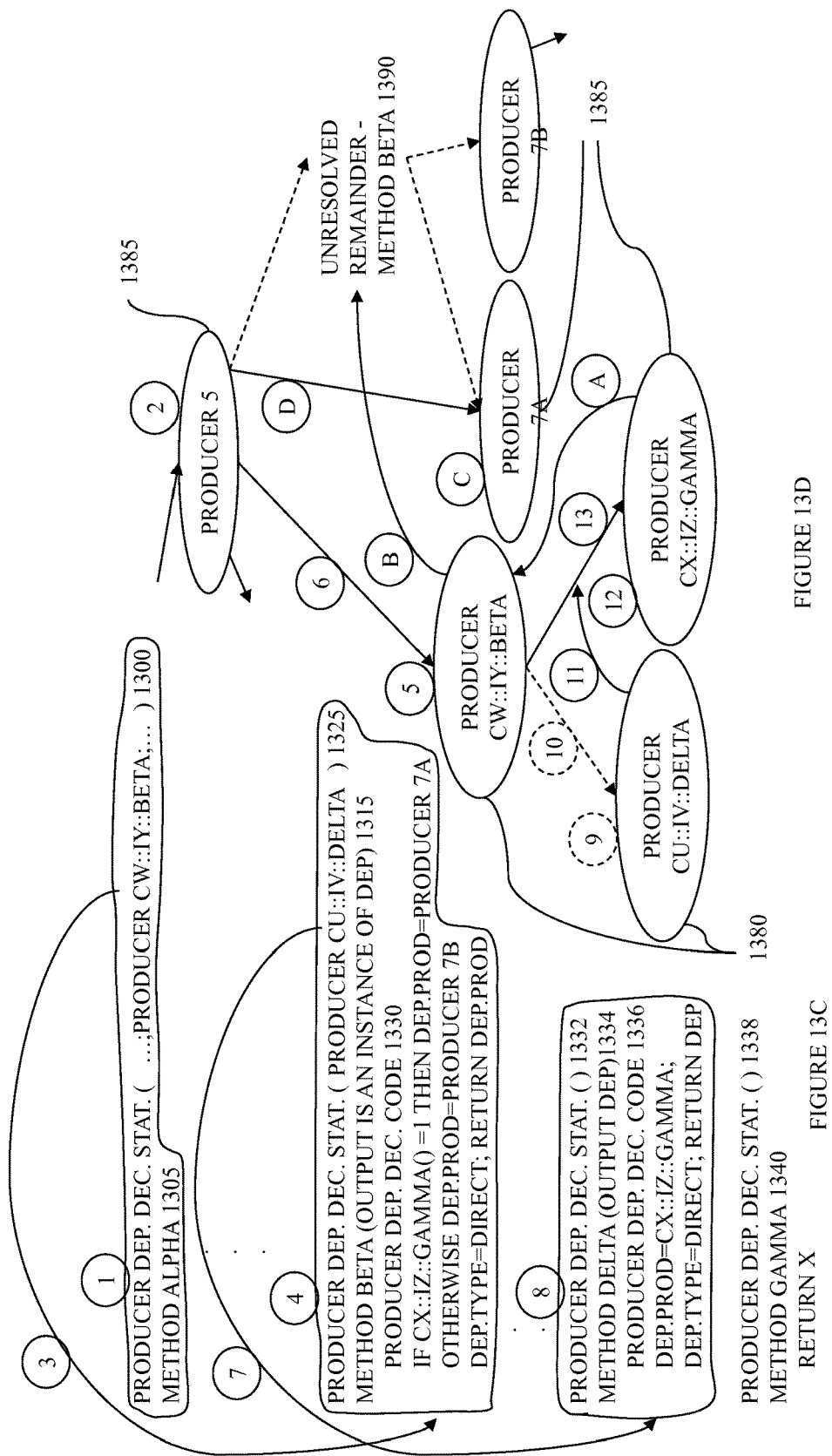

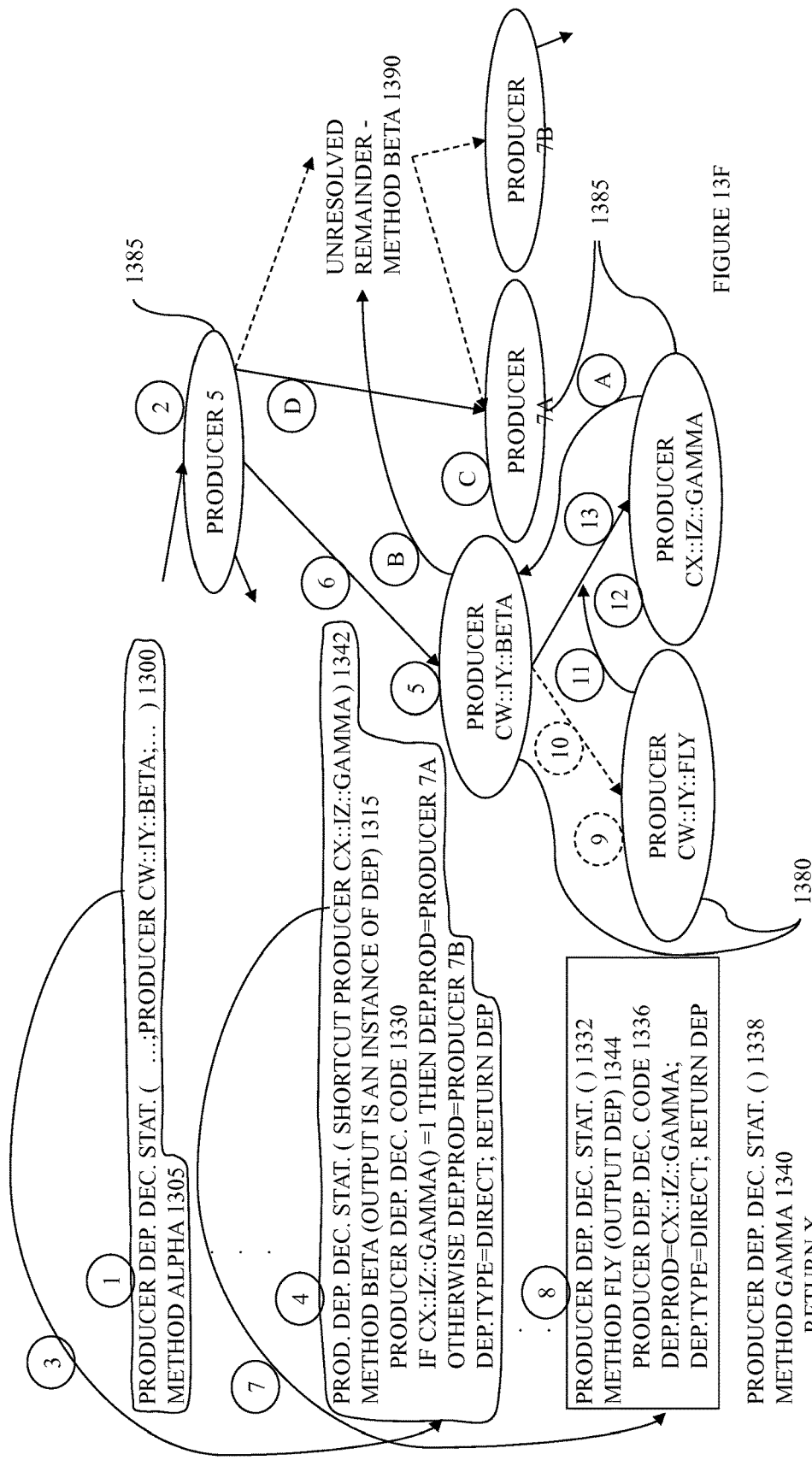

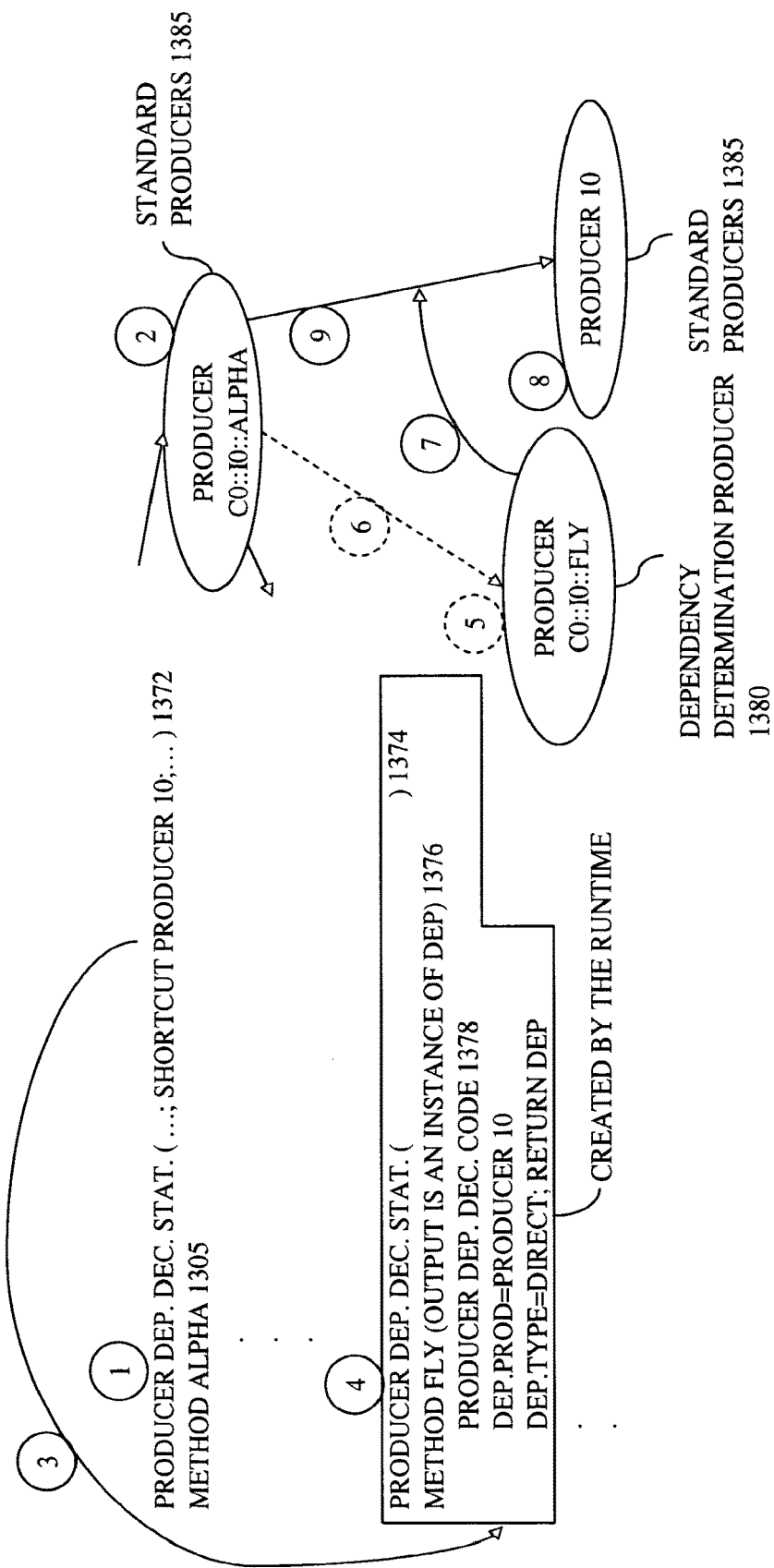

| SUBSCRIBER'S PRODUCER KEY 1400 | SUB. TYPE 1405 | SUB. CRITERIA FOR TRIGGER PRODUCERS 1410 | MATCHING PRODUCERS (ABSORBING) 1415 | COMPLETED (ABSORBING) 1420 | PARENT LINK MODE 1425 | PARENT CLASS 1430 | PARENT METHOD 1435 | PARENT INSTANCE 1437 | DEPENDENCY DET. PRODUCER REFERENCE 1421 |
|---|---|---|---|---|---|---|---|---|---|
| 1450 | ABSORBING | FROM 1455 | 1460A..N | YES OR NO | LINK MODE OF 1450 | N/A | N/A | N/A | 1455 |
| 1470 | STICKY | FROM 1470 | N/A | N/A | LINK MODE OF 1480 FROM 1470 | CLASS OF 1480 FROM 1470 | METHOD OF 1480 FROM 1470 | 1480 | 1470 |

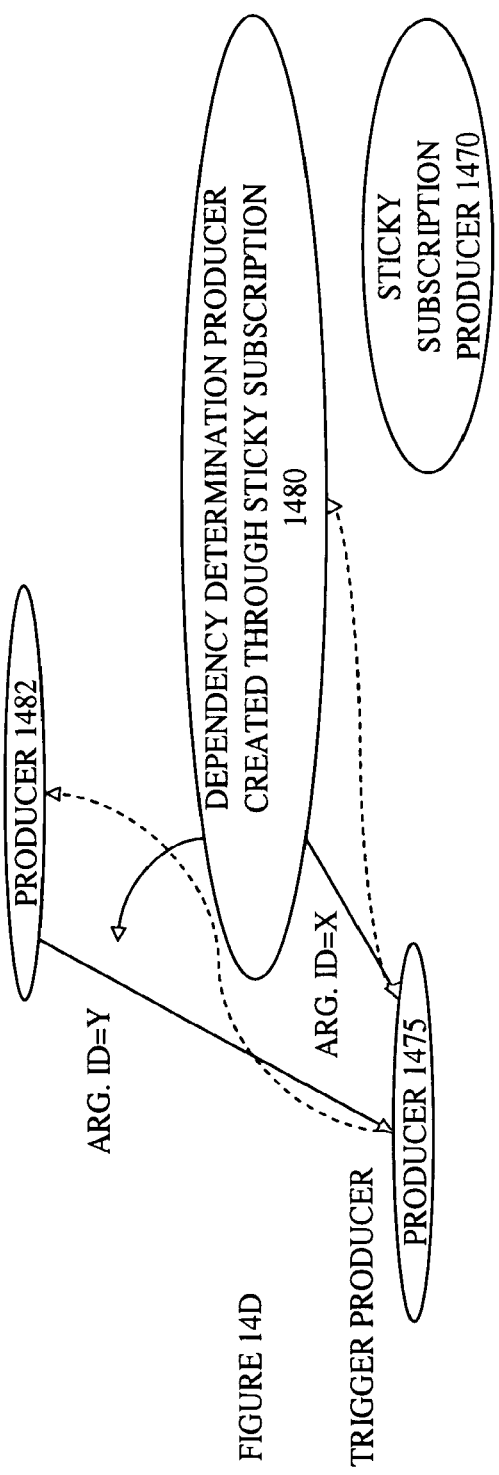
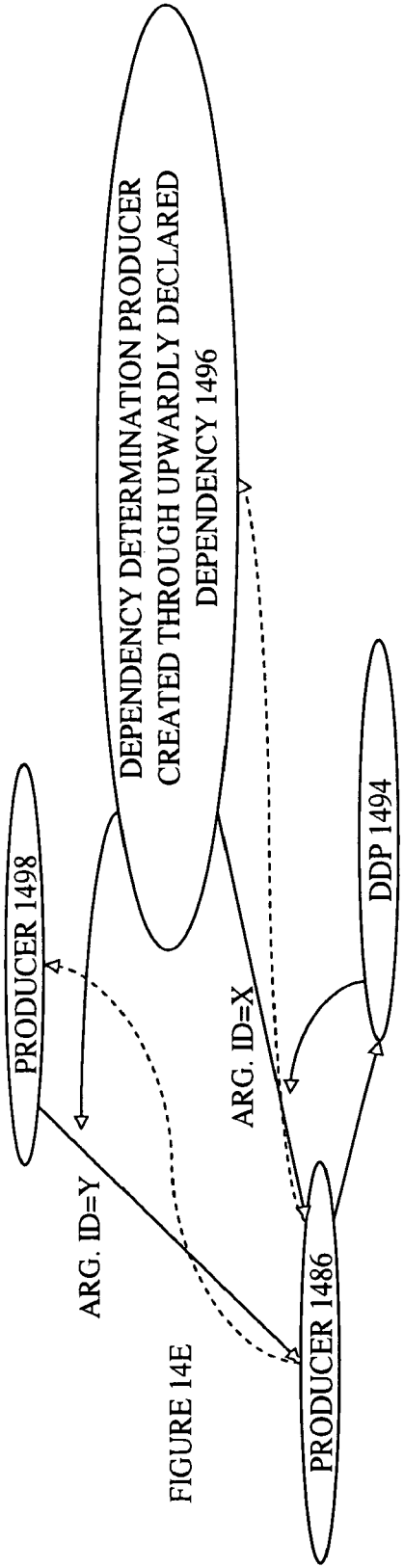
FIGURE 14D
FIGURE 14E

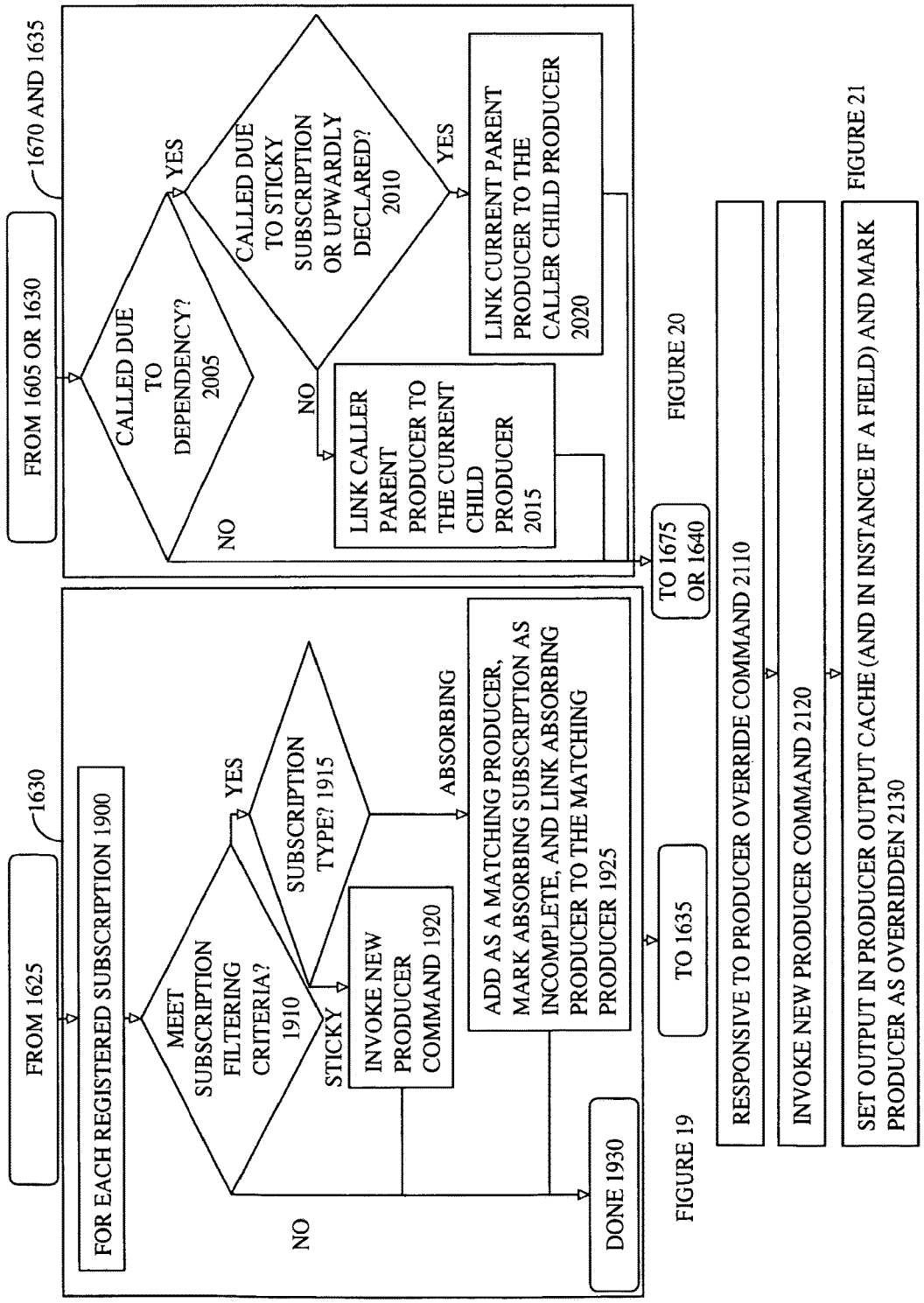

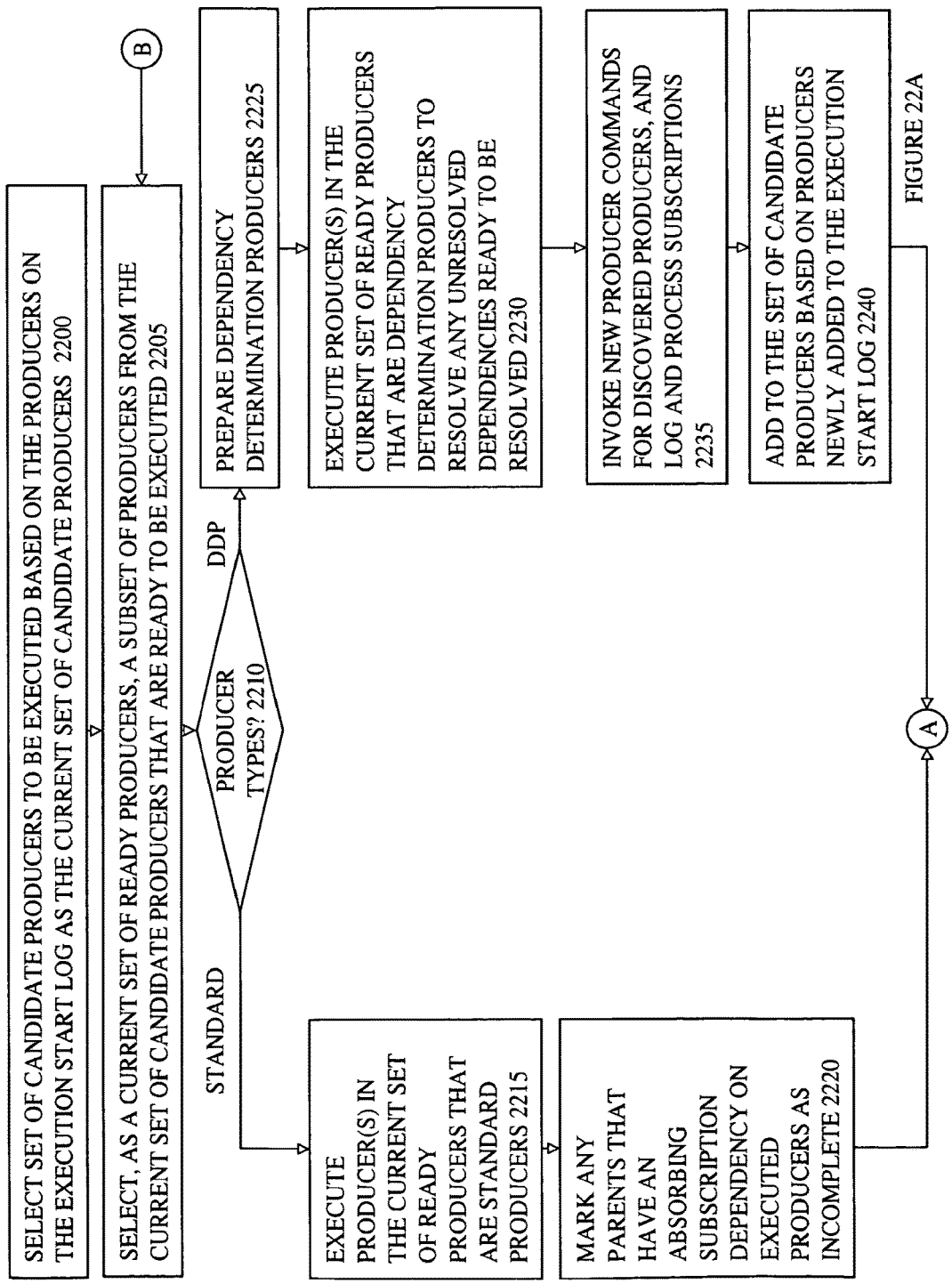

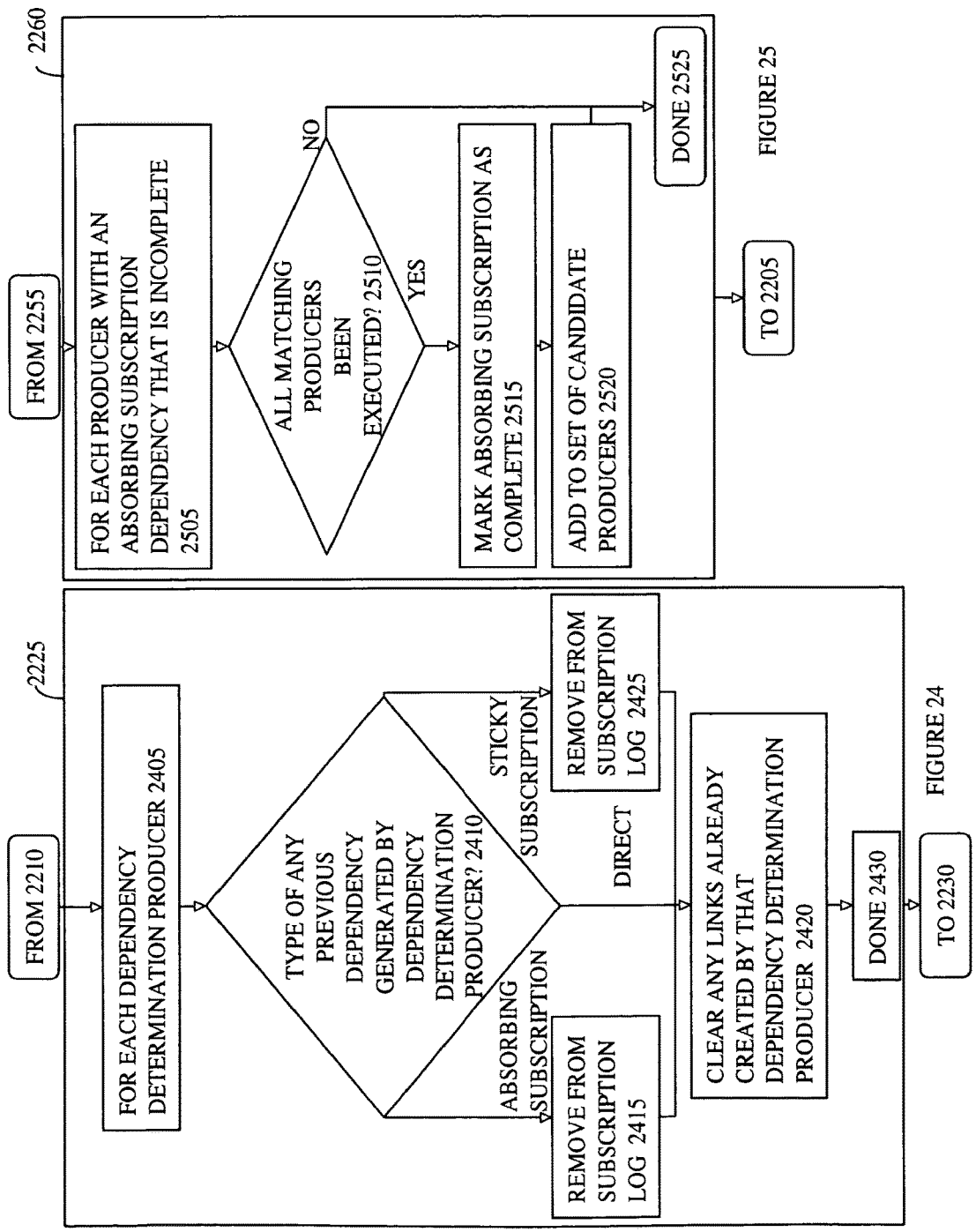

PRODUCER GRAPH ORIENTED PROGRAMMING AND EXECUTION

CROSS-REFERENCE TO RELATED APPLICATIONS

This application is a continuation of application Ser. No. 13/455,756, filed Apr. 25, 2012, which is a continuation of application Ser. No. 11/633,098, filed Dec. 1, 2006, which issued as U.S. Pat. No. 8,191,052 on May 29, 2012, which are hereby incorporated by reference.

BACKGROUND

Field

Embodiments of the invention relate to the field of computers; and more specifically, to the field of programming and executing code with a runtime.

Background

Object-Oriented Programming

Object-oriented programming is a computer programming paradigm. The idea behind object-oriented programming is that a computer program may be seen as comprising a collection of individual units (called objects or instances) that act on each other, as opposed to a traditional view in which a program may be seen as a collection of functions, or simply as a list of instructions to the computer. An object is a language mechanism for binding data with methods that operate on that data. Each object is capable of being called through methods, processing data, and providing results to other objects. Each object can be viewed as an independent machine or actor with a distinct role or responsibility.

A reflective object-oriented language is a programming language that has a particular set of characteristics (e.g., classes, objects/instances, inheritance, reflection, etc.), whereas a reflective object-based language is sometimes used to label a programming language that has some subset of those characteristics (e.g., objects). For purposes of this document, the phrases "object-oriented source code" and "object-oriented code" will be used to refer to code written in a language that has such characteristics (e.g., code written in a reflective object-oriented language, code written in a reflective object-based language). While procedural languages, non-reflective object-oriented languages, and non-reflective object-based languages are programming languages that do not typically support such characteristics, transformation techniques may be used to provide such characteristics (e.g., through emulation) to code properly written in such languages; and thus, such techniques transform such languages into a reflective object-based language or reflective object-oriented language. (These techniques need not emulate all characteristics of object oriented or based languages, but may emulate only those characteristics which are of interest to the rest of this document) For purposes of this document, the phrases "object-oriented source code" and "object-oriented code" will also be used to refer to such transformed procedural, non-reflective object-oriented, and non-reflective object-based language code. By way of example, and not limitation, this document primarily describes object-oriented source code written in a reflective object-oriented language. Also, the terms object and instance are used interchangeably herein.

Used mainly in object-oriented programming, the term method refers to a piece of code that is exclusively associated either with a class (called class methods, static methods, or factory methods) or with an object (called instance methods). Like a procedure in procedural programming languages, a method usually consists of a sequence of statements to perform an action, a set of input parameters to parameterize those actions, and possibly an output value of some kind that is returned.

When programmers write a program using an object-oriented language, the resulting code can be conceptually viewed as including four basic types of code. The first type includes commands that operate on input instance(s) to provide output instance(s) (referred to herein as "transformation" code); typically written as methods (referred to herein as "transformation" methods). The second type includes instance instantiation commands that cause the runtime to instantiate instances of classes (referred to herein as "instance instantiation" code). The third type includes property manipulation commands (referred to herein as "data preparation" code) to invoke property methods (accessors, mutators, etc.) of the above instances. The fourth type includes sequences of commands that cause method invocation sequencing using the appropriate instances (where the appropriate instances include the instances to use as arguments, the instances to be used by instance methods, and the meta class instances used by class methods) to specify what transformation methods of what instances to invoke, in which order, and with which parameters of which instances responsive to the changes made by data preparation code (referred to herein as "manual invocation sequencing" code). The manual invocation sequencing code is sometimes written as methods separate from the transformation methods, and thus the manual invocation sequencing code includes sequences of invocation commands for the transformation methods. A program typically iterates between data preparation code and manual invocation sequencing code (which may also dip into the instance instantiation code), which in turn invokes transformation code (which may also dip into the instance instantiation code and data preparation code types). It should be noted that this is a conceptual representation of a program, and thus, should not be taken as an absolute with regard to how to view a program.

Runtime

The term runtime is used herein to refer to a program or library of basic code that runs other code written in the same and/or a different language. Thus, a runtime is a collection of utility functions that support a program while it is running, including working with the operating system to provide facilities such as mathematical functions, input and output. These make it unnecessary for programmers to continually rewrite basic capabilities specified in a programming language or provided by an operating system. Since the demarcation between a runtime and an operating system can be blurred, the term runtime is used herein to refer to code separate from the operating system and/or code that is part of the operating system.

Early runtimes, such as that of FORTRAN, provide such features as mathematical operations. Other languages add more sophisticated features—e.g., memory garbage collection, often in association with support for objects. More recent languages tend to have considerably larger runtimes with considerably more functionality. Many object-oriented languages also include a system known as the "dispatcher" and "class loader." The Java Virtual Machine (JVM) is an example of such a runtime: it also interprets or compiles the portable binary Java programs (byte-code) at run time. The common language runtime (CLR) framework is another example of a runtime.

Programming and Execution Framework

One framework within which applications are provided to end users includes three basic divisions. The first division includes the creation of the operating system and runtime. This first division is performed by programmers with highly advanced programming skills. When working in this division, programmers are respectively referred to as operating system programmers and runtime programmers. When creating a runtime for an object-oriented language, the runtime programmers include support for executing the various types of commands used in transformation code, instance instantiation code, data preparation code, and manual invocation sequencing code (e.g., instance instantiation commands, data preparation commands, and method invocation commands).

The second division includes the creation of object-oriented application source code to be run by the runtime. The second division is again performed by programmers with highly advanced programming skills, as well as an understanding of the business objectives of the application. When working in this division, programmers are referred to as application programmers. When creating an application in an object-oriented programming language, the application programmers write the specific transformation code, instance instantiation code, data preparation code, and manual invocation sequencing code for the specific application being created. As part of this, if the application requires a graphical user interface, the application programmers also design and code the graphical user interface for the specific application; and thus are also referred to as application designers.

The third division includes the use of application programs being run by the runtime. The third division is performed by end users that need not have any programming skills.

Manual Invocation Sequencing Code

The greatest costs typically associated with the creation of an application involve the debugging and/or optimization of the manual invocation sequencing code. For each opportunity for data to change, the application programmer must consider its effect and write manual invocation sequencing code to cause the appropriate transformation methods of the appropriate instances to be invoked in the appropriate order with the appropriate inputs. Exemplary mistakes made by application programmers include: 1) invoking the appropriate transformation methods of the appropriate instances in the wrong order; 2) forgetting to include commands to cause the one or more required transformation methods of instances to be invoked responsive to some data being changed; 3) including commands to cause unnecessary transformation methods of instances to be invoked responsive to some data being changed (e.g., including commands to invoke transformation methods of instances that are not affected by the change in data), etc.

By way of example, one technique of generating manual invocation sequencing code is the use of the observer pattern (sometimes known as "publish subscribe") to observe the state of an instance in a program. In the observer pattern, one or more instances (called observers or listeners) are registered (or register themselves) to observe an event which may be raised by the observed object (the subject). The observed instance, which may raise an event, generally maintains a collection of the registered observers. When the event is raised, each observer receives a callback from the observed instance (the observed instance invokes a "notify" method in the registered observers). The notify function may pass some parameters (generally information about the event that is occurring) which can be used by the observers. Each observer implements the notify function, and as a consequence defines its own behavior when the notification occurs.

The observed instance typically has a register method for adding a new observer and an unregister method for removing an observer from the list of instances to be notified when the event is raised. Further, the observed instance may also have methods for temporarily disabling and then reenabling calls to prevent inefficient cascading of a number of related updates. Specifically, callbacks called in response to a property value change often also change values of some other properties, triggering additional callbacks, and so on.

When using the observer pattern technique, application programmers writing manual invocation sequencing code specify what methods of what instances to call, in which order, and with which inputs by registering, unregistering, disabling, and reenabling observers to different observed instances, as well as writing the notify and callback methods for each. More specifically, the relationship between observer and observed instances is locally managed (by the observed instance alone, without synchronization with other observed instances) within the observer pattern, and thus the manual invocation sequencing code needed to synchronize events from multiple observed instances is typically part of the specific callback methods of each observer.

Overwriting, Volatile Call Stack

Typical runtimes use an overwriting, volatile call stack to track currently invoked, uncompleted calls. An overwriting, volatile call stack is overwriting in that it pops off and discards entries as each call is completed, and volatile in that it is discarded and rebuilt on every execution. Typical runtimes use overwriting, volatile call stacks because typical runtimes combine the building of the overwriting, volatile call stack with the actual invocation of the appropriate transformation methods of the appropriate instances with the appropriate inputs responsive to execution of the manual invocation sequencing code. In sum, responsive to execution of manual invocation sequencing code, a typical runtime determines the transformation method/instance sequencing call by call (as each call is made) and maintains the overwriting, volatile call stack to track only currently invoked, uncompleted calls.

Object-Relational Mapping

Object-Relational mapping is a programming technique that links relational databases to object-oriented language concepts, creating (in effect) a "virtual object database." Some object-relational mappers automatically keep the loaded instances in memory in constant synchronization with the database. Specifically, after construction of an object-to-SQL mapping query, first returned data is copied into the fields of the instances in question, like any object-SQL mapping package. Once there, the instance has to watch to see if these values change, and then carefully reverse the process to write the data back out to the database.

Hibernate 3.0 is an object-relational mapping solution for Java and CLR (Jboss® Inc. of Atlanta, Ga.). Thus, Hibernate provides a framework for mapping an object-oriented domain model to a traditional relational database. Its goal is to relieve the developer from some common data persistence-related programming tasks. Hibernate takes care of the mapping from classes to database tables (and from object-oriented data types to SQL data types), as well as providing data query and retrieval facilities. Hibernate is instance centric and builds graphs representing relationships between instances.

Inversion of Control and the Dependency Inversion Principle

Inversion of Control, also known as IOC, is an object-oriented programming principle that can be used to reduce coupling (the degree to which each program module relies on each other module) inherent in computer programs. IOC is also known as the Dependency Inversion Principle. In IOC, a class X depends on class Y if any of the following applies: 1) X has a Y and calls it; 2) X is a Y; or 3) X depends on some class Z that depends on Y (transitivity). It is worth noting that X depends on Y does not imply Y depends on X; if both happen to be true, it is called a cyclic dependency: X can't then be used without Y, and vice versa.

In practice, if an object x (of class X) calls methods of an object y (of class Y), then class X depends on Y. The dependency is inverted by introducing a third class, namely an interface class I that must contain all methods that x might call on y. Furthermore, Y must be changed such that it implements interface I. X and Y are now both dependent on interface I and class X no longer depends on class Y (presuming that x does not instantiate Y). This elimination of the dependency of class X on Y by introducing an interface I is said to be an inversion of control (or a dependency inversion). It must be noted that Y might depend on other classes. Before the transformation had been applied, X depended on Y and thus X depended indirectly on all classes that Y depends on. By applying inversion of control, all those indirect dependencies have been broken up as well. The newly introduced interface I depends on nothing.

The Spring Framework is an open source application framework for the Java platform that uses IOC and dependency inversion. Specifically, central in the Spring Framework is its Inversion of Control container that provides a means of configuring and managing Java objects. This container is also known as BeanFactory, ApplicationContext or Core container. Examples of the operations of this container are: creating objects, configuring objects, calling initialization methods and passing objects to registered callback objects. Objects that are created by the container are also called Managed Objects or Beans. Typically the container is configured by loading XML files that contain Bean definitions. These provide all information that is required to create objects. Once objects are created and configured without raising error conditions they become available for usage. Objects can be obtained by means of Dependency lookup or Dependency injection. Dependency lookup is a pattern where a caller asks the container object for an object with a specific name or of a specific type. Dependency injection is a pattern where the container passes objects by name to other objects, either via constructors, properties or factory methods. Thus, the Spring Framework is memory centric and builds graphs representing relationships between instances.

Graphing Tools

Javadoc™ is a tool that parses the declarations and documentation comments in a set of Java source files and produces a corresponding set of HTML pages describing (by default) the public and protected classes, nested classes (but not anonymous inner classes), interfaces, constructors, methods, and fields (Sun Microsystems®, Inc. of Santa Clara, Calif.). Javadoc can be used to generate the API (Application Programming Interface) documentation or the implementation documentation for a set of source files. Javadoc is class and method centric and builds graphs representing the relationships between the combination of classes and their methods.

Another system for designing software applications includes graphs of objects analyzed by an interpreter to represent and reproduce a computer application. This system utilizes prewritten programming classes stored in code libraries, which can be written to follow the design patterns described in "Design Patterns" by Gamma et al, Addison Wesley 1995, "Patterns in Java" by Grand, Wiley Computer Publishing 1998, and/or high level Computer Aided Software Engineering (CASE) tools. More specifically, some such classes are based on the Observer behavioral pattern. The prewritten code libraries represent application state nodes, processing logic, and data flow of the system between various application states (i.e., the pre-written data elements of the application), so that a user need not write, edit, or compile code when creating a software application. Instead, a user manually edits a software application in a Graphical User Interface by editing visual objects associated with a current application state node, such as data within the application state node or processes performed within the application state node. Then, based on the changes made by the user to the current application state node, the interpreter displays the updated application state to the user for the application state which has just been edited. The system may then transition along a user-defined transitional edge to another application state where the user may optionally edit the next application state or the transitional edge. Changes to a graph may be made to instances of the graph which are implemented by the interpreter while the software application is running.

This system for designing software applications may include visual representations of a running software application that can be made "usable" with an application controller. When a user changes visual objects, representing the running software application, the controller uses the input to induce the interpreter to make the change to the graph. The controller then waits for more changes. Further, visual representations of such software applications may be imported or exported as XML documents that describe the visual representation of the application, and thereby the software application.

In order to edit and/or create a software application, in the form of a visual representation of nodes, directed edges, and application states, an application program interface and an application editor may further be included in the system. Key words, and associated definitions, from the pre-written code libraries, enable application developers to manually define a software application, processing steps, as well as the visual representation of a software application by providing graphical representations, within an editor, of a graph application which closely correlates to the actual application structure. A user defines a new application through an "application definition wizard," which after certain preliminary matters are fulfilled, displays the new application as a graph component within the editor workspace. A user further interacts with an application by making selections from displayed lists of pre-created possible application components and dragging and dropping components onto the workspace using a PC's mouse and keyboard. A user may select components and "drag" them over existing components. When a new component is "dropped" on an existing component, the new component becomes a child of the existing component within an application graph. The relationships of components within the application are manually defined by the user's selections within the editor. Thus a tree structure representing an application is built by the user. As the application is created, a user can select an application navigator viewer to display a tree view of the constructed application making it possible to select and edit any component of the application. The editor interface processes user inputs and selections including creating or deleting application elements, updating component attributes, and updating display properties of an application.

The system described above, while utilizing visual representations of software applications, may also be used as a visual programming tool for defining and updating relational databases. The system utilizes XML descriptions of visual representation of software applications. A tool parses and interprets the XML descriptions to produces equivalent relational database table schemas, as well as changes thereto. When data is changed within a visual representation of a software application, a description of the change is stored along with other changes in a journal file and then processed as a group. An intermediate program (a java application operating on its own thread) performs transactions between the visual representation of the software application and the relational database. The java application polls (i.e., checks) the journal of changes to nodes of the visual representation (i.e., data in database), and if there are changes, makes the changes to the database. Thus, by altering data within the visual representation, the system updates a database. A similar application stands between the visual representation of the software application and the database to handles requests for data from the database.

Another system for analyzing software is called a Code Tree Analyzer (CTA). A CTA analyzes static source code written in an object-oriented programming language. The CTA generates a symbol table and a call tree from the static source code. Using the symbol table, the CTA generates a class diagram. Likewise, using the call tree, the CTA generates a sequence diagram. The class diagram illustrates the relationship between a user selected class and classes related to the user selected class. The sequence diagram illustrates the sequence in which different methods are called. Using both the class diagram and the sequence diagram, the CTA generates a design artifact representative of the static source code. When the user modifies the design artifact, the CTA identifies impacted portions of the source code using the sequence diagram. The design artifact is used for code maintenance and/or reverse engineering of the static source code.

BRIEF SUMMARY

A method and apparatus for producer graph oriented programming and execution are described. According to one aspect of the invention, a runtime is provided that interprets producer dependency declarations for methods. The producer dependency declarations identify at run time a set of zero or more producers, where a producer is a runtime instantiatable construct that includes at least an instance and a method associated with that instance. The runtime automatically generates and executes, responsive to receiving a designation of a producer of interest to be instantiated whose method has a producer dependency declaration, a producer graph. The producer graph initially includes the producer of interest and is generated, from the producer of interest to source producers, through instantiation of producers based on the producer dependency declarations of the methods of the producers already in the producer graph. The runtime sequences the execution of the producers in the producer graph as indicated by the producer graph.

BRIEF DESCRIPTION OF THE DRAWINGS

The invention may best be understood by referring to the following description and accompanying drawings that are used to illustrate embodiments of the invention. In the drawings:

FIG. 4A is a block diagram illustrating the discovery and building of an exemplary producer graph according to one embodiment of the invention;

FIG. 4B is a block diagram illustrating the initial execution of the producer graph of FIG. 4A according to one embodiment of the invention;

FIG. 4C is a block diagram illustrating the incremental execution of the producer graph of FIG. 4B according to one embodiment of the invention;

FIG. 5C is a block diagram illustrating the initial execution of the producer graph of FIG. 5A and/or the reexecution of the producer graph of FIG. 5B according to one embodiment of the invention;

FIG. 5D is a block diagram illustrating the initial execution of the producer graph of FIG. 5A and/or the reexecution of the producer graph of FIG. 5B or 5C according to one embodiment of the invention;

FIG. 7B is a block diagram of exemplary producers according to one embodiment of the invention;

FIG. 7D illustrates pseudo code of a producer dependency declaration for a method using a non-shortcut declared dependency according to one embodiment of the invention;

FIG. 7E is a block diagram of exemplary producers according to one embodiment of the invention;

FIG. 7F is a block diagram of an exemplary dependencies through use of a UpwardDependency with a dependency determination producer according to one embodiment of the invention;

FIG. 7G is a block diagram of possible exemplary dependencies through use of a WeaklyConstrainedDependency with a dependency determination producer according to one embodiment of the invention;

FIG. 8D illustrates another exemplary screenshot and usage of free cell selection with the configurable interactive producer output layout graphical user interface module 840 according to one embodiment of the invention;

FIG. 8F illustrates another exemplary screenshot and usage of table creation with the configurable interactive producer output layout graphical user interface module 840 according to one embodiment of the invention;

FIG. 9A is a block diagram illustrating a first scheme for distributing a runtime with producer graph oriented programming support according to one embodiment of the invention;

FIG. 9B is a block diagram illustrating a second scheme for distributing a runtime with producer graph oriented programming support according to one embodiment of the invention;

FIG. 9C is a block diagram illustrating a third scheme for distributing a runtime with producer graph oriented programming support according to one embodiment of the invention;

FIG. 11A is a block diagram of an example of the class tracking structure 1092 of FIG. 10 according to one embodiment of the invention;

FIG. 11B is a block diagram of an example of the instance tracking structure 1065 of FIG. 10 according to one embodiment of the invention;

FIG. 11C is a block diagram of an example of the producer graph(s) structure 1060 of FIG. 10 according to one embodiment of the invention;

FIG. 11D is a block diagram of an example of the method tracking structure 1058 of FIG. 10 according to one embodiment of the invention;

FIG. 13A illustrates pseudo code of producer dependency declarations for methods using a non-shortcut declared, non-dynamic (non-contingent, non-subscription) dependency according to one embodiment of the invention;

FIG. 13B is a block diagram of producers illustrating an exemplary non-shortcut declared, non-dynamic (non-contingent, non-subscription) producer dependency according to one embodiment of the invention;

FIG. 13C illustrates pseudo code of producer dependency declarations for methods using a non-shortcut declared, contingent, non-subscription producer dependency according to one embodiment of the invention;

FIG. 13D is a block diagram of producers illustrating an exemplary non-shortcut declared, contingent, non-subscription producer dependency according to one embodiment of the invention;

FIG. 13E illustrates pseudo code of producer dependency declarations for methods using both a non-shortcut declared, contingent, non-subscription producer dependency and a shortcut declared, contingent, non-subscription producer dependency according to one embodiment of the invention;

FIG. 13F is a block diagram of producers illustrating a non-shortcut declared, contingent, non-subscription producer dependency and a shortcut declared, contingent, non-subscription producer dependency according to one embodiment of the invention;

FIG. 13I illustrates pseudo code of producer dependency declarations for methods using a shortcut declared, non-dynamic (non-contingent, non-subscription) producer dependency according to one embodiment of the invention;

FIG. 13J is a block diagram of producers illustrating an exemplary shortcut declared, non-dynamic producer dependency according to one embodiment of the invention;

FIG. 14D illustrates the choice of a parent producer based upon a parent dependency determination producer created by a sticky subscription according to one embodiment of the invention;

FIG. 14E illustrates the choice of a parent producer based upon a parent dependency determination producer created by a child dependency determination producer, which child dependency determination producer is linked by a sequencing dependency, according to one embodiment of the invention;

FIG. 19 is a flow diagram for block 1630 of FIG. 16 according to one embodiment of the invention;

FIG. 20 is a flow diagram for blocks 1635 and 1670 of FIG. 16 according to one embodiment of the invention;

FIG. 21 is a flow diagram for overriding producers according to one embodiment of the invention;

FIG. 22A is a part of a flow diagram for execution of the current producer graph(s) according to one embodiment of the invention;

FIG. 24 is a flow diagram for block 2225 of FIG. 22 according to one embodiment of the invention; and FIG. 25 is a flow diagram for block 2260 of FIG. 22 according to one embodiment of the invention.

DETAILED DESCRIPTION

Figure 1A:
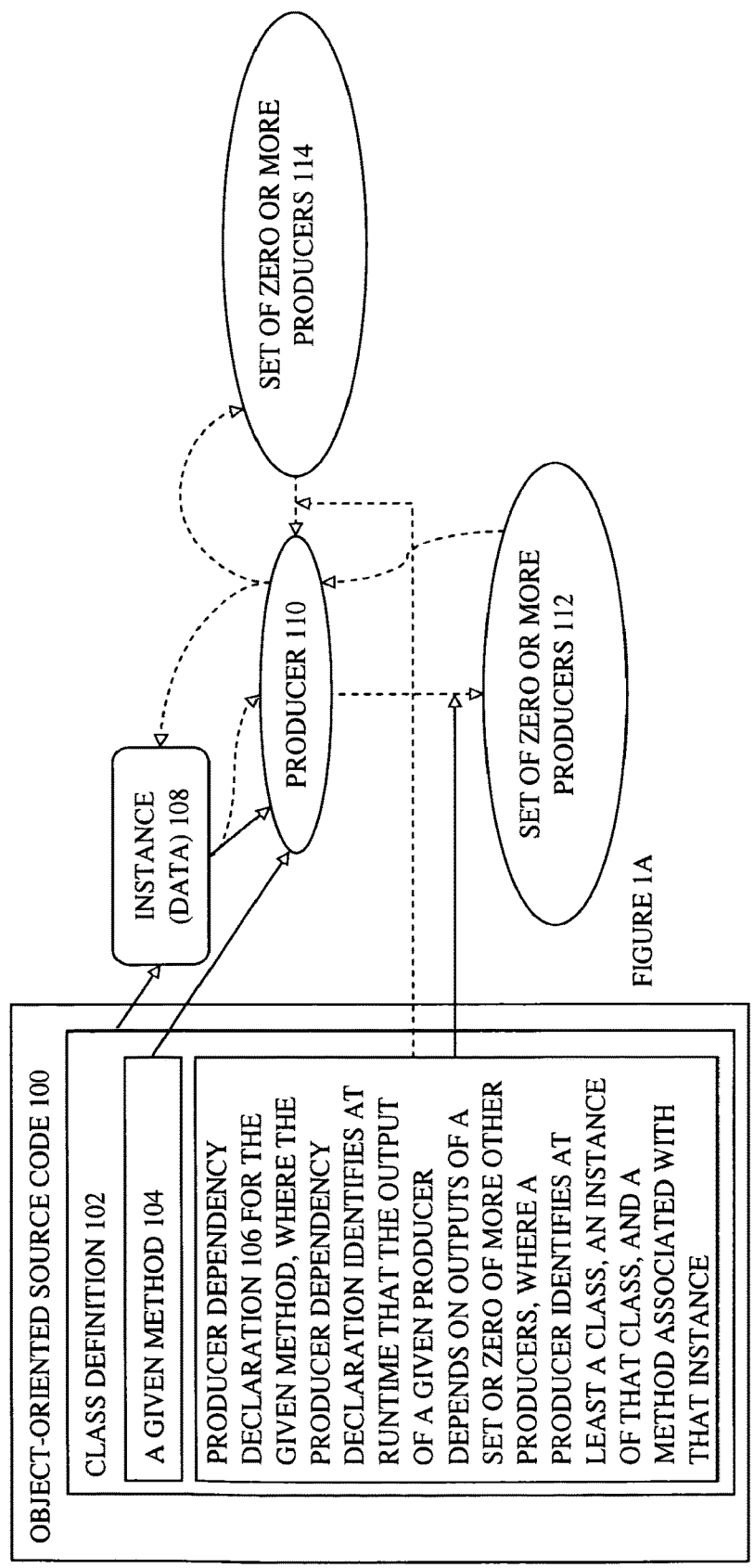
FIG. 1A is a block diagram illustrating the relationship of a producer dependency declaration for a method of a class in object oriented-source code to a producer that includes the class, a given instance of that class, and a method of that class, according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the invention. It will be appreciated, however, by one skilled in the art that the invention may be practiced without such specific details. In other instances, control structures, data structures, and full software instruction sequences have not been shown in detail in order not to obscure the invention. Those of ordinary skill in the art, with the included descriptions, will be able to implement appropriate functionality without undue experimentation.

Unless otherwise specified, dashed lines in the figures (with the exception of dashed dividing lines) are used to represent optional items in the figures. However, it should not be presumed that all optional items are shown using dashed lines, but rather those shown in dashed lines were chosen for a variety of reasons (e.g., they could be easily shown, to provide greater clarity, etc.).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other. "Coupled" may mean that two or more elements are in direct contact. However, "coupled" may also mean that two or more elements are not in direct contact with each other, but yet still co-operate or interact with each other.

In some cases, the operations of flow diagrams are described with reference to the exemplary embodiments of the other block diagrams. However, it should be understood that the operations of the flow diagrams can be performed by embodiments of the invention other than those discussed with reference to these other block diagrams, and that the embodiments of the invention discussed with reference to these other block diagrams can perform operations different than those discussed with reference to the flow diagrams.

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

Overview

According to one aspect of the invention, a producer is at least a specific instance (or object) and a specific method, such that if the producer is executed during run time, the specific method is executed on the specific instance. Thus, a given producer is instantiated from a given instance and a given method associated with that instance. Like classes, instances, and methods, producers are basic elements or constructs manipulated by the runtime. Thus, the instantiation of a producer is interpreted and tracked by the runtime, and thus the runtime tracks the combination of instances and methods represented by producers. In other words, a producer is a runtime instantiatable construct that is tracked by the runtime, that is executed by the runtime, and that includes at least an instance and a method associated with that instance, such that the runtimes execution of the producer results in the method of the producer being executed on the instance of the producer. Also, the method of a producer has associated with it a producer dependency declaration that identifies, with a set of zero or more producer dependencies, a set of zero or more producers for the given producer. Specifically, producer dependencies are declared for methods using producer dependency declarations, the producer dependency declaration for a given method may include zero or more producer dependencies, and each producer dependency identifies a set of zero or more producers. Thus, producer dependency declarations and the producer dependencies they define are interpreted and tracked by the runtime, and thus the runtime tracks the relationships between producers indicated by the producer dependency declarations.

Where a given producer is dependent on a set of one or more other producers, the runtime will ensure execution of the set of other producers prior to the given producer. Thus, the producer dependency declarations represent execution relationships between producers, while producers represent operations to be performed (methods) and instances. While in some embodiments of the invention allow dependencies of parent producers on child producers to be declared in the producer dependency declaration associated with the method of the parent producer (the producer dependency declaration of the parent producer identifies any child producers—referred to herein as downwardly declared), other embodiments of the invention also allow dependencies to be declared in the producer dependency declaration associated with the method(s) of child producer(s) (the producer dependency declaration of the child producer identifies one or more parent producers—referred to herein as upwardly declared).

In different embodiments of the invention a producer identifies additional things. For example, while in some embodiments of the invention a producer is at least an instance and method associated with that instance, in other embodiments of the invention a producer is a class, an instance of that class, and a method associated with that instance (e.g., a producer may directly include a class, instance, and method; a producer may directly include an instance and a method, while indirectly identifying a class of that instance through a reference (e.g., a reference in the instance)). While the invention may be used in the context of code written in different programming languages (e.g., object-oriented code written in a reflective object-oriented language; object-oriented code written in a reflective object-based language; code written in a procedural, non-reflective object-oriented, non-reflective object-based language and transformed into reflective object-oriented language code), embodiments of the invention will be described, by way of example and not limitation, with reference to reflective object-oriented programming languages and with reference to producers that directly include classes, instances and methods. Also, while in one embodiment of the invention the method of a producer is an instance method (a method that can use instance fields in addition to any inputs received as arguments), alternative embodiments of the invention may also or alternatively support the method of a producer being a class method (methods that receive all inputs as arguments and/or uses instance independent variables) (where the method of a producer is an instance method, the instance of that producer is an instance of a class; while where the method of a producer is a class method, the instance of that producer is a meta-class instance representing the class).

FIG. 1A is a block diagram illustrating the relationship of a producer dependency declaration for a method of a class in object oriented-source code to a producer that includes the class, a given instance of that class, and a method of that class, according to one embodiment of the invention. In FIG. 1A, object-oriented source code 100 is shown including a class 102, which in turn includes a method 104 and a producer dependency declaration 106 for the method 104. Of course, the class 102 would typically include one or more fields (not shown) and additional methods (not shown). In addition, the object-oriented source code 100 would typically include additional classes.

During run time, an instance 108 of the class 102 is instantiated. The instance 108 includes the data of the fields of the class 102. In addition, a producer 110 is instantiated, where the producer 110 identifies the class 102, the instance 108 of the class 102 (which has associated with it the method 104 of the class 102), and the method 104 of the class 102. The producer dependency declaration 106 identifies to the runtime a set of zero or more producers 112 (referred to as child producers of the producer 110) that must be executed before execution of the producer 110. In other words, the producer 110 depends on the set of zero or more producers 112. In addition to or instead of consuming outputs of the set of producer 112, the producer 110 may consume data of the instance 108. In addition, the producer 110 provides at least one output, which output may be internal to the instance 108 (and thus, modify the data of the instance 108) and/or may be external; either way, the output of the producer 110 may be consumed by a set or zero or more other producers 114 (referred to as parent producers of the producer 110)). As indicated previously, and described in more detail later herein, the producer dependency declaration 106, in some embodiments of the invention, may also identify to the runtime zero or more of the producers 114.

It should be understood that the inputs and outputs of producers are based on the inputs and outputs of the methods on which those producers are based. As such, these input and outputs may represent multiple parameters having a variety of data structures.

The producer dependency declaration for a given method identifies at run time the set of zero or more producers to be instantiated and executed. By way of example, where a producer dependency declaration (e.g., producer dependency declaration 106) for a given method (e.g., method 104) identifies a producer dependency on a given producer (which given producer identifies a first class, a first instance of that class, and a first method of that first class) (e.g., one of the set of producers 112), then the producer dependency declaration of the given method identifies to the runtime that the first instance is to be instantiated (if not already) and that the first method is to be used to instantiate the given producer for the first instance (in these examples, first does not mean location or order).

In operation, when, during run time, a given set of one or more producers are designated as being of interest and have producer dependencies declared for them, the runtime: 1) automatically generates (discovers, builds, and optionally resolves) a set of one or more graphs, which may be multi-level and may be of a variety of shapes (e.g., chain, tree), from the given set of producers designated as being of interest down to source producers based on the producer dependency declarations; and 2) sequences execution of producers of the set of graphs to generate the output(s) of the given set of producers designated as being of interest. Thus, the runtime uses the producer dependency declarations to determine what methods with what arguments to execute on what instances, and when for synchronization purposes.

Thus, producer dependencies represent the sequencing of execution of producers to the runtime. However, in addition to indicating the sequencing of execution, producer dependencies may represent different input to output relationships in different embodiments of the invention. For example, different embodiments of the invention may support one or more of argument producer dependencies, field producer dependencies, and sequencing only producer dependencies (sequencing only producer dependencies are referred to herein with the shorthand sequencing producer dependencies). While each of argument producer dependencies, field producer dependencies, and sequencing producer dependencies represent execution sequencing relationships between producers, argument and field producer dependencies additionally represent data of which the runtime is aware. Specifically, an argument producer dependency causes the runtime to map the output of a child producer as an input parameter to a parent producer, whereas a field producer dependency indicates use of a field of an instance. Regardless of the input to output relationship represented by a producer dependency, proper use of producer dependencies ensures that the producers accessing information are sequenced after the producers that impact that information.

Sequencing dependencies may be used for a variety of purposes, including ensuring the order of execution between producers that modify data in a manner of which the runtime is not aware and producers that consume that data (a child producer may write its outputs in a way that requires the method of the parent producer to include code to access that output (e.g., a method that impacts the environment by affecting an output that is not the regular producer output and, as such, that is not detected by the runtime—such as a method that sets a global variable, that sets a field in an instance which is not the producer output, that impacts an external data source, etc.)) Thus, a sequencing dependency reflects a dependency of a parent producer on a child producer, but requires outputs that need to be provided, if any, from one to the other occur through the writing of code (e.g., code in the method of the child producer to write an output to a given mechanism (such as set a global variable, impact an external data source, set a field of an instance which is not the producer output, etc.) and code in the method of the parent producer to read that output from the given mechanism). In this way, sequencing dependencies allow the runtime to synchronize execution of any parent producers that rely on an output that the runtime cannot detect.

In one embodiment of the invention the producer dependency declaration for a given method identifies only direct dependencies on producers (e.g., direct descendents (children), in contrast with indirect descendents (grand-children, great grand-children, etc.)). In such an embodiment, each producer dependency declaration provides only a single tier or layer of producers whose outputs may be used directly by a producer instantiated from the given method; leaving discovery/building/resolution of additional layers of the producer graph(s) to the runtime's processing of other producer dependency declarations.

Exemplary Keys

A producer can be viewed as a set of multiple identifiers, one identifier for each additional level of granularity specified (class, instance, method, etc.). In addition, some embodiments of the invention implement each identifier as a separate key, while other embodiments have certain identifiers share a key. By way of example, some embodiments of the invention implement a producer as a class, instance, and method triplet and implement keys, such that each part of the triplet is identified by a separate key (a class key, instance key, and method key) and the producer is identified by the combination of the class key, instance key, and method key (the producer key).

Embodiments of the invention that use keys may vary in the uniqueness of the keys used. For example, in one embodiment of the invention, each class key is unique, each instance key is unique across all instances of all classes, and each method key is unique across all methods of all classes. As another example, in other embodiments of the invention, each class has a unique key, each instance of a given class has a unique key (across the class instances), and each method of a class has a unique key (across the class methods); but instances of different classes may have the same instance key, and methods of different classes may have the same method key; this later approach will be used in the remainder of the document by way of example and not limitation. For example, assume a first class includes methods and has a key for each of these methods that is unique within the first class, then the instances of this class (which will each have a unique key as to each other) have the same method keys associated with them. As another example, assume a different second class includes methods (be some, all, or none the same as the methods of the first class) that have the same method keys as those used for the first class; as such, an instance of this different class may have associated with it the same method keys as associated with an instance of the first class.

The use of keys allow for a variety of features, including: 1) the tracking of each entity identified by a producer's identifiers (e.g., the tracking of each class, instance, and method); 2) several parent producers (unaware of their mutual existence) to connect to the same child producer based on their producer dependency declarations (which specify producer dependencies using the producer keys); etc. In one embodiment of the invention, the instance key is an instance of a class (InstanceKey) holding two elements: an instance key nature indicating if the key identifier is a reference to the instance or another object (such as a string), and a key identifier which can either be a reference to the instance, or another object (such as a string). The storing of an instance reference in the instance key spares the programmer from inventing a name to identify these instances.

Exemplary Relationships

In the context of the above discussion regarding a producer being viewed as a set of multiple identifiers (with one identifier for each additional level of granularity specified), in one embodiment of the invention the various supported relationships between a producer and its children and parents are those in which at least one such identifier is different between a producer and its set of zero or more parent producers and one such identifier is different between a producer and each of its set of zero or more child producers. By way of providing some exemplary relationships, assume that a first producer is instantiated, where the first producer is a first instance of a first class and a first method of that first class, and assume that the producer dependency declaration for that first method identifies at run time a second producer as a child, then the second producer may be: 1) the first instance of the first class and a second method of that first class; 2) a second instance of the first class and a second method of that first class; 3) a second instance of the first class and the first method of the first class; or 4) an instance of a second class and a method of that second class. In such case, the first producer is dependent on the second producer—thus, representing an input to output relationship of the first producer on the second producer. Various relationships and combinations of those relationships are described below for one embodiment of the invention that uses an object-oriented language and in which a producer identifies at least a class, instance, and method.

Figure 1B:
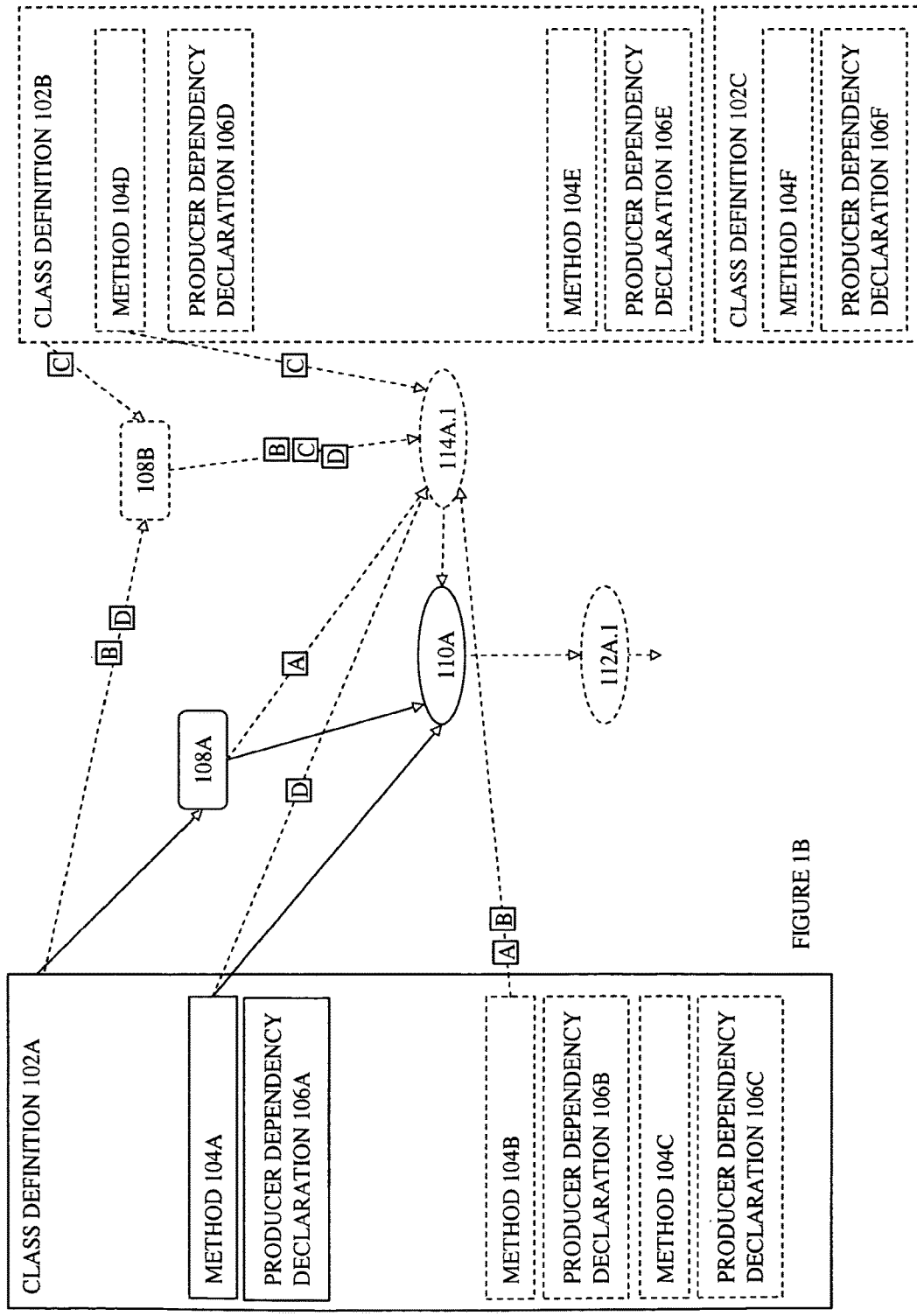
FIG. 1B illustrates exemplary relationships between the producer 110A and the parent producer 114A.1 according to one embodiment of the invention.
Figure 1C:
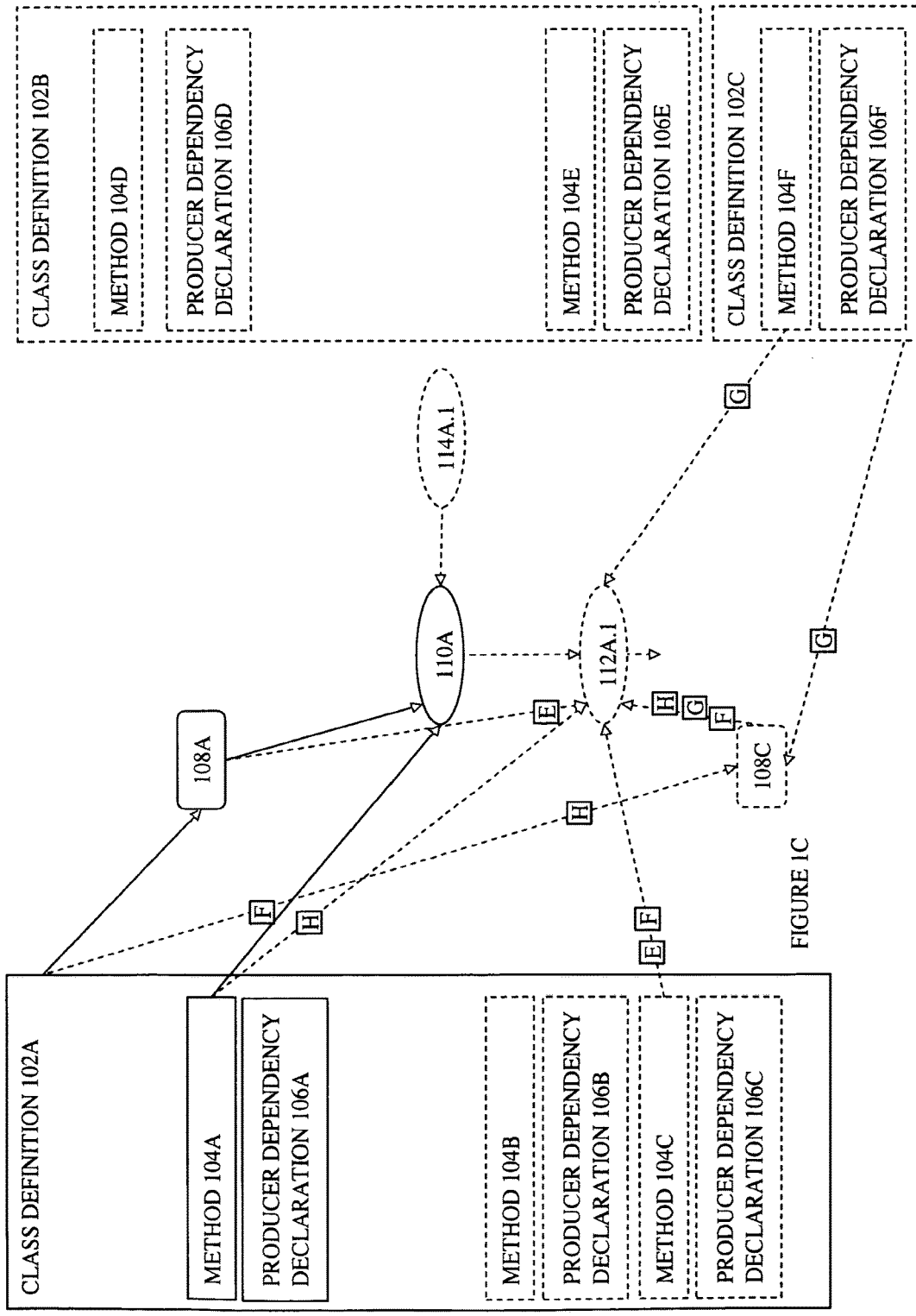
FIG. 1C illustrates exemplary relationships between the producer 110A and the child producer 112A.1 according to one embodiment of the invention.
Figure 1D:
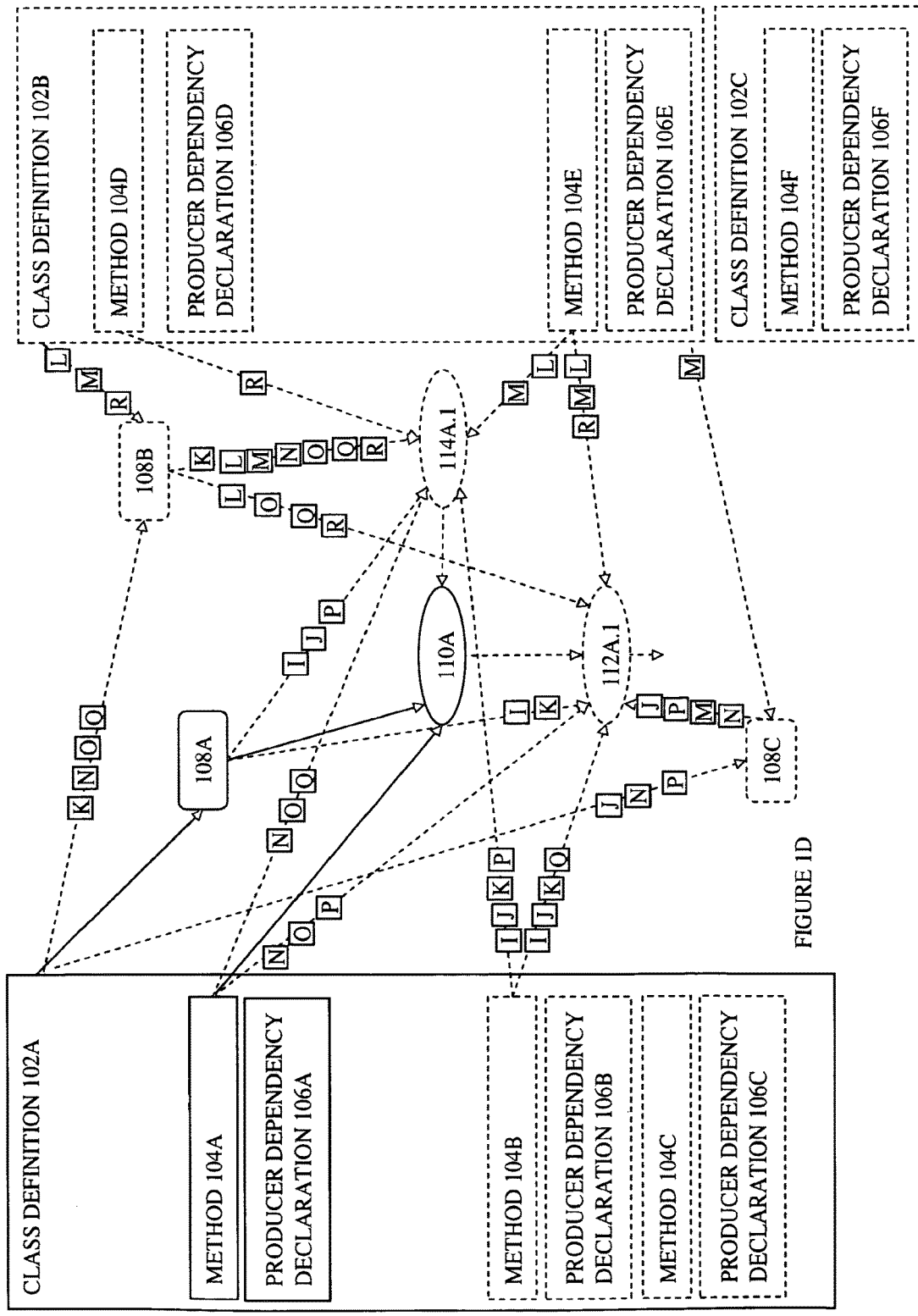
FIG. 1D illustrates some additional exemplary combinations of relationships of parent producers 114 and child producers 112 to producer 110A according to one embodiment of the invention.

FIGS. 1B-1D illustrate exemplary relationships between a given producer, its set of parent producers, and its set of child producers according to one embodiment of the invention. FIGS. 1B-1D each show the following: 1) a class definition 102A including methods 104A-C and producer dependency declarations 106A-C for each of those methods, respectively; 2) a class definition 102B including methods 104D-E and producer dependency declarations 106D-E for each of those methods, respectively; 3) a class definition 102C including method 104F and producer dependency declaration 106F for that method; 4) an instance 108A of the class 102A; 5) a producer 110A that identifies the class 102A, the instance 108A, and the method 104A; and 6) a producer 112A.1 and a producer 114A.1 respectively representing one of the set of producers 112 and 114. Dashed lines with boxed letters on them are used in FIGS. 1B-1D to illustrate the exemplary relationships. Thus, the collection of dashed lines with a boxed A on them represent one relationship. The relationships in FIG. 1B are combinable with the relationships in FIG. 1C; as such, these combinations represent combinations of relationships between parent producers 114A and child producers 112A to producer 110A. Further, FIG. 1D illustrates some additional exemplary combinations of relationships between parent producers 114A and child producers 112A to producer 110A.

FIG. 1B illustrates exemplary relationships between the producer 110A and the parent producer 114A.1 according to one embodiment of the invention. FIG. 1B additionally includes an instance 108B. The set of producers 114 is identified by other producer dependency declarations of different method(s) of the same class, different instances of the same class, and/or method(s) of a different class; and thus, each of the set of producers 114 may be: 1) of the same instance as the producer 110A (instance 108A of class 102A) and a different method associated with that instance (illustrated by the boxed A on the dashed lines from the instance 108A to the producer 114A.1 and from the method 104B to the producer 114A.1); 2) of a different instance of the class 102A and a different method associated with that instance (illustrated by the boxed B on the dashed lines from the class 102A to the instance 108B, from the instance 108B to the producer 114A.1, and from the method 104B to the producer 114A.1); 3) of an instance of a different class and a method associated with that instance (illustrated by the boxed C on the dashed lines from the class 102B to the instance 108B, from the instance 108B to the producer 114A.1, and from the method 104D to the producer 114A.1); or 4) of a different instance of class 102A (than instance 108A) and the same method (method 104A) of that instance (e.g., with a contingent dependency—described later herein) (illustrated by the boxed D on the dashed lines from the class 102A to the instance 108B, from the instance 108B to the producer 114A.1, and from the method 104A to the producer 114A.1); further, where there are multiple producers in the set of producers 114, the producers 114 themselves may be part of the same instance of the class 102A, different instances of the class 102A, an instance of a different class, and/or a mixture of the above.

FIG. 1C illustrates exemplary relationships between the producer 110A and the child producer 112A.1 according to one embodiment of the invention. FIG. 1C additionally includes an instance 108C. Each of the set of producers 112A may be: 1) of the same instance as the producer 110A (instance 108A of class 102A) and a different method associated with that instance (illustrated by the boxed E on the dashed lines from the instance 108A to the producer 112A.1 and from the method 104C to the producer 112A.1); 2) of a different instance of the class 102A and a different method associated with that instance (illustrated by the boxed F on the dashed lines from the class 102A to the instance 108C, from the instance 108C to the producer 112A.1, and from the method 104C to the producer 112A.1); 3) of an instance of a different class and a method associated with that instance (illustrated by the boxed G on the dashed lines from the class 102C to the instance 108C, from the instance 108C to the producer 112A.1, and from the method 104F to the producer 112A.1); or 4) of a different instance of class 102A (than instance 108) and the same method (method 104A) of that instance (e.g., with a contingent dependency described later herein) (illustrated by the boxed H on the dashed lines from the class 102A to the instance 108C, from the instance 108C to the producer 112A.1, and from the method 104A to the producer 112A.1). Thus, each of the set of producers 112A may be of the same instance as the producer 110A, of a different instance of the class 102A, or an instance of a different class; further, where there are multiple producers in the set of producers 112A, the producers 112A themselves may be part of the same instance of the class 102A, different instances of the class 102A, the same instance of a different class, different instances of a different class, and/or a mixture of the above.

FIG. 1D illustrates some additional exemplary combinations of relationships of parent producers 114 and child producers 112 to producer 110A according to one embodiment of the invention. FIG. 1D additionally includes the instance 108B and the instance 108C. The combinations of FIG. 1D are shown in Table 1 below:

TABLE 1

| Boxed Letter | Dashed Lines For Parent Producer 114A.1 from | Dashed Lines For Child Producer 112A.1 from |
| --- | --- | --- |
| I | From instance 108A to producer 114A.1 and from method 104B to producer 114A.1 | From instance 108A to producer 112A.1 and from method 104B to producer 112A.1 |
| J | From instance 108A to producer 114A.1 and from method 104B to producer 114A.1 | From class 102A to instance 108C, from instance 108C to producer 112A.1, and from method 104B to producer 112A.1 |
| K | From class 102A to instance 108B, from instance 108B to producer 114A.1, and from method 104B to producer 114A.1 | From instance 108A to producer 112A.1 and from method 104B to producer 112A.1 |
| L | From class 102B to instance 108B, from instance 108B to producer 114A.1, and from method 104E to producer 114A.1 | From class 102B to instance 108B, from instance 108B to producer 112A.1, and from method 104E to producer 112A.1 |
| M | From class 102B to instance 108B, from instance 108B to producer 114A.1, and from | From class 102B to instance 108C, from instance 108C to producer 112A.1, and from |

TABLE 1-continued

| Boxed Letter | Dashed Lines For Parent Producer 114A.1 from | Dashed Lines For Child Producer 112A.1 from |
|---|---|---|
| | method 104E to producer 114A.1 | method 104E to producer 112A.1 |
| N | From class 102A to instance 108B, from instance 108B to producer 114A.1, and from method 104A to producer 114A.1 | From class 102A to instance 108C, from instance 108C to producer 112A.1, and from method 104A to producer 112A.1 |
| O | From class 102A to instance 108B, from instance 108B to producer 114A.1, and from method 104A to producer 114A.1 | From class 102A to instance 108B, from instance 108B to producer 112A.1, and from method 104A to producer 112A.1 |
| P | From instance 108A to producer 114A.1 and from method 104B to producer 114A.1 | From class 102A to instance 108C, from instance 108C to producer 112A.1, and from method 104A to producer 112A.1 |
| Q | From class 102A to instance 108B, from instance 108B to producer 114A.1, and from method 104A to producer 114A.1 | From class 102A to instance 108B, from instance 108B to producer 112A.1, and from method 104B to producer 112A.1 |
| R | From class 102B to instance 108B, from instance 108B to producer 114A.1, and from method 104D to producer 114A.1 | From class 102B to instance 108B, from instance 108B to producer 112A.1, and from method 104E to producer 112A.1 |

Figure 1E:
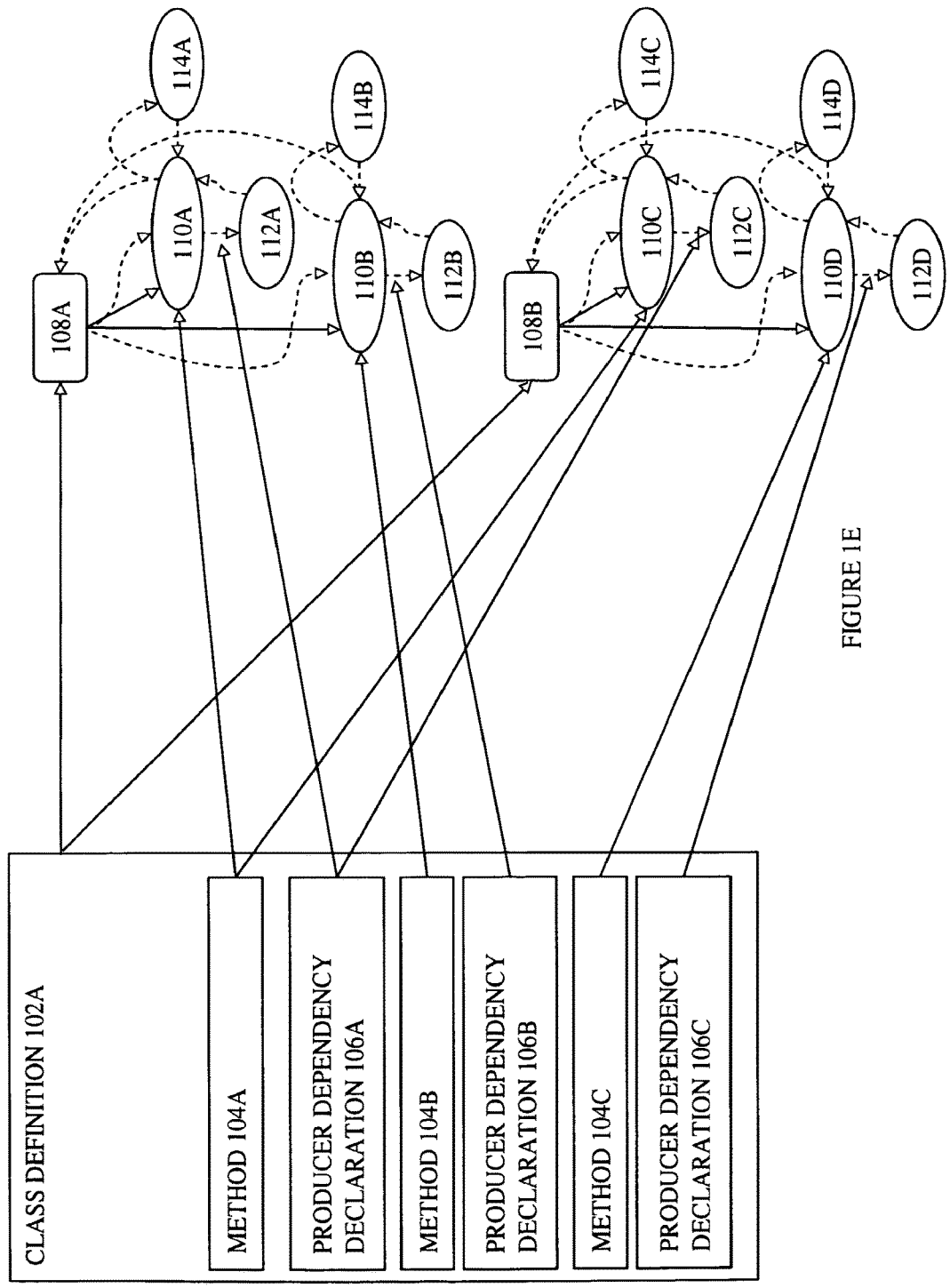
FIG. 1E illustrates that different instances of the same class can have producers based on the same and/or different methods according to one embodiment of the invention.

FIG. 1E illustrates that different instances of the same class can have producers based on the same and/or different methods according to one embodiment of the invention. FIG. 1E shows: 1) the class definition 102A including methods 104A-C and producer dependency declarations 106A-C for each of those methods, respectively; 2) the instance 108A and the instance 108B being of class 102A; 3) a producer 110A is the method 104A of the instance 108A of the class 102A; 4) a producer 110B is the method 104B of the instance 108A of the class 102A; 5) a producer 110C is the method 104A of the instance 108B of the class 102A; and 6) a producer 110D is the method 104C of the instance 108B of the class 102A. In addition, FIG. 1D shows that: 1) the producer dependency declaration 106A for method 104A identifies at run time the child producers of both the producer 110A and the producer 110C; 2) the producer dependency declaration 106B for method 104B identifies at run time the child producer of producer 110B; and 3) the producer dependency declaration 106C for method 104C identifies at run time the child producer of producer 110D.

Exemplary Runtimes

Figure 2:
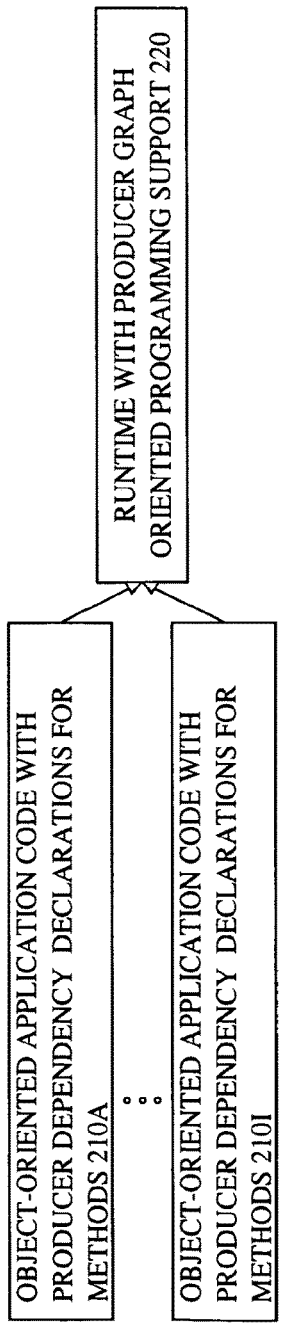
FIG. 2 is a block diagram illustrating the reusability of a runtime with producer graph oriented programming support according to one embodiment of the invention.

FIG. 2 is a block diagram illustrating the reusability of a runtime with producer graph oriented programming support according to one embodiment of the invention. In FIG. 2, multiple object-oriented application programs (object-oriented application code with producer dependency declarations 210A-I) are run by the same runtime with producer graph oriented programming support 220.

Figure 3A:
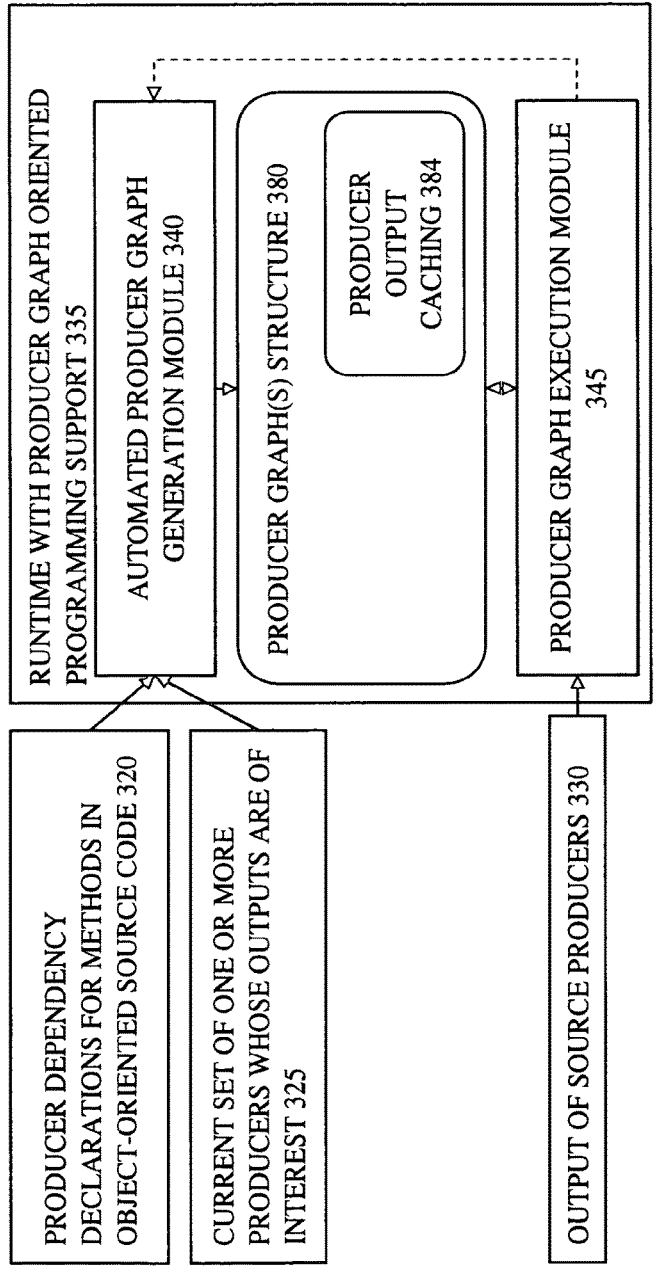
FIG. 3A is a block diagram illustrating a runtime with producer graph oriented programming support according to one embodiment of the invention.

FIG. 3A is a block diagram illustrating a runtime with producer graph oriented programming support according to one embodiment of the invention. In FIG. 3A, a runtime with producer graph oriented programming support 335 includes an automated producer graph generation module 340 and a producer graph execution module 345. In addition, the runtime 335 is to execute object-oriented source code, and thus includes additional modules not shown.

In addition, FIG. 3A shows producer dependency declarations for methods in object-oriented source code 320, a current set of one or more producers whose outputs are of interest 325 (also referred to here as the currently selected producers of interest), and the outputs of source producers 330 (described later herein). The automated producer graph generation module 340 receives the producer dependency declarations 320 and the current set of producers of interest 325.

The automated producer graph generation module 340 attempts to discover, based on the producer dependency declarations, child producers with outputs that contribute directly and indirectly to the input of the currently selected producers of interest (and in some embodiments of the invention that support upwardly declared dependencies, parent producers), and builds a set of one or more current graphs of producers representing the dependency of these producers on each other from the currently selected producers of interest, through any discovered producers that are non-source producers, to those of the discovered producers that are source producers. The current producer graphs(s) are stored in the producer graph(s) structure 380. While embodiments of the invention may store and manipulate the producer graph(s) as a collection of graphs, other embodiments of the invention stores and manipulates the producer graph(s) as a collection of producers that are linked to each other to form graph(s) (as opposed to a collection of graphs) to facilitate merging and splitting of producer graphs. By way of example and not limitation, embodiments of the invention which store and manipulate the producer graph(s) as a collection of producers are described herein.

The producer graph execution module 345 receives the current producer graph(s) from the automated producer graph generation module 340 and the outputs of source producers 330, and executes the producers of the current producer graph(s) to determine the current output of the currently selected producers of interest. The producer graph execution module 345 caches the current outputs of the producers in the producer graph(s) structure 380 as illustrated by the producer output caching 384.

The caching of producer outputs of the producer graph during execution allows for synchronization. For instance, the appropriate time to execute a parent producer that is dependent on multiple child producers is after all of the multiple child producers have been executed; in other words, it would be wasteful (and, in some cases, not possible) to execute the parent producer each time one of its child producers completed execution. The caching of the producer outputs allows for the execution of the parent producer to not only be postponed until all its child producers have been executed, it also allows for a determination of the appropriate time for the execution of the parent producer—when all of the child producers have been executed and their outputs have been cached. Thus, the runtime makes this synchronization decision for the programmer by checking the execution status of its child producers; in other words, such synchronization is automated (the programmer need not include separate source code that determines the appropriate time to identify an instance and execute a given method associated with that instance on that instance). By way of another example, where several parent producers are dependent on the same child producer as well as on other different child producers, the appropriate time to execute each of the several parent producers is typically different; the runtime automatically determines the appropriate time to execute each of the several parent producers depending on the availability of the outputs of its set of child producers.

As will be described in more detail later herein, since some parts of a producer graph may not be currently discoverable due to dynamic producer dependencies, the automated producer graph generation module 340 "attempts" to discover and build the entire producer graph, but may not initially be able to complete the entire producer graph until some producers are executed. As such, the producer graph execution module 345 may invoke the automated producer graph generation module 340 with needed producer outputs during execution of the current producer graph to complete any unresolved remainders of the current producer graph (this is illustrated in FIG. 3A by a dashed arrowed line from the producer graph execution module 345 to the automated producer graph generation module 340; a dashed arrowed line is used because such support is optional).

FIG. 4A is a block diagram illustrating the discovery and building of an exemplary producer graph according to one embodiment of the invention. FIG. 4A shows that the current set of producers of interest consists of producer 1. Based upon producer 1 and its producer dependency declaration, producer 2 and producer 3 are discovered. In other words, the producer dependency declaration for producer 1 identifies that the input to producer 1 requires execution of producer 2 and producer 3. As such, producer 1 is a dependent producer (a producer that has one or more producer dependencies). FIG. 4A also shows that while producer 3 is an independent producer (a producer that has no producer dependencies, and thus is a source producer), producer 2 is not. As a result, based upon the producer dependency declaration of producer 2, producer 4 and producer 5 are discovered. In FIG. 2A, producer 4 and producer 5 are independent producers (and thus, source producers).

FIG. 4B is a block diagram illustrating the initial execution of the producer graph of FIG. 4A according to one embodiment of the invention. In FIG. 4B, curved arrowed lines illustrate the execution of one producer to generate an output that is provided as the input to another producer. As shown in FIG. 3A, the output of the source producers 330 are provided to the producer graph execution module 345; in contrast, the outputs of the dependent producers 1-2 are determined by execution of those producers as shown in FIG. 4B. Thus, in FIG. 4B, the following occurs: 1) the output of source producer 4 and source producer 5 are provided to dependent producer 2; 2) dependent producer 2 is executed; 3) the outputs of dependent producer 2 and source producer 3 are provided to producer 1; and 4) producer 1 is executed and its output is provided as the current output of interest. It is worth noting that the producer graph of FIG. 4B is data driven in the sense that data flows from one producer to another producer up the graph.

Thus, the producer dependency declarations 320 bound the possible producer graphs that may be generated; while the currently selected set of producers of interest 325 identify the beginning node(s) of the current producer graph to be generated. From these two, the automated producer graph generation module 340 discovers and builds the producer graph. The discovery and building is automated in that the automated producer graph generation module 340 is not provided the producer graph (e.g., it does not need to be manually identified by a programmer) or even a list of the producers that will be in the producer graph. Rather, the automated producer graph generation module 340 parses the producer dependency declaration(s) of the current selected set of producers of interest to discover their child producers (and in some embodiments of the invention that support upwardly declared dependencies, parent producers), then parses the producer dependency declarations of those discovered producers, and so on down to the source producers (in some embodiments of the invention described later herein, this may be done with the assistance of the producer graph execution module 345). In the case where the producer graph is a tree, a currently selected producer of interest will typically be the root node, and the producer dependency declarations will be parsed until the leaf nodes (source producers) are discovered.

Overridden Producers and Incremental Execution

Figure 3B:
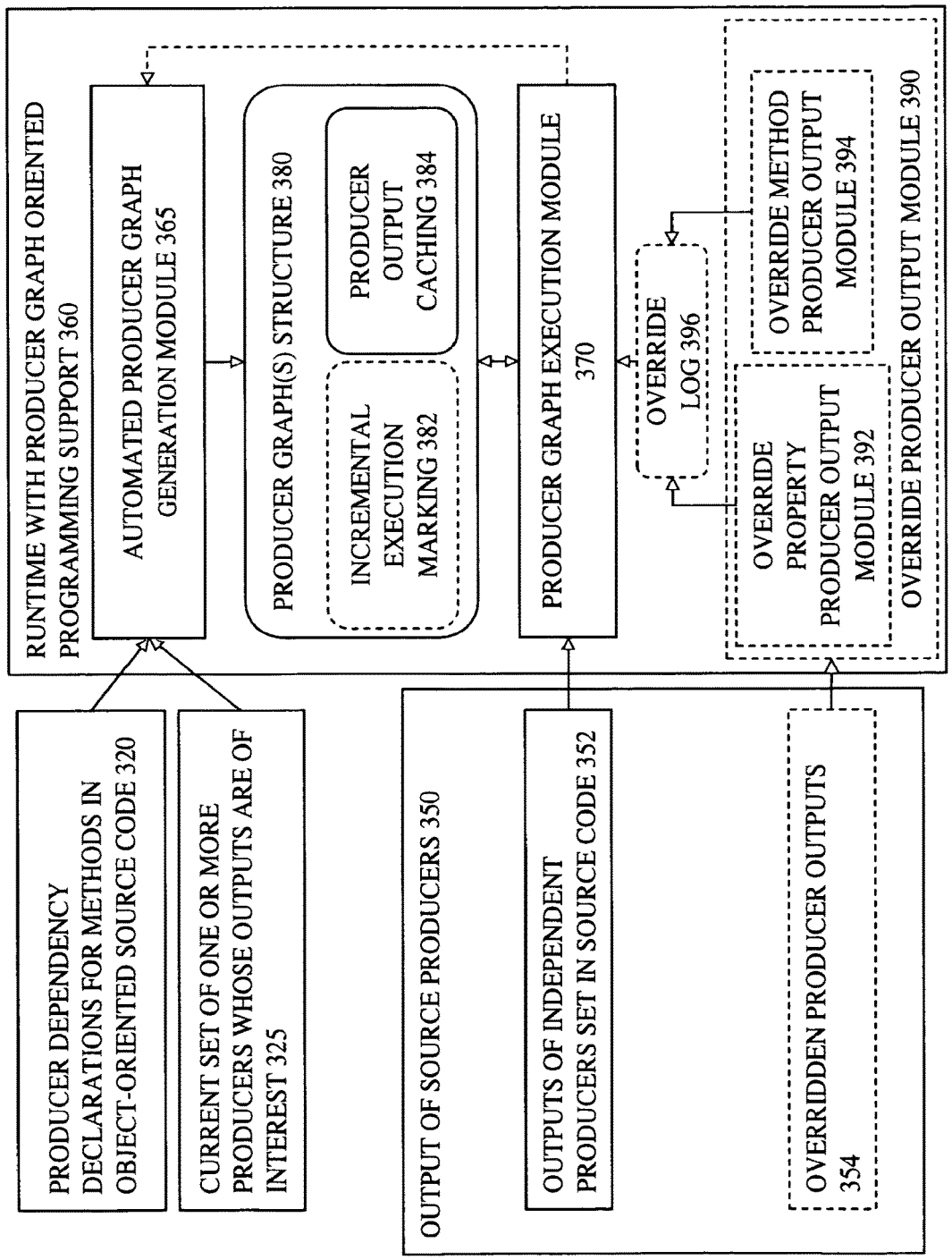
FIG. 3B is a block diagram illustrating a runtime with producer graph oriented programming support that also supports incremental execution and overridden producer outputs according to one embodiment of the invention.

FIG. 3B is a block diagram illustrating a runtime with producer graph oriented programming support that also supports incremental execution and overridden producer outputs according to one embodiment of the invention. It should be understood that incremental execution and overridden producer outputs are each independent optional features, and thus different embodiments of the invention may implement one or both.

In FIG. 3B, a runtime with producer graph oriented programming support 360 includes an automated producer graph generation module 365, a producer graph execution module 370, and an override producer output module 390. The runtime 360 is to execute object-oriented source code, and thus includes additional modules not shown.

In addition, FIG. 3B shows the producer dependency declarations for methods in object-oriented source code 320, the current set of one or more producers whose outputs are of interest 325 (also referred to herein as the currently selected producers of interest), and the output of source producers 350. The output of source producers 350 includes the outputs of independent producers set in the source code 352 (e.g., constants, default values, etc.) and the currently overridden producer outputs 354 (the outputs of the independent producers and/or dependent producers whose outputs are currently overridden).

In some embodiments of the invention, the outputs of producers may be explicitly overridden with a currently provided value (i.e., rather than executing a producer to determine its output value based on its current inputs, the output value for the producer is explicitly provided). In addition to any independent producers of a producer graph, the source producers of a producer graph include any currently overridden producers.

The override producer output module 390 receives the overridden producer outputs 354 (which identify which producers are being overridden and what output values they are being overridden with). In one embodiment of the invention, producers can be classified as property producers or method producers. Property producers are those based on property methods (e.g., get and set). Method producers are those based on non-property methods. The override producer output module 390 includes an override property producer output module 392 for overridden property producers and an override method producer output module 394 for overridden method producers. The override property producer output module 392 causes the overridden value to be stored in the producer output caching 384 and in the data of the instance, whereas the override method producer output module 394 causes the overridden value to be stored in the producer output caching 384. Depending on the embodiment of the invention, this causation may be direct or indirect. FIG. 3B illustrates an indirect causation through the use of an override log 396 which collects the output of the override producer output module 390 and which is consumed by the producer graph execution module 370. For optimization purposes, the override log 396 allows for the delaying of overrides in order to collect multiple overrides for batch processing.

Similar to the automated producer graph generation module 340, the automated producer graph generation module 365: 1) receives the producer dependency declarations 320 and the current set of producers of interest 325; and 2) attempts to discover, based on the producer dependency declarations, child producers with outputs that contribute directly and indirectly to the input of the currently selected producers of interest (and in some embodiments of the invention that support upwardly declared dependencies, parent producers), and builds a set of one or more current graphs of producers representing the input dependency of these producers on each other from the currently selected producers of interest, through any discovered non-source producers, to those of the discovered producers that are source producers (independent producers and currently overridden producers). The producer graphs(s) are stored in the producer graph(s) structure 380.

Similar to the producer graph execution module 345, the producer graph execution module 370 receives the current producer graph from the automated graph module 365 and the outputs of source producers 350, and executes the producers of the current producer graph to determine the current output of the currently selected producers of interest. The producer graph execution module 370 caches the current outputs of the producers in the producer graph structure 380 as illustrated by the producer output caching 384.

As previously described, the caching of producer outputs during execution allows for synchronization (e.g., separate source code need not be written to determine when producer 2 of FIG. 4B should be executed, but rather the runtime makes this synchronization decision for the programmer by checking the availability of the needed outputs in the producer output caching 384; in other words, such synchronization is automated). In addition, this producer output caching 384 is used for incremental execution. More specifically, after a producer graph has been initially generated and executed, the overriding of a producer in the current producer graph requires some level of reexecution. While some embodiments of the invention simply reexecute the entire graph, alternative embodiments of the invention support incremental execution (reexecuting only those parts of the producer graph that are affected by the override). Some exemplary embodiments that support incremental execution use incremental execution marking 382 in the producer graph(s) structure 380 to help determine which producers require reexecution. Thus, maintaining the producer graph(s) refers to modifying the links of the producer graph(s) as necessary across multiple executions to keep them current (up-to-date), whereas incremental execution refers to both maintaining the producer graph(s) and using the current (up-to-date) producer graph(s) to reexecute only those parts of the producer graph(s) that are affected by an override.

Similar to FIG. 3A, there is a dashed arrowed line from the producer graph execution module 370 to the automated producer graph execution module 365 to represent optional support for dynamic dependencies. It should be noted that dynamic dependencies may change during reexecution of a producer graph.

FIG. 4C is a block diagram illustrating the incremental execution of the producer graph of FIG. 4B according to one embodiment of the invention. In FIG. 4C, the output of producer 5 has been explicitly modified, but the outputs of producer 3 and producer 4 have not. Based upon the tracking of output to input dependencies in the producer graph and that only the output of producer 5 has been explicitly modified, it is determined that only producer 2 and producer 1 are affected by this modification. As a result, the determination of an updated output of producer 1 requires only the reexecution of producer 2 and producer 1 with the new output of producer 5 and the prior outputs of producer 4 and producer 3. This partial reexecution of the producer graph is illustrated in FIG. 4C by curved arrowed lines from producer 5 to producer 2 and from producer 2 to producer 1, but not from producer 4 to producer 2 or from producer 3 to producer 1. The lack of curved arrowed lines from producer 4 to producer 2 and from producer 3 to producer 1 are not to indicate that the outputs of producer 3 and producer 4 are not needed, but rather that producer 3 and producer 4 need not be reexecuted if their prior output is available. (e.g., cached from the prior execution of the producer graph).

The relatively simple example of FIG. 4C illustrates that there can be a savings in processing resources as a result of incremental execution. Such savings depend on a number of factors (e.g., the number of producers that do not need to be reexecuted, the amount of processing those producers would have required, etc.). While one embodiment of the invention is illustrated that performs incremental execution, alternative embodiments may be implemented differently (e.g., an alternative embodiment may reexecute all producers responsive to a modification).

Figure 4D:
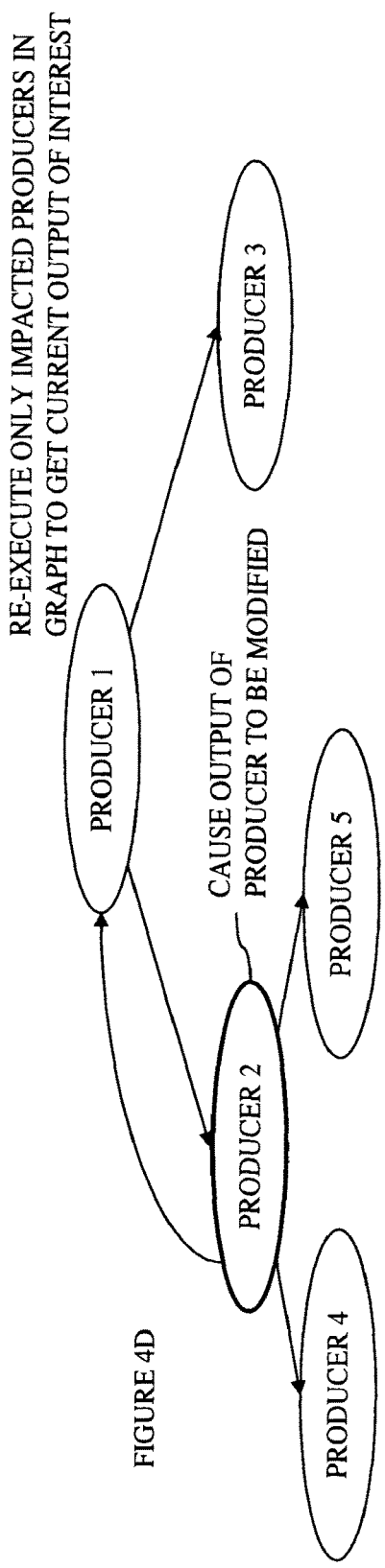
FIG. 4D is a block diagram illustrating the incremental execution of the producer graph of FIG. 4B after dependent producer 2 has been overridden according to one embodiment of the invention.

FIG. 4D is a block diagram illustrating the incremental execution of the producer graph of FIG. 4B after dependent producer 2 has been overridden according to one embodiment of the invention. In FIG. 4D, the output of producer 2 has been explicitly modified, but the output of producer 3 has not. Based upon the producer graph and that only the output of producer 2 has been explicitly modified, it is determined that only producer 1 is affected by this modification. As a result, the determination of an updated output of producer 1 requires only the reexecution of producer 1 with the overridden output of producer 2 and the prior output of producer 3. This partial reexecution of the producer graph is illustrated in FIG. 4D by a curved arrowed line from producer 2 to producer 1, but not from producer 4 and 5 to producer 2 or from producer 3 to producer 1.

Figure 4E:
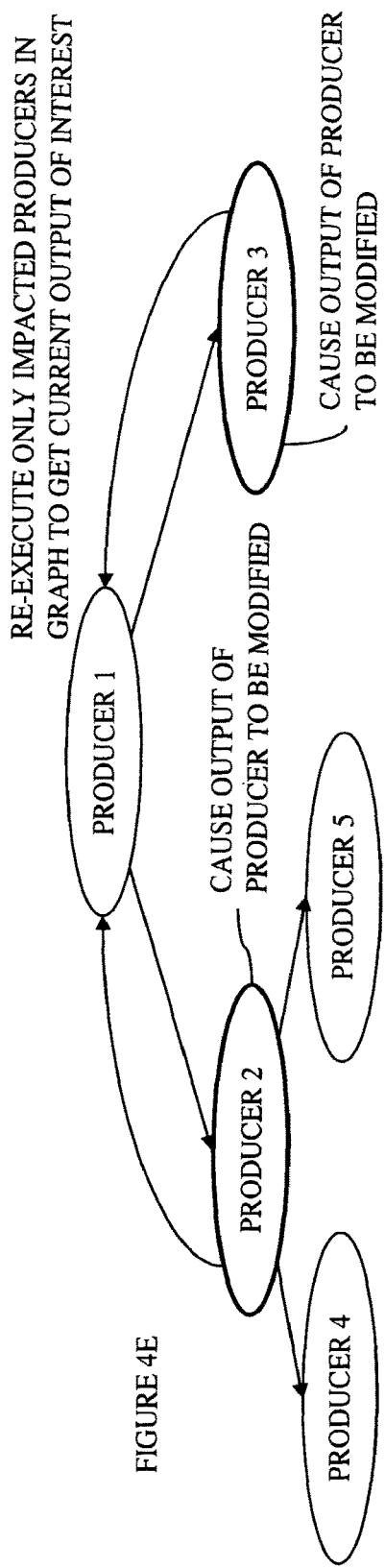
FIG. 4E is a block diagram illustrating the incremental execution of the producer graph of FIG. 4B after dependent producer 2 has been overridden and independent source producer 3 has been modified according to one embodiment of the invention.

FIG. 4E is a block diagram illustrating the incremental execution of the producer graph of FIG. 4B after dependent producer 2 has been overridden and independent source producer 3 has been modified according to one embodiment of the invention. Based upon the producer graph and that only the outputs of producer 2 and producer 3 have been modified, it is determined that only producer 1 is affected by this modification. As a result, the determination of an updated output of producer 1 requires only the reexecution of producer 1 with the overridden output of producer 2 and the modified output of producer 3. This partial reexecution of the producer graph is illustrated in FIG. 4E by a curved arrowed line from producers 2 and 3 to producer 1, but not from producers 4 and 5 to producer 2.

While one embodiment of the invention that supports overriding producer outputs also supports unoverriding producer outputs, alternative embodiments of the invention do not. While one embodiment of the invention that supports unoverriding producers leaves an overridden producer overridden until it is specifically unoverridden, alternative embodiments of the invention may be implemented differently (e.g., unoverriding an overridden producer when one of its progeny is overridden).

Producer Graph Building and Execution

Different embodiments of the invention may be implemented to discover and build out a producer graph to different extents (e.g., build the producer graph until all paths from the root node end at independent producers (in which case, the end nodes of a producer graph are independent producers, with the possibility of any overridden producers being intermediate nodes); build the producer graph out until each path from the root node ends in an overridden producer or an independent producer, whichever is reached first (in which case, each end node of a producer graph is either an independent producer or an overridden producer)).

"Execution start producers" refers to the producers of a producer graph from which a given execution of the producer graph begins. For an initial execution of a producer graph, different embodiments may start from different producers (e.g., in embodiments of the invention that build the producer graph until all paths from the root node end at independent producers, execution may start from the end nodes (which would be the independent producers), from the source producers (which would include the independent producer nodes and any overridden producer nodes), from a subset of the source producers consisting of the combination of any independent producers with at least one path between them and the root producer that does not include an overridden producer and any overridden producers, or from a subset of the source producers consisting of the combination of any overridden producers without any descendents that are overridden and any independent producers with at least one path between them and the root producer that does not include an overridden producer; in embodiments of the invention where the producer graph under overridden producers is not built if and until such a producer is un-overridden, execution may start from the end nodes (which may be independent producers and/or overridden producers), etc).

For subsequent executions of a producer graph, different embodiments may start from different producers (e.g., from the independent producers of the producer graph (e.g., in embodiments of the invention that do not support incremental execution); from the source producers of the producer graph (e.g., in embodiments of the invention that do not support incremental execution); from a subset of the source producers that consists of those source producers that have been overridden and/or added since the last execution (e.g., in embodiments of the invention that do support incremental execution); of the source producers that have been overridden and/or added since the last execution, from the combination of any such overridden producers without any descendents that are overridden and any such added producers with at least one path between them and the root producer that does not include an overridden producer (e.g., in embodiments of the invention that do support incremental execution); etc). By way of example and not limitation, embodiments of the invention that perform the following will be described below: 1) do not build the producer graph under overridden producers if and until such a producer is un-overridden; 2) for an initial execution of a producer graph, start execution from the end nodes (which may be independent producers and/or overridden producers); 3) implements incremental execution; and 4) for subsequent executions of a producer graph, start execution from a subset of the source producers that consists of those source producers that have been overridden and/or added since the last execution.

With regard to the above concept of execution start producers, the processing flow of execution of the producer graph also differs between different embodiments. For example, in one embodiment of the invention, the ancestry of the execution start producers are determined and placed in a collection, the execution start producers are executed, and the collection is iteratively scanned for producers for whom all dependencies have been executed—eventually the root nodes are reached. As another example, in one embodiment of the invention, the execution start producers are executed, the parents of the execution start producers are identified, those parents are executed, and their parents are identified and executed, and so on. The later embodiment of the invention is used below by way of example, and not limitation.

Exemplary Types of Dependencies

Exemplary Dynamic Producer Dependencies

A dynamic producer dependency is a producer dependency that can change during run time. It should be understood that the criteria for resolving the producer dependency is present in the source code, and thus the producers to which the producer dependency may be resolved are limited. With reference to FIG. 3A, the dashed arrowed line from the producer graph execution module 345 to the automated producer graph generation module 340 represents support for the execution of one or more producers in the current producer graph that are necessary to discover and build the entire current producer graph. In other words, an embodiment of the invention that supports dynamic producer dependencies may iterate between the automated producer graph generation module 340 and the producer graph execution module 345 until the entire producer graph is discovered, built, resolved, and executed (that is, iterate between: 1) invoking the automated producer graph generation module to discover and build those parts of the current producer graph that can be resolved at that time; and 2) invoking the producer graph execution module to execute producers of the current producer graph). In this sense, discovering refers to the accessing of the producer dependency declarations and determining the producers they identify; building refers to instantiating the producers and adding them to the producer graph; and resolving refers to determining currently unresolved dynamic producer dependencies.

Figure 5A:
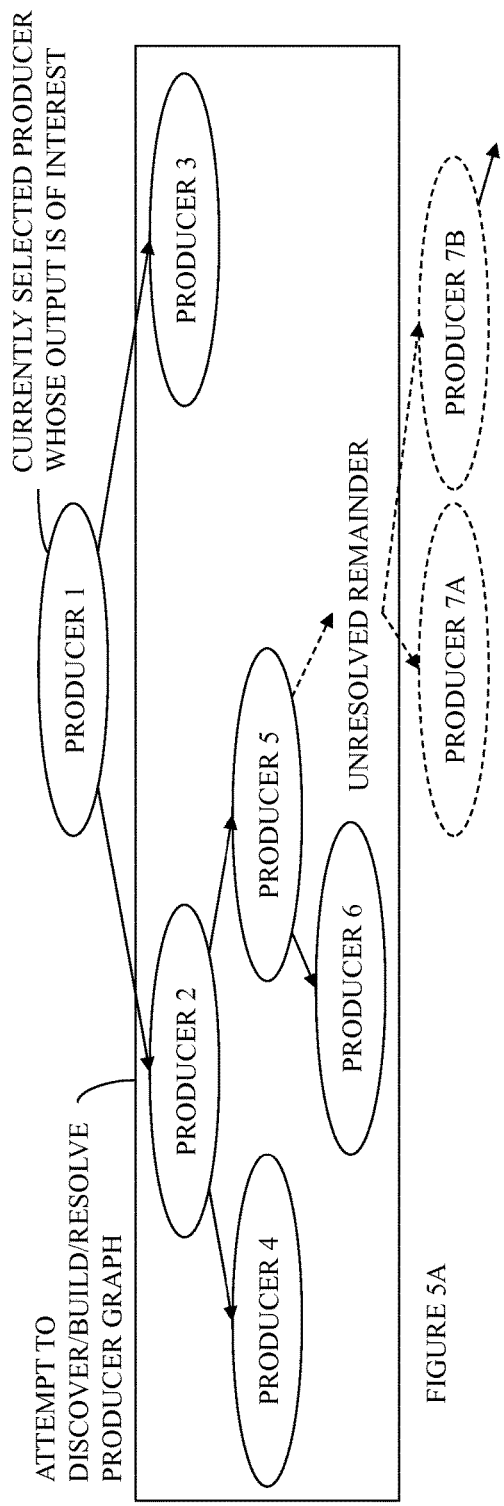
FIG. 5A is a block diagram illustrating the discovery and building of an exemplary producer graph including an unresolved dependency according to one embodiment of the invention.

FIG. 5A is a block diagram illustrating the discovery and building of an exemplary producer graph including an unresolved dependency according to one embodiment of the invention. FIG. 5A shows the current set of producers of interest consisting of producer 1. Based upon producer 1 and its producer dependency declaration, producer 2 and producer 3 are discovered. In other words, the dependency declaration for producer 1 identifies that producer 1 requires as inputs the output of producer 2 and producer 3. FIG. 5A also shows that while producer 3 is an independent producer (and thus, a source producer), producer 2 is not. As a result, based upon the dependency declaration of producer 2, producer 4 and producer 5 are discovered. Further, FIG. 5A shows that while producer 4 is an independent producer (and thus, a source producer), producer 5 is not. As a result, based upon the dependency declaration of producer 5, producer 6 and a currently unresolved dependency are discovered. FIG. 5A also shows that the currently unresolved dependency may be to producer 7A and/or producer 7B.

Figure 5B:
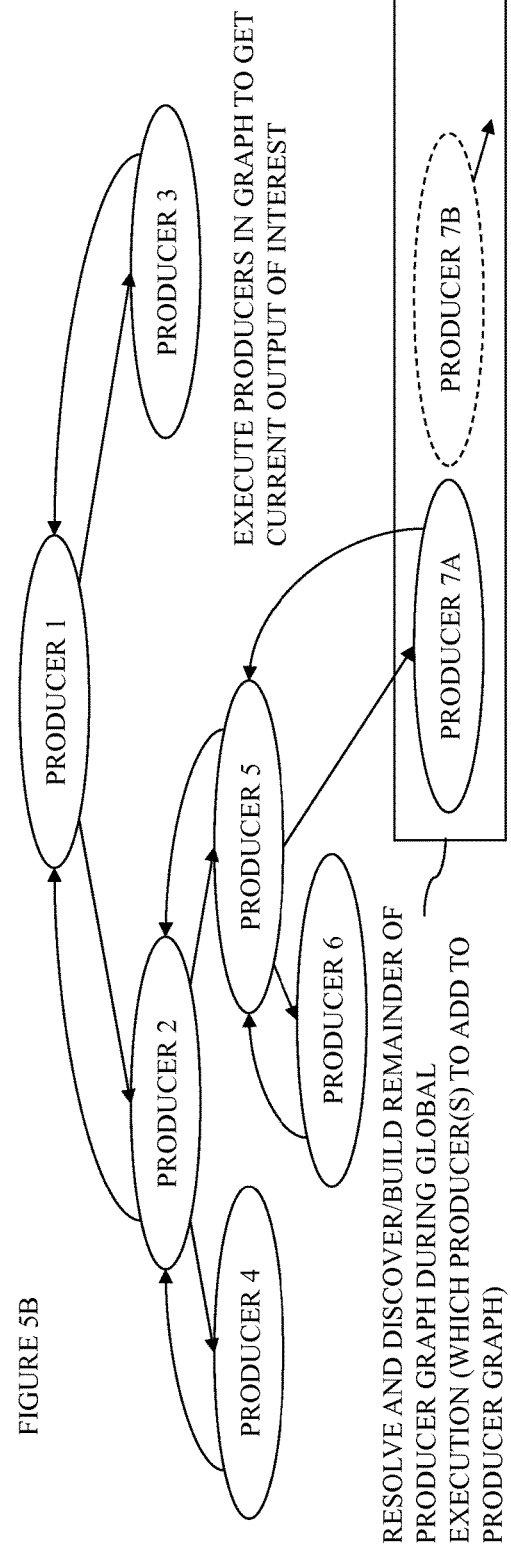
FIG. 5B is a block diagram illustrating the initial execution of the producer graph of FIG. 5A and the resolution of the unresolved dependency according to one embodiment of the invention.

FIG. 5B is a block diagram illustrating the initial execution of the producer graph of FIG. 5A and the resolution of the unresolved dependency according to one embodiment of the invention. FIG. 5B illustrates the producer graph of FIG. 5A with curved arrowed lines showing execution of the producers and provision of their outputs to dependent parent producers. In addition, FIG. 5B shows that the unresolved dependency of producer 5 is resolved as a dependency on producer 7A, and that producer 7A is an independent producer.

FIG. 5C is a block diagram illustrating the initial execution of the producer graph of FIG. 5A and/or the reexecution of the producer graph of FIG. 5B according to one embodiment of the invention. FIG. 5C illustrates the producer graph of FIG. 5A with curved arrowed lines showing execution of the producers and provision of their outputs to dependent parent producers. In addition, FIG. 5C shows that the unresolved dependency of producer 5 is resolved as a dependency on producer 7B and that producer 7B is a dependent producer. As a result, based upon the dependency declaration of producer 7B, producer 8 is discovered. Producer 8 is an independent producer (and thus, is a source producer). Assuming that FIG. 5C represents the initial execution of the producer graph of FIG. 5A, all of the curved arrowed lines in FIG. 5C would be employed. However, assuming that FIG. 5C represents the reexecution of the producer graph of FIG. 5B, the reexecution results in the dynamic dependency being resolved differently (a switch from producer 5 being dependent on producer 7A to producer 7B). Further, if the reexecution is performed without incremental execution, then all of the curved arrowed lines in FIG. 5C would be employed; however, if incremental execution was used, only the non-dashed curved arrowed lines would be employed (producer 8 to producer 7B, producer 7B to producer 5, producer 5 to producer 2, and producer 2 to producer 1). It should also be understood that the dynamic change in dependency illustrated in FIG. 5C is exemplary, and thus any number of different situations could arise (e.g., the dynamic change may never occur; producer 5 could have first been dependent on producer 7B and then changed to producer 7A; producer 5 could have first been dependent on producer 7B and no dynamic change ever occurs; producer 5 could be found to be dependent on both producer 7A and producer 7B as illustrated in FIG. 5D; etc.) While different embodiments may resolve dynamic producer dependencies in different ways, some examples are provided later herein.

Thus, automated reexecution of a producer graph is not limited to the producer being modified and its direct parent being reexecuted; rather a change is automatically rippled through the producer graph by the runtime, affecting any appropriate producers and dependencies, because the producer graphs are maintained (and incremental execution is used where supported). As such, changes cause any necessary additional discovery, building, resolving, and executing. Thus, the reexecution of a producer graph is automated in the sense that a user/programmer need not determine which producers of the producer graph are affected and possibly manually correct the graph.

Static Producer Dependencies

A static dependency is one that cannot change during run time. Thus, in an embodiment of the invention that supports contingent and subscription dynamic dependencies (described later herein), a non-contingent, non-subscription dependency is a static dependency. The exemplary producer graph of FIG. 4A illustrates a producer graph of static dependencies.

Producer Graph Shapes

Since a producer is at least an instance and a method associated with that instance, a producer graph is a graph representing instances and methods associated with those instances—and thus producer graphs are at least instance and method centric. In embodiments of the invention in which a producer is at least a class, instance, and method, producer graphs are at least class, instance and method centric.

It should be understood that a producer graph may take a variety of different shapes (e.g., a single chain of producers, a tree, etc.). The exemplary producer graph of FIG. 5B is a tree with a root node of producer 1, from which there are two branches—one to each of producer 2 and producer 3. Where producer 3 is a leaf node, producer 2 has two branches extending from it—one to each of producer 4 and producer 5. Producer 5 has two branches extending from it—one to each of producer 6 and producer 7A. The exemplary producer graph of FIG. 5B is said to be multilevel, with level 1 including the rood node producer 1, with level 2 including producer 2 and producer 3, with level 3 including producer 4 and producer 5, with level 4 including producer 6 and producer 7A (in FIG. 5C, level 4 includes producer 7B, and level 5 includes producer 8). When considering the branch from producer 1 with producer 2, the first producer of the branch is producer 2 and the last producers of the branch are producer 4, producer 6, and producer 7A in FIG. 5B.

While FIG. 5B illustrates a producer graph in which the current set of producers of interest includes a single producer, embodiments of the invention that support more than one current producer of interest would discover and build producer graphs for each. It should be understood that where there are simultaneously multiple producers of interest, the resulting producer graphs may be independent or may intersect. Where producer graphs intersect, embodiments of the invention may be implemented to: 1) duplicate producers to maintain separate producer graphs; or 2) avoid such duplication and maintain intersecting producer graphs. It should also be understood that such intersecting producer graphs may include a producer graph that is a subset of another producer graph. For instance, if producer 5 was included with producer 1 in the current set of producers of interest, then there would be a first producer graph with a root node of producer 5 and a second producer graph with a root node of producer 1, where the second producer graph includes the first producer graph. If, for instance, producer 7B was included with producer 1 and producer 5 in the current set of producers of interest, there would be a third producer graph, separate from the first and second producer graph, with a root node of producer 7B in FIG. 5B. Further, if the dynamic dependency of producer 5 changed from producer 7A to producer 7B (FIG. 5C), then the change would result in the third producer graph becoming a subset of the second producer graph remaining, and the second producer graph becoming a subset of the first producer graph. As previously stated, while embodiments of the invention may store and manipulate the producer graph(s) as a collection of graphs, other embodiments of the invention stores and manipulates the producer graph(s) as a collection of producers that are linked to each other to form graph(s) (as opposed to a collection of graphs) to facilitate merging and splitting of producer graphs. By way of example and not limitation, embodiments of the invention which store and manipulate the producer graph(s) as a collection of producers are described herein.

Exemplary Execution Flow

Figure 6:
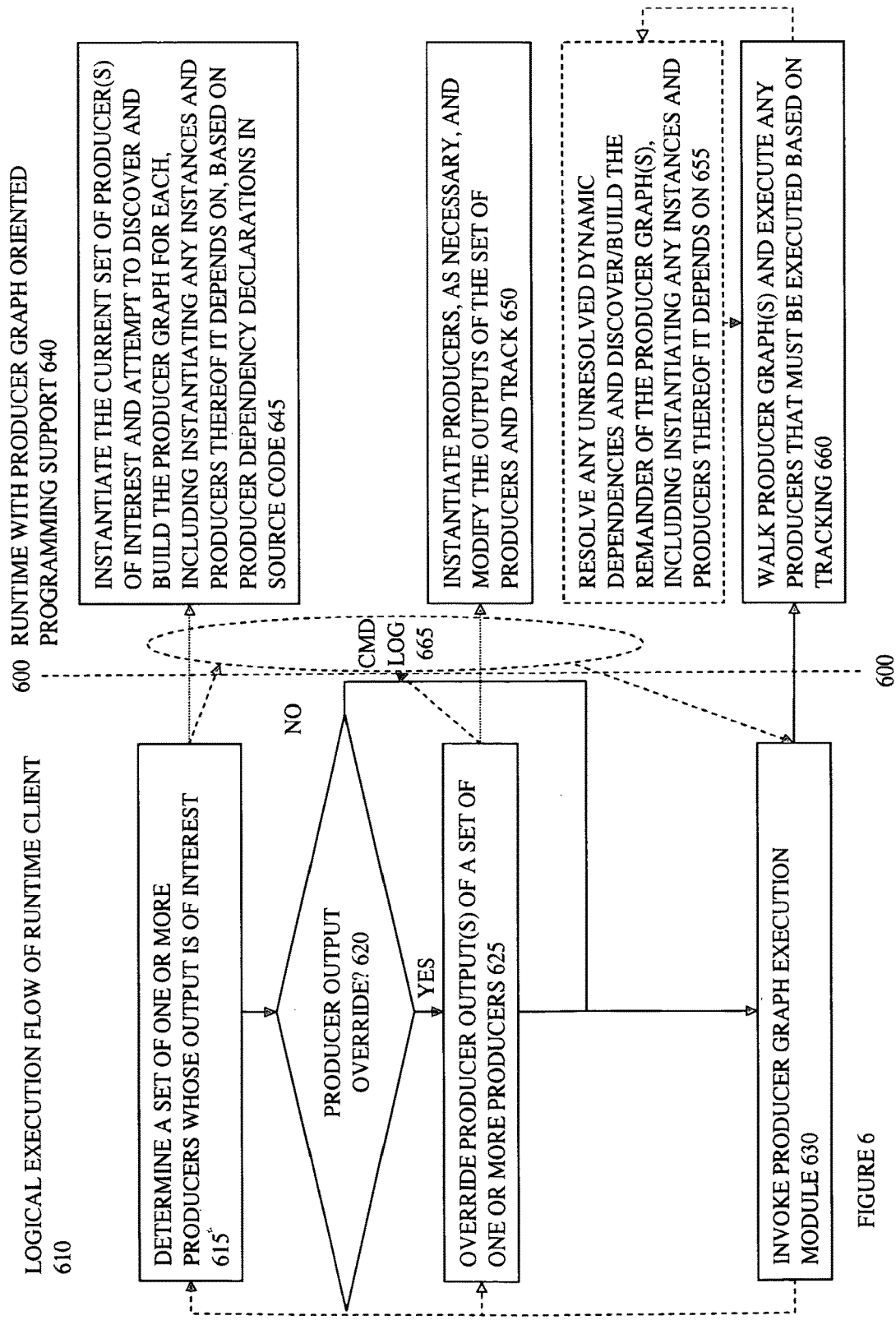
FIG. 6 is a flow diagram illustrating a logical execution flow of a runtime client and its relationship to a runtime with producer graph oriented programming support according to one embodiment of the invention.

FIG. 6 is a flow diagram of a logical execution flow of a runtime client and its relationship to a runtime with producer graph oriented programming support according to one embodiment of the invention. In FIG. 6, dashed dividing line 600 separates the logical execution flow of a runtime client 610 from the runtime with producer graph oriented programming support 640.

The logical execution flow of the runtime client 610 includes blocks 615, 620, 625, and 630, while the runtime with producer graph oriented support 640 includes blocks 645, 650, 660, and optionally 655. A solid arrowed line represents a direct causal relationship from block 630 to block 660. In contrast, dotted arrowed lines illustrate a causal relationship from blocks 615 and 625 in the logical execution flow of the runtime client 610 to blocks 645 and 650 in the runtime with producer graph oriented support 640, respectively; depending on the embodiment of the invention, this causal relationship may be direct or indirect. For example, FIG. 6 illustrates an optional indirect causation through the use of a command log 665 in a dashed oval on the runtime with producer graph oriented support 640 side of the dashed line 600. The command log 665 collects commands resulting from blocks 615 and 625 of the logical execution flow of the runtime client 610; and the command log 655 is consumed, responsive to block 630, by processing block 660. Thus, the command log 665 allows for the delaying of commands in order to collect multiple ones together and batch process them for optimization purposes. Thus, the command log 665 is similar to the override log 396 of FIG. 3B, and would actually include the override log 396 in some embodiments of the invention.

In block 615, the set of one or more producers of interest are determined as the current set of producers of interest and control passes to block 620. Responsive to the causal relationship between block 615 and block 645, block 645 shows that the current set of producers of interest are instantiated and that an attempt is made to discover, build, and resolve (if dynamic dependencies are supported and one or more are discovered in the producer graph) the producer graph(s) for each, including instantiating any instances and producers thereof as necessary, based on the producer dependency declarations in the runtime client 610. With reference to FIGS. 3A and 3B, the automated producer graph generation module 340 and 365 are invoked, respectively.

In block 620, it is determined if there are any producer output overrides. If so, control passes to block 625; otherwise, control passes to block 630.

In block 625, one or more producer output overrides are received for a set of one or more producers and control passes to block 630. Responsive to the causal relationship between block 625 and block 650, block 650 shows that the current set of overridden producers are instantiated (if not already instantiated in block 645), their outputs are modified, and they are tracked. An overridden producer may have already been instantiated because it was already discovered to be part of the producer graph(s) in block 645. However, an overridden producer may not already be discovered in block 645 because of an unresolved dynamic dependency. As such, this overridden producer is instantiated and overridden with the expectation that it may be added to the producer graph(s) when dynamic dependencies are resolved. Also, as previously indicated, the override log 396 of FIG. 3B, if implemented, exists between block 625 and block 650 and is part of the command log 665. Further, the set of overridden producers is tracked in some embodiments of the invention that support incremental execution. While in embodiments of the invention that support the override log 396/command log 665 the tracking is part of the log, in alternative embodiments of the invention the tracking is separately performed in block 650 with a different mechanism.

In block 630, the producer graph execution module is invoked and control optionally returns to block 615 and/or block 625. Responsive to the causal relationship between block 630 and block 660, block 660 shows that the current producer graph(s) are walked and any producers that require execution are executed based on the tracking Various techniques have been previously discussed for executing the producers of the producer graph and are applicable here. With reference to FIGS. 3A and 3B, the producer graph execution module 345 and 370 are invoked, respectively. In addition, in embodiments of the invention in which the command log 665 is implemented, the causal relationship includes consuming the command log 665 and performing the processing blocks 645 and 650 prior to block 660. Further, in embodiments of the invention that support the possibility of unresolved dependencies, control flows from block 660 to block 655 when necessary.

In block 655, an attempt is made to resolve the unresolved dependencies and discover and build the remainder of the producer graph(s), including instantiating any instances and producers thereof. From block 655, control flows back to block 660.

Exemplary Forms of Producer Dependency Declarations

FIGS. 7A-F illustrates some exemplary forms for producer dependency declarations according to embodiments of the invention. While FIGS. 7A-F illustrate embodiments that support argument, field, and sequencing dependencies, it should be understood that different embodiments may support only one or two of the three dependency forms. In the embodiments of the invention shown in FIGS. 7A-F, a producer dependency declaration is made up of a producer dependency declaration statement, and optionally explicit producer dependency declaration code. A non-shortcut declared producer dependency is one in which explicit producer dependency declaration code is used, whereas a shortcut declared producer dependency is one in which no explicit producer dependency declaration code is used (rather, the runtime does not use producer dependency declaration code and/or implements it on the fly based on information in the producer dependency declaration statement).

Different embodiments of the invention may use different syntaxes for declaring producer dependencies. For example, different embodiments of the invention may include different syntaxes for use in producer dependency declaration statements that strongly constrain, weakly constrain, and/or do not constrain the type of producer dependency that may be created. A strongly constrained producer dependency is one for which a syntax is used in the producer dependency declaration statement that substantially limits the type of producer dependency that may be created; A weakly constrained producer dependency is one for which a syntax is used in the producer dependency declaration statement that is less limiting of the type of producer dependency that may be created; and an unconstrained producer dependency is one for which a syntax is used in the producer dependency declaration statement that does not limit the type of producer dependency that may be created.

By way of example, and not limitation, embodiments of the invention described below that include the following: 1) a syntax for a strongly constrained producer dependency for arguments (ArgumentDependency=strongly constrained downwardly declared argument [static or dynamic, and if dynamic, contingent and/or absorbing subscription] dependency); 2) a syntax for a strongly constrained producer dependency for fields (FieldDependency=Strongly constrained downwardly declared field [static or dynamic, and if dynamic, contingent and/or absorbing subscription] dependency); 3) a syntax for a strongly constrained producer dependency for sequencing dependencies (SequencingDependency=Strongly constrained downwardly declared sequencing [static or dynamic, and if dynamic, contingent and/or sticky subscription] dependency); 4) a syntax for a weakly constrained upwardly declared producer dependency for argument, field, or sequencing dependencies (UpwardDependency=Weakly constrained upwardly declared field, argument, or sequencing [static or dynamic, and if dynamic, contingent] dependency); and 5) a syntax for a weakly constrained producer dependency (WeaklyConstrainedDependency=either a) downwardly declared sequencing only [static or dynamic, and if dynamic, contingent and/or sticky subscription] dependency; or b) upwardly declared [argument, field, or sequencing] [static or dynamic, and if dynamic, contingent] dependency). It should be understood that while some embodiments of the invention support a syntax for the producer dependency declaration statement that distinguishes downwardly declared argument dependencies, downwardly declared field dependencies, upwardly declared dependencies (that can return upwardly declared argument, field, or sequencing dependencies), and weakly constrained dependencies (that can return downwardly declared sequencing dependencies, upwardly declared argument, field, or sequencing dependencies), alternative embodiments of the invention may adopt a different syntax (e.g., have a syntax that has all dependencies be unconstrained dependencies with dependency determination producers that can return any supported dependencies (downwardly and upwardly declared argument, field, and sequencing dependencies); have a syntax distinguish all supported dependencies; have a syntax that distinguishes downwardly and upwardly declared argument and field dependencies and that distinguishes a weakly constrained dependency that can only return upwardly and downwardly declared sequencing dependencies; a syntax that distinguishes downwardly declared argument and field dependencies and that distinguishes upwardly declared dependencies that can return only upwardly declared sequencing dependencies; a syntax that distinguishes downwardly declared argument, field, and sequencing dependencies (sticky subscriptions and upwardly declared dependencies are not supported); etc.)

It should be understood that the syntax of the producer dependency declaration statement does not necessarily equate to the producer dependency (e.g., the link) created in the producer graph (e.g., ArgumentDependency creates an argument dependency; but an UpwardDependency may create an argument, field, or sequencing dependency). As such, where appropriate for understanding, a space between a qualifier (e.g., argument, field, or sequencing) and the word "dependency" is used to refer to the dependency created by the runtime, while lack of a space is used to refer to the syntax.

Figure 7A:
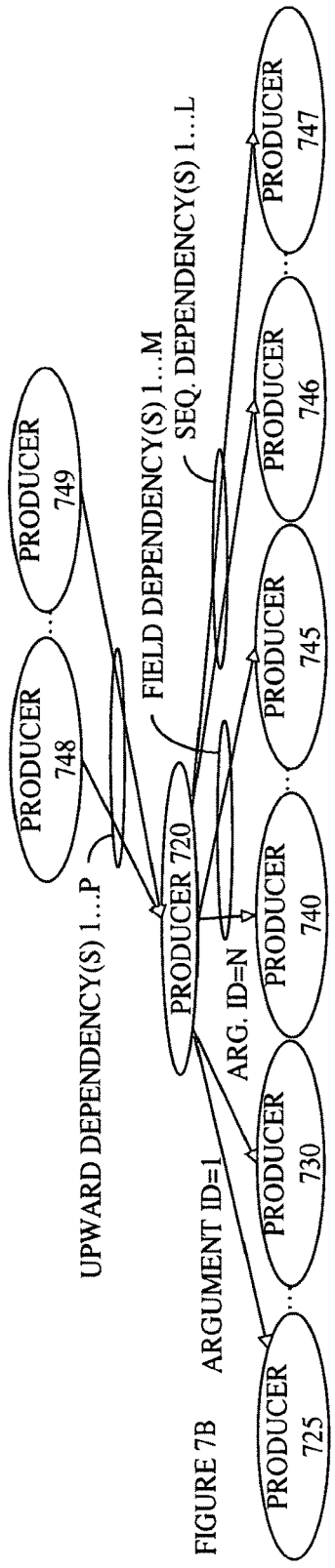
FIG. 7A illustrates pseudo code of a producer dependency declaration for a method using shortcut declared dependencies according to one embodiment of the invention.

FIG. 7A illustrates pseudo code of a producer dependency declaration for a method using shortcut declared dependencies according to one embodiment of the invention; while FIG. 7B is a block diagram of exemplary producers according to one embodiment of the invention. FIG. 7A shows: 1) a producer dependency declaration statement 705 including ArgumentDependencies 1-N, FieldDependencies 1-M, SequencingDependencies 1-L, UpwardDependencies 1-P, and WeaklyConstrainedDependencies 1-Q; and 2) a method alpha 710 having arguments 1-N from the producer dependency declaration statement 705. In one embodiment of the invention, the arguments of a producer dependency declaration statement are numbered to provide an argument ID for each for tracking purposes FIG. 7B shows a producer 720 having child dependencies to the following: 1) producer 725 for argument ID 1; 2) producer 730 for argument ID N; 3) producers 740-745 for FieldDependencies 1-M; 4) producers 746-747 for SequencingDependencies 1-L; and 5) producer 748-749 for UpwardDependencies 1-P (note, WeaklyConstrainedDependencies 1. . . Q are not shown, but will be described in greater detail with reference to FIG. 7G).

Thus, the arguments of the producer dependency declaration statement 705 correspond to the arguments of the method alpha 710, and the argument IDs of the arguments in the producer dependency declaration statement 705 are tracked with regard to the child producers they identify.

Figure 7C:
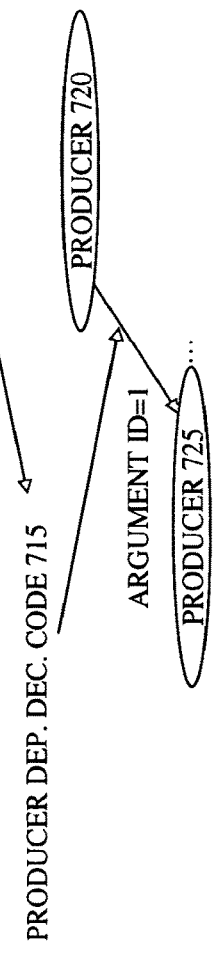
FIG. 7C illustrates pseudo code of a producer dependency declaration for a method using a non-shortcut declared dependency, and illustrates a block diagram of exemplary producers according to one embodiment of the invention.

FIG. 7C illustrates pseudo code of a producer dependency declaration for a method using a non-shortcut declared dependency, and illustrates a block diagram of exemplary producers according to one embodiment of the invention. FIG. 7C shows the producer dependency declaration statement 705 and the method alpha 710 of FIG. 7A, as well as the producers 720 and 725 from FIG. 7B. In addition, FIG. 7C includes producer dependency declaration code 715 associated with ArgumentDependency 1. During run time, the runtime accesses and executes the producer dependency declaration code 715 responsive to ArgumentDependency 1 of the producer dependency declaration statement 705. Execution of the producer dependency declaration code 715 returns the producer 725 as the producer dependency for ArgumentDependency 1. Thus, FIG. 7C illustrates embodiments of the invention in which producer dependency declaration code 715 may be part of a method (other than method alpha 710), but is not part of a producer.

FIG. 7D illustrates pseudo code of a producer dependency declaration for a method using a non-shortcut declared dependency according to one embodiment of the invention; while FIG. 7E is a block diagram of exemplary producers according to one embodiment of the invention. FIG. 7D shows the producer dependency declaration statement 705 and the method alpha 710 of FIG. 7A, while FIG. 7E shows the producers 720 and 725 from FIG. 7B. In addition, FIG. 7D includes: 1) a producer dependency declaration statement 750; and 2) a method beta 755 including producer dependency declaration code 760. FIG. 7D also shows that argument dependency 1 of the producer dependency declaration statement 705 identifies a producer (shown in FIG. 7E as producer 765) based on the method beta 755 that will return the dependency for argument dependency 1. During run time, the runtime, responsive to argument dependency 1 of the producer dependency declaration statement 705, executes the producer 765 to return identification that the producer dependency for argument dependency 1 is producer 725. As such, producer 765 is referred to as a dependency determination producer (its output is a producer dependency—and thus, is returned using a class/instance that is monitored for special treatment (manipulation of the producer graph(s)) by the runtime with producer graph oriented programming support), whereas producer 725 is referred to as a standard producer (its output, if any, is not directly processed by the runtime to manipulate a producer graph; but its output, if any, may be consumed by a parent producer (be it a dependency determination producer or another standard producer) and/or provided as the output of the producer graph (if the standard producer is a producer of interest, and thus a root node).

Thus, FIGS. 7D-E illustrate embodiments of the invention in which producer dependency declaration code 715 is part of another producer—referred to as a dependency determination producer. While in FIGS. 7D-E the object-oriented source code includes explicit producer dependency declaration code in methods from which dependency determination producers are instantiated at run time by the runtime for non-shortcut declared dependencies, alternative embodiments of the invention additionally or instead implement the runtime to include generic producer dependency declaration code that it invokes as one or more generic dependency determination producers on the fly for shortcut declared dependencies. Also, while FIGS. 7C-E are illustrated with reference to ArgumentDependencies, the techniques illustrated are applicable to the other types of downwardly declared dependencies. Further, FIGS. 7F-G illustrate the use of a dependency determination producer for an Upward-Dependency and a WeaklyConstrainedDependency.

FIG. 7F is a block diagram of an exemplary dependency through use of an UpwardDependency with a dependency determination producer according to one embodiment of the invention. FIG. 7F shows the producer 720 having sequencing producer dependency to a dependency determination producer 772. The dependency determination producer may return a non-subscription upwardly declared argument, field, or sequencing dependency of the parent producer 748 on the producer 720. Further, such a dependency determination producer may implement a dynamic dependency (e.g., a contingent dependency that selects between the above depending on data values, including between different argument IDs, as described later herein). While some embodiments of the invention support all of these possibilities, alternative embodiments of the invention support only a subset (e.g., only non-subscription upwardly declared sequencing dependencies).

FIG. 7G is a block diagram of possible exemplary dependencies through use of a WeaklyConstrainedDependency with a dependency determination producer according to one embodiment of the invention. FIG. 7G shows the producer 720 having sequencing producer dependency to a dependency determination producer 775. In some embodiments of the invention, the dependency determination producer may return any of the following: 1) a non-subscription downwardly declared sequencing dependency on a child producer 780; 2) a non-subscription upwardly declared argument, field, or sequencing dependency of a parent producer 785 on the producer 720; and 3) a sticky subscription (described later herein). Further, such a dependency determination producer may implement a dynamic dependency (e.g., a contingent dependency that selects between the above depending on data values, including between different argument IDs, as described later herein). While some embodiments of the invention support all of these possibilities, alternative embodiments of the invention support only a subset (e.g., only non-subscription upwardly declared sequencing dependencies).

As previously indicated, sequencing dependencies may be used for a variety of purposes, including ensuring the order of execution between producers that modify data in a manner of which the runtime is not aware and producers that consume that data (a child producer may write its outputs in a way that requires the method of the parent producer to include code to access that output (e.g., a method that impacts the environment by affecting an output that is not the regular producer output and, as such, that is not detected by the runtime—such as a method that sets a global variable, that sets a field in an instance which is not the producer output, that impacts an external data source, etc.)), etc.

Different embodiments may support one or more ways for declaring producer dependencies with respect to property producers. Specifically, in some embodiments of the invention, producers that read a field should be dependent on the get property producer, while the get property producer should be dependent on any producers that set the field for which that get property method is responsible. One technique of handling this situation that may be used in embodiments of the invention that support sequencing producer dependencies is to provide, for a get property method, a producer dependency declaration statement that creates sequencing producer dependencies on every method that sets the field for which that get property method is responsible (e.g., with respect to FIG. 7G, where the producer 780 is a producer that sets a field and the producer 720 is the get property producer responsible for that field, the dependency determination producer 775 would be written to return a downwardly declared sequencing dependency of the producer 720 on the producer 780). A second technique of handling this situation that may be used in embodiments of the invention that support both sequencing producer dependencies and upwardly declared producer dependencies is to include, in the producer dependency declaration statement/code for any method that sets a field, an upwardly declared sequencing producer dependency (e.g., using an Upward-Dependency or WeaklyConstrainedDependency) on the get method responsible for that field (e.g., with respect to FIG. 7G, where the producer 720 is a producer that sets a field and the producer 785 is the get property producer responsible for that field, the dependency determination producer 775 would written to return an upwardly declared sequencing dependency of the parent producer 785 on the producer 720). This second technique allows the programmer of the method that sets the field to be responsible for providing a producer dependency to the appropriate get method, as opposed to requiring that programmer to go to the get method and modify its producer dependency declaration statement/code.

When using sequencing dependencies, when a given producer relies on a given variable, that variable should not be modified by more than one of that producer's descendant producers in a given execution of the producer graph(s) (It should be noted that through contingent dependencies (described later herein), different descendant producers may modify that variable during different executions of the current producer graph(s)). For example, a get property producer should only depend on one other producer that sets the filed for which the get property producer is responsible in a given execution of the current producer graph(s).

It should be understood that different embodiments of the invention may implement one or more of the embodiments of the invention shown in FIGS. 7A-F. For example, one embodiment of the invention supports shortcut and non-shortcut declared dependencies, both using dependency determination producers; specifically, in this embodiment of the invention: 1) the object-oriented source code includes explicit producer dependency declaration code in methods from which dependency determination producers are instantiated at run time by the runtime for non-shortcut declared dependencies; 2) the runtime includes generic producer dependency declaration code that it invokes as one or more generic dependency determination producers on the fly for shortcut declared, contingent dependencies (describer later herein); and 3) the runtime includes support to directly link shortcut declared, non-contingent producer dependencies (describer later herein).

As another example, one embodiment of the invention supports non-shortcut and shortcut declared producer dependencies using dependency determination producers; specifically, in this embodiment of the invention: 1) the object-oriented source code includes explicit producer dependency declaration code in methods from which dependency determination producer are instantiated at run time by the runtime for non-shortcut declared dependencies; and 2) the runtime includes generic dependency determination code that it invokes as one or more generic dependency determination producers on the fly for shortcut declared dependencies (regardless of type). This later embodiment allows for consistent treatment of producer dependencies, and thus, simplifies the runtime.

In addition, while in one embodiment of the invention the producer dependency declaration statement for a method is located just above that method in the object-oriented source code, in alternative embodiments of the invention it is located elsewhere (e.g., the producer dependency declaration statements for all the methods for a class are grouped together within the class, the producer dependency declaration statements for all the methods in all of the classes are grouped together as a separate data table, etc.). Also, while in one embodiment of the invention producer dependency declaration code is separate from the producer dependency declaration statements, in alternative embodiments of the invention they are combined (e.g., the producer dependency declaration code is within the parentheses of the producer dependency declaration statement, the producer dependency declaration code is placed directly beneath the producer dependency declaration statement and is treated by the runtime as a single unit, etc.).

Figure 7H:
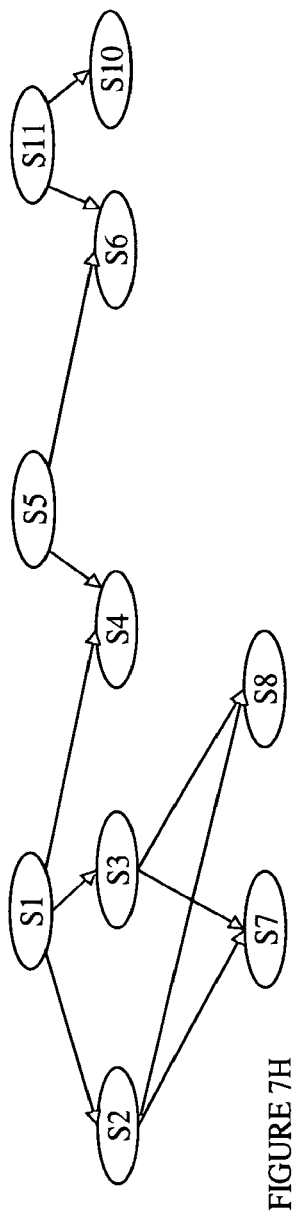
FIG. 7H illustrates exemplary producer graphs of standard producers according to one embodiment of the invention.
Figure 7I:
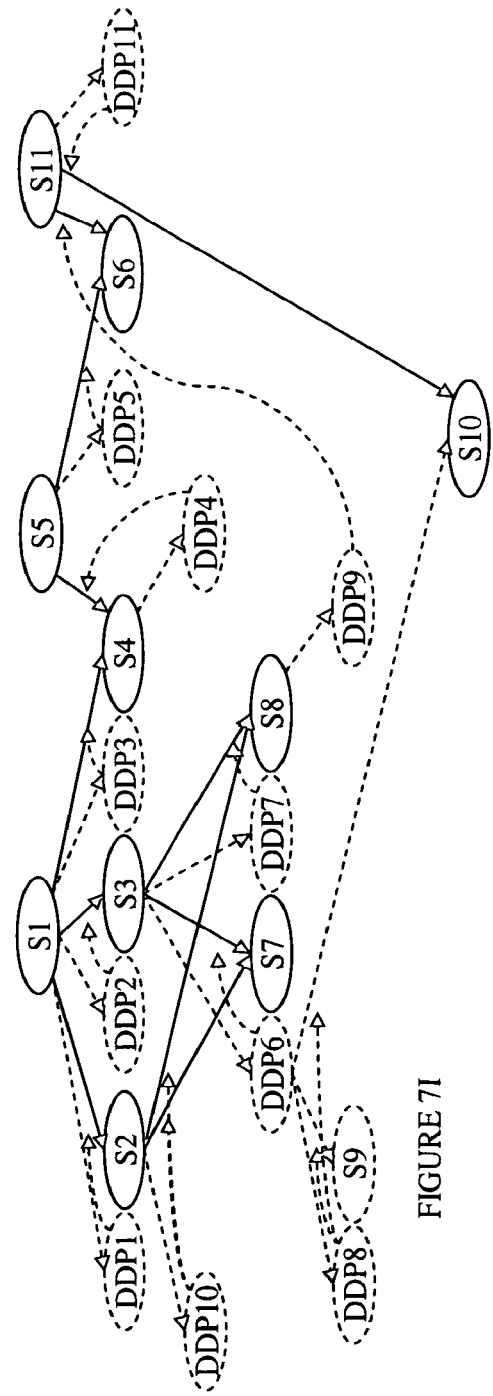
FIG. 7I illustrates one example of producer dependencies and dependency determination producers for discovering, resolving, and building the producer graph of FIG. 7H.

FIGS. 7H-I illustrate the distinction between different subgraphs that may exist in a producer graph due to dependency determination producers. FIG. 7H illustrates exemplary producer graphs of standard producers according to one embodiment of the invention. Specifically, FIG. 7H shows a producer graph with root node S1, a producer graph with root node S5, and a producer graph with root node S11. The standard producer S1 has as children standard producers S2, S3, and S4; standard producers S2 and S3 have as children standard producers S7 and S8; standard producer S5 has as children standard producers S4 and S6; and standard producer S11 has as children standard producers S6 and S10. The exemplary producer graphs of FIG. 7H may be discovered, built, and resolved using any number of producer dependencies and dependency determination producers. FIG. 7I illustrates one example of producer dependencies and dependency determination producers for discovering, resolving, and building the producer graph of FIG. 7H. Specifically, FIG. 7I shows the graphs of FIG. 7H being subgraphs of a larger set of producer graphs. In other words, the producer graphs of FIG. 7I include the graphs of FIG. 7H (referred to as the "target subgraphs" and illustrated using solid arrowed lines and solid ovals) and graphs that assist in the discover, resolution, and building of the target subgraphs (referred to as "decision subgraphs and illustrated used dashed arrowed lines and dashed ovals). The decision subgraphs in FIG. 7H include dependency determination producers (DDPs) 1-11 and standard producers S9-10. In FIG. 7H, S1 is shown as being dependent on DDPs 1-3, which respectively return downwardly declared producer dependencies of S1 on S2, S3, and S4; S4 is shown as being dependent on DDP4, which returns an upwardly declared producer dependency of S5 on S4; S5 is shown as being dependent on DDP5, which returns a downwardly declared producer dependency of S5 on S6; S3 is shown as being dependent on DDP6, which in turn is dependent on DDP8, which returns a downwardly declared producer dependency of DDP6 on S9 and S10, which causes DDP6 to return a downwardly declared dependency of S3 on S7; S3 is shown as being dependent on DDP7, which returns a downwardly declared producer dependency of S3 on S8; S8 is shown as being dependent on DDP9, which returns a sticky subscription for which S6 is a trigger producer and S11 is the created parent (thus, the producer dependency of S11 on S6); S2 is shown as being dependent on DDP10; which returns a collection of downwardly declared producer dependency of S2 on S7 and S8; and S11 is shown as being dependent on DDP11, which returns a downwardly declared producer dependency of S11 on S10. It should be understood that a standard producer may be both part of a target subgraph and a decision subgraph (e.g., see S10). It is worth noting that the target subgraphs are data driven in the sense that data flows from one standard producer to another standard producer up the graph.

Exemplary Programming and Execution Framework

Figure 8A:
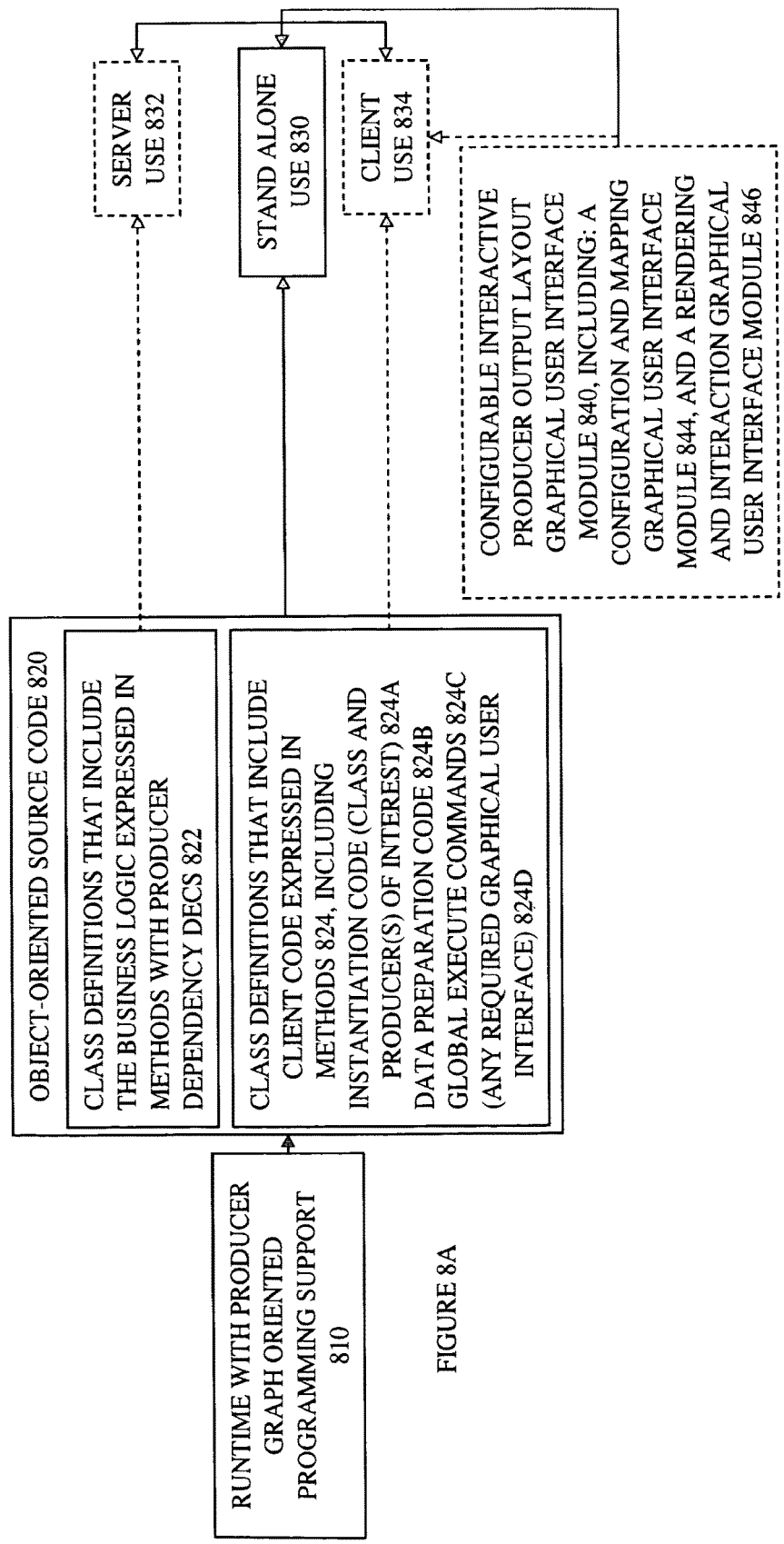
FIG. 8A is a block diagram illustrating a first exemplary framework within which applications are provided to end users according to one embodiment of the invention.

FIG. 8A is a block diagram illustrating a first exemplary framework within which applications are provided to end users according to one embodiment of the invention. The framework shown in FIG. 8A includes three basic divisions. The first division includes the creation of the runtime with producer graph oriented programming support 810. This first division is performed by programmers with highly advanced programming skills. When working in this division, programmers are referred to as runtime programmers. When creating a runtime with producer graph oriented programming support, the runtime programmers include support for producer graphs, as well as support for executing the various types of commands used in transformation code, instantiation code, and data preparation code.

The second division includes the creation of object-oriented application source code 820 to be executed by the runtime. The object-oriented application source code 820 includes two basic divisions: 1) class definitions that include the business logic expressed in methods with producer dependency declarations 822 (this may optionally include other functionality, such as a graphical user interface—in which case, the graphical user interface is written using producers and producer dependency declarations); and 2) class definitions that include client code expressed in methods 824, including instantiation code (class, instances, and producer(s) of interest, to cause generation of the producer graph(s)) 824A, data preparation code 824B (e.g., set commands, such as set commands that trigger the overriding of producer outputs), global execute commands 824C to cause execution of the producer graph(s) (e.g., execute and get commands), and any required graphical user interface 824D (not included in 822). The producer dependency declarations are used to define the ties between producers during the definition of the classes that include the business logic, rather than after instances of those classes are created. The object-oriented source code 820 is hard coded class, instance, and methods that are compiled and executed.

While in one embodiment of the invention a global execute command is implemented, execution of which causes the attempted execution of all producer graph(s) currently in the producer graph(s) structure 380, alternative embodiments of the invention alternatively or also implement a graph specific execute command that requires identification of a given graph of the current producer graph(s) that is to be executed. Further, the global execute command may be explicit (e.g., set, set, set, execute, get, get) or implicit depending on the implementation of the runtime. For example, an implicit global execute command could be: 1) triggered by the first get command on a producer of interest (e.g., set, set, set, get (implicit execute), get); 2) triggered by each data manipulation (set (implicit execute), set (implicit execute), set (implicit execute), get, get); etc.

The second division is again performed by programmers with advanced programming skills, as well as an understanding of the business objectives of the application. When working in this division, programmers are referred to as application programmers. As part of this, if the application requires a graphical user interface, the application programmers also design and code the graphical user interface for the specific application; and thus are also referred to as application designers.

The third division includes the use of application programs being run by the runtime. The third division is performed by end users that need not have any programming skills. The application program may be distributed in a variety of ways (e.g., as source code; a transformation of source code, such as byte code; as binary, etc). In addition, the application program may be distributed for stand alone use 830 (in which case, the entire application program (and runtime if not already present) is provided to a computer system) and/or client/server use. In one embodiment of the invention, a client/server distribution includes distributing the class definitions that include the business logic expressed in methods with producer dependency declarations 822 (and runtime if not already present) for server use 832 and the class definitions that include client code expressed in methods 824 (and runtime if not already present) for client use 834, where the client use 834 on a computer system causes communication with the server use 832 on a server system.

FIG. 8A also shows an optional configurable interactive producer output layout graphical user interface module 840 being provided for the standalone use 830 and the client use 834. The object-oriented source code 820 would be run by the runtime to generate the producer graph(s), and the configurable interactive producer output layout graphical user interface module 840 allows for graphically displaying outputs from and interacting with the producer graphs. Specifically, the configurable interactive producer output layout graphical user interface module 840 includes: 1) a configuration and mapping graphical user interface module 844 to allow for the configuration of the layout and mapping of selected producer outputs (e.g., areas of the screen to be used, how the data is to be displayed, etc.); and 2) a rendering and interaction graphical user interface module 846 to render the configured layout and to allow for the overriding of producer outputs (which results in the updating of the producer graphs through a global execute command). It should be understood that the configurable interactive producer output layout graphical user interface module 840 may or may not be created by the same entity that writes the runtime 810.

Figure 8B:
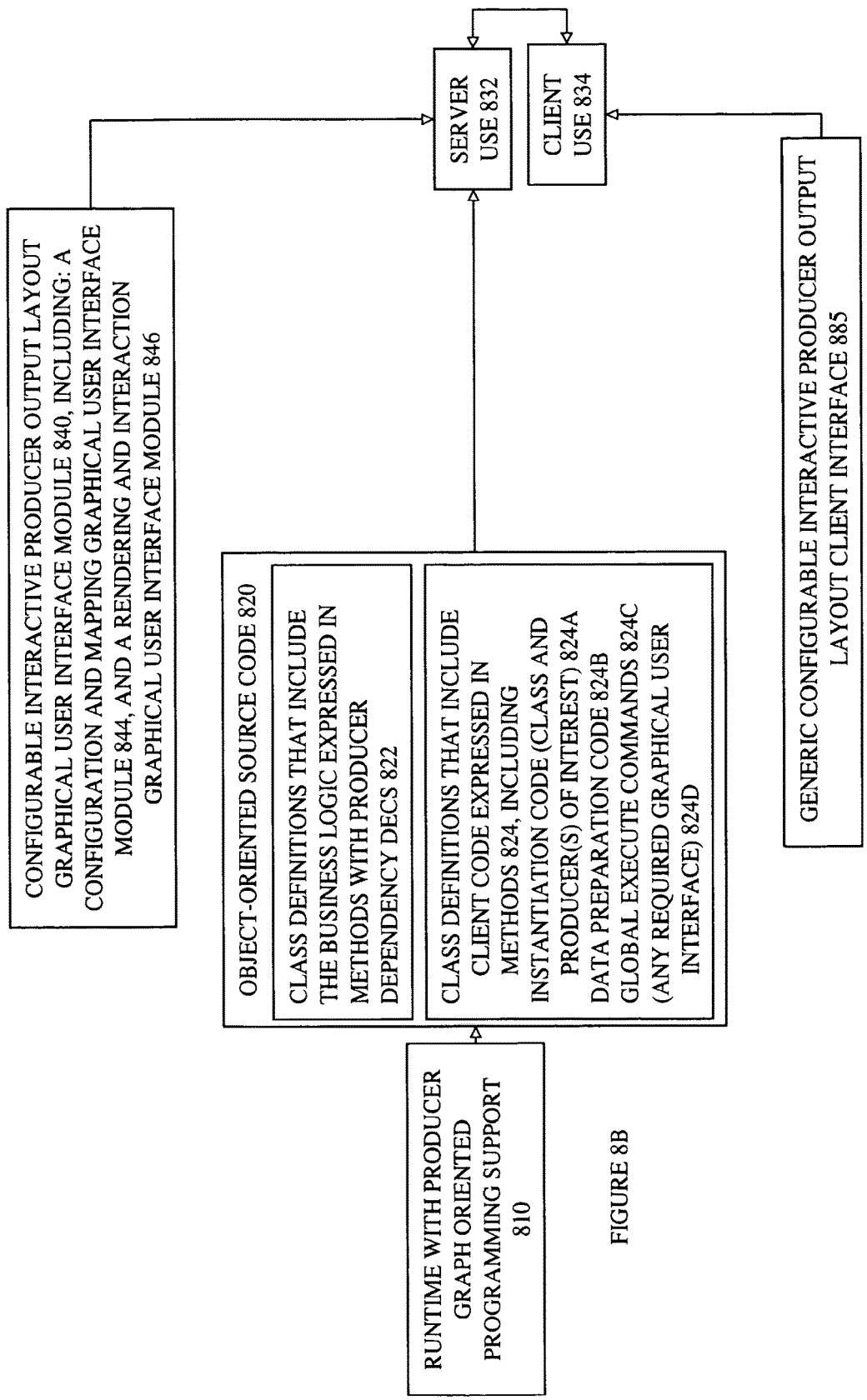
FIG. 8B is a block diagram illustrating a second exemplary framework within which applications are provided to end users according to one embodiment of the invention.

FIG. 8B is a block diagram illustrating a second exemplary framework within which applications are provided to end users according to one embodiment of the invention. FIG. 8B is identical to FIG. 8A, with the following exceptions: 1) the stand alone used 830 is not present; 2) the object oriented source code 820 is provided to server use 832, while the client code 824 is not provided to client use 834; 3) the configurable interactive producer output layout graphical user interface module 840 is provided to server use 832 and not client use 834; and 4) a generic configurable interactive producer output layout client interface 885 is provided to client use 834. The configurable interactive producer output layout client interface 885 is used to interface with the configurable interactive producer output layout graphical user interface module 840.

Regardless of the framework used, in one embodiment of the invention the producer graph oriented programming framework offers the ability to interface with programs not written with producer dependency declarations. This ability to interface with programs not written with producer dependency declarations includes: 1) a caller part (such as a graphical user interface not written according to producer graph oriented programming); and 2) a called part (such as an external data source not written according to producer graph oriented programming). The caller part may, through client code, issues producer graph oriented programming commands. The called part is implemented as part of producers that wrap the called part (referred to as "wrapping producers"). Executing the called part (such as reading data from a data source or subscribing to changes of data in an external data source) may in turn trigger instance modifications. These changes may occur by calling the property set methods in the code of the wrapping producers. Get property producers (getters) are caused to have dependencies on these wrapping producers, in order to make sure that instance modifications triggered by the changes occurring in an external data source are properly propagated through the producer graph. As previously described, different embodiments may support one or more ways for declaring producer dependencies with respect to property producers. For example, in some embodiments of the invention that support sequencing producer dependencies, SequencingDependencies may be used for declaring non-subscription downwardly declared sequencing producer dependencies on the wrapping producers. As yet another example, in some embodiments of the invention that support sequencing producer dependencies and non-subscription upwardly declared producer dependencies, UpwardDependencies and/or WeaklyConstrainedDependencies may be may be placed in the producer dependency declaration of the wrapping producers to create non-subscription upwardly declared sequencing producer dependencies for the property producers.

FIGS. 8C-F illustrate exemplary screenshots and usage of the configurable interactive producer output layout graphical user interface module 840 according to one embodiment of the invention. While embodiments of the invention will be described with reference to the configurable interactive producer output layout graphical user interface module 840 providing for the configuration, mapping, and interaction with selected outputs of the current producers graph(s) in the form of a spreadsheet, alternative embodiments of the invention may be implemented to additionally or alternatively provide support for another form. Further, while exemplary ways of performing the configuration, mapping, and interaction in the form of a spreadsheet is described according to some embodiments, other embodiments of the invention may perform these operations another way, with different interface, and/or with a different screen layout. Further, the spreadsheet may support any of the known functionalities associated with spreadsheets (e.g., color selection, font selection, bar/pie/line charts, pivot tables, saving layouts, loading layouts, etc.)

Figure 8C:
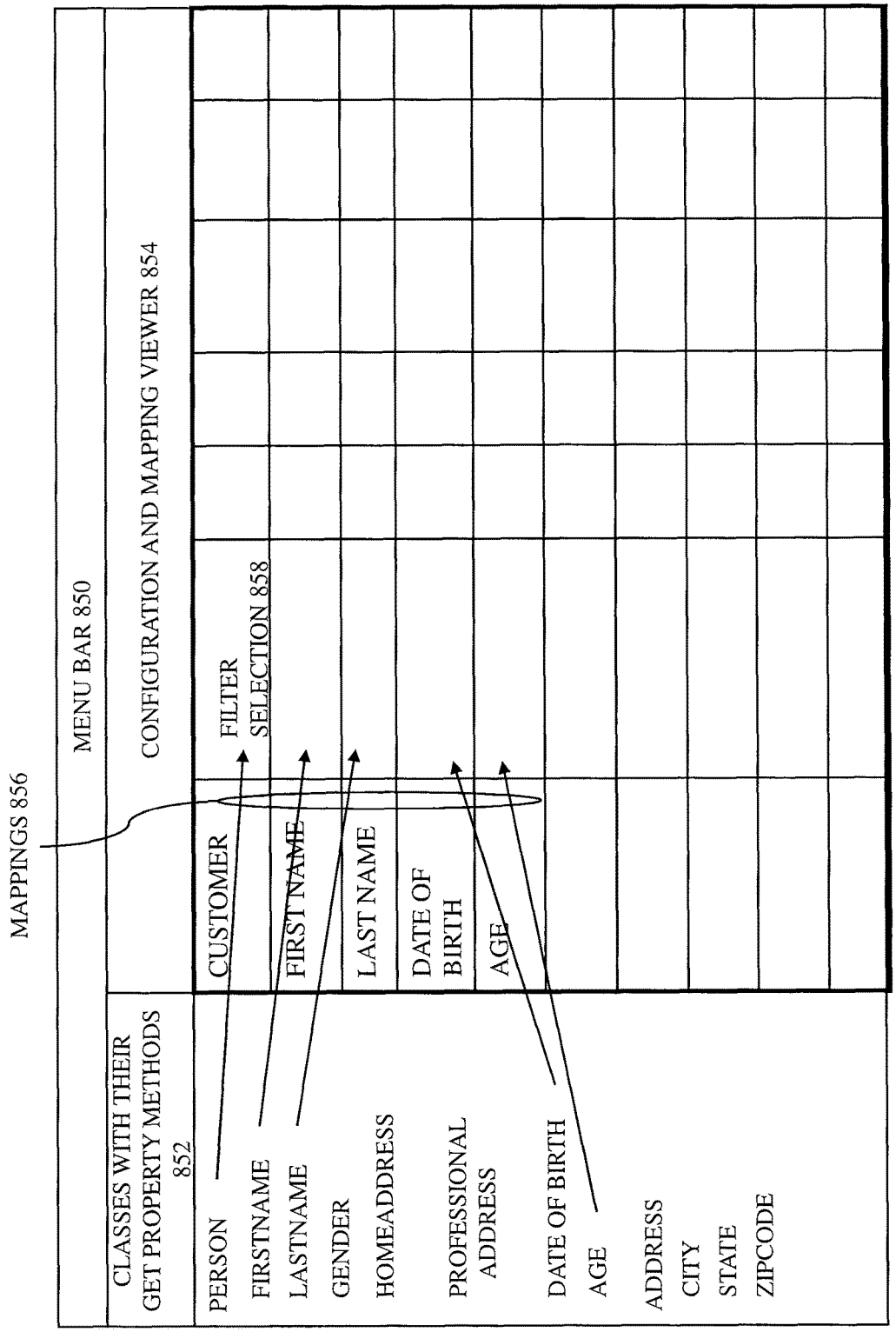
FIG. 8C illustrates an exemplary screenshot and usage of free cell selection with the configurable interactive producer output layout graphical user interface module 840 according to one embodiment of the invention.
Figure 8E:
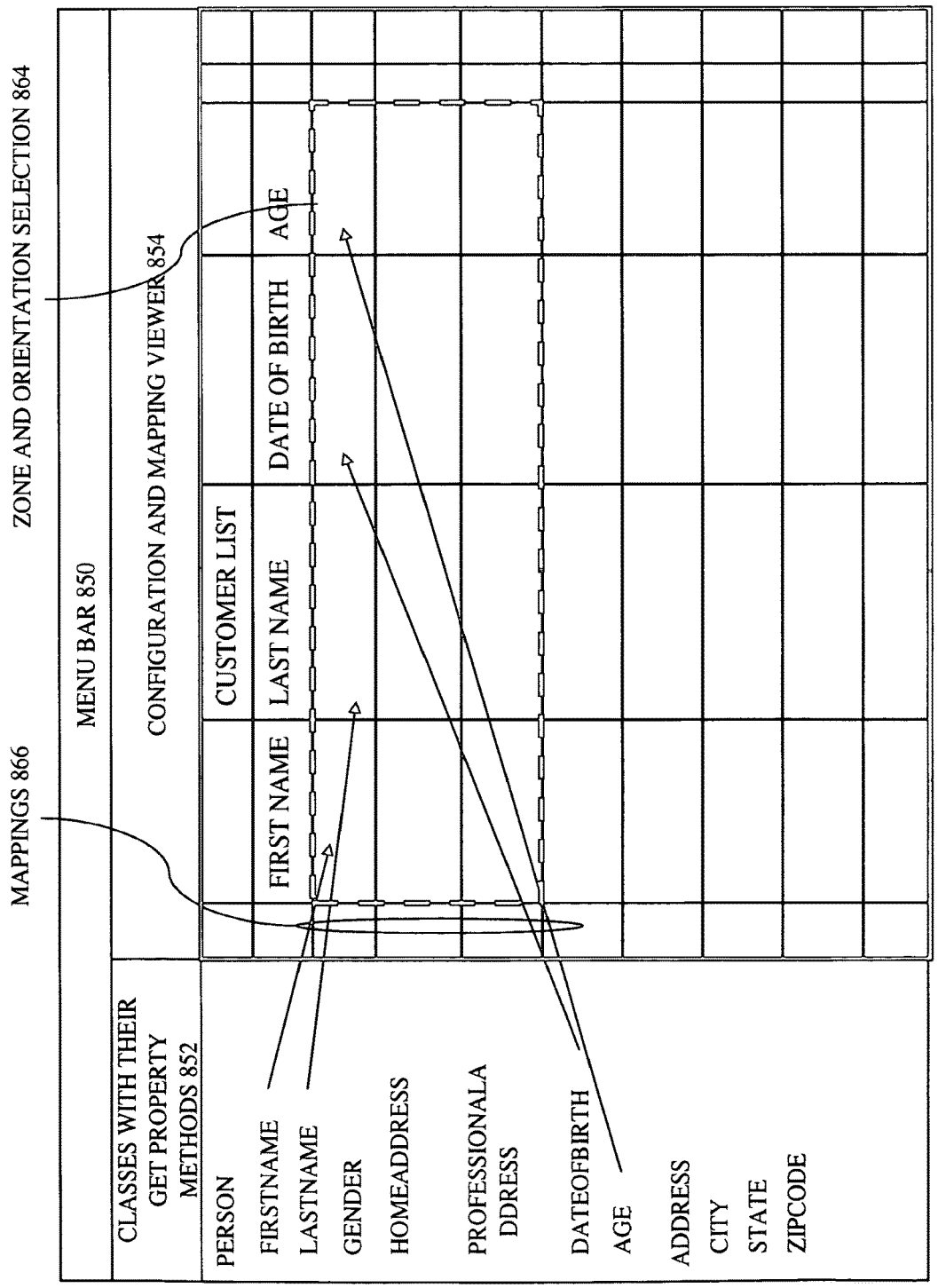
FIG. 8E illustrates an exemplary screenshot and usage of table creation with the configurable interactive producer output layout graphical user interface module 840 according to one embodiment of the invention.

FIGS. 8C-D illustrate exemplary screenshots and usage of free cell selection according to one embodiment of the invention, while FIGS. 8E-F illustrate exemplary screenshots and usage of table creation according to one embodiment of the invention. Each of FIGS. 8C-F include a menu bar 850 along the top of the screen, a list of classes (with their get property methods) 852 of the producers in the current producer graph and their outputs down the left side of the screen, and a configuration and mapping viewer 854 filling the remainder of the screen with a spreadsheet like layout. In addition, FIGS. 8C-F also show the following exemplary list of classes with their get property methods in the list 852: 1) the class PERSON; 2) the get property methods of the class person including FIRSTNAME (e.g., string), LASTNAME (e.g., string), GENDER (e.g., string), HOMEADDRESS (instance of the class ADDRESS), PROFESSIONALADDRESS (instance of the class ADDRESS), DATEOFBIRTH (e.g., date), and AGE (e.g., integer); 3) the class ADDRESS; and 4) the get property methods of the class ADDRESS including CITY (e.g., string), STATE (e.g., string), ZIPCODE (e.g., string). As such, the current producer graph includes producers of the classes PERSON and ADDRESS, as well as producers whose outputs are of classes PERSON and ADDRESS. It is also worth nothing that the get property method AGE calculates an age based on the output of the get property method DATEOFBIRTH; as such, a producer instantiated from the get property method AGE will be dependent on a producer instantiated from the get property method DATEOFBIRTH.

FIGS. 8C-D show the following free text entered in consecutive cells of the first column of the viewer: CUSTOMER, FIRST NAME, LAST NAME, DATE OF BIRTH, and AGE; while FIGS. 8E-F show the following: 1) free text entered in the first row of the viewer—CUSTOMER LIST; and 2) free text entered in consecutive cells of the second row of the viewer FIRST NAME, LAST NAME, DATE OF BIRTH, AND AGE.

FIG. 8C illustrates an exemplary screenshot and usage of free cell selection with the configurable interactive producer output layout graphical user interface module 840 according to one embodiment of the invention. FIG. 8C shows a set of mappings 856 of the class PERSON and selected get property methods of the class PERSON to different cells of the viewer. Specifically, the class PERSON is mapped to the cell to the right of the free text CUSTOMER. As part of this action, some embodiments of the invention prompt the user to select from one of a number of supported filters (show as filter selection 858) (e.g., drop down list, form scrolling arrows, etc.). These filters enable the selection of one or more instance keys of producers of the selected class, or one or more instance keys of the producers whose output class is the selected class. While some embodiments of the invention support a number of filters, other embodiments of the invention default to one (and allow the user to chose whether to select a different one) or support only one and do not need to perform filter selection 858. The mappings 856 also show that the get property methods FIRSTNAME, LASTNAME, DATEOFBIRTH, and AGE of the class PERSON are respectively mapped to the cells adjacent to the cells with corresponding free text. Such a mapping may be performed with any number of well known techniques, including drag and drop, typing in a GUI field, etc.

FIG. 8D illustrates another exemplary screenshot and usage of free cell selection with the configurable interactive producer output layout graphical user interface module 840 according to one embodiment of the invention. FIG. 8D shows that the cell to which the class PERSON was mapped to allow for instance selection 854. Specifically, based on the filter used for this cell, the user is given the opportunity to select an instance of the class PERSON from a list including the instance keys (s) of the producers of the class PERSON, and the instance keys of the producers producing the class PERSON. The selection of an instance of the class PERSON (or the existence of a single instance) results the automatic population of the cells, to which the get property methods of the class PERSON were mapped, with the outputs of the corresponding get property methods of that instance. This populating of the table based on the instances of the class PERSON is labeled 858. In the example of FIG. 8D, the cells to which the get property methods FIRSTNAME, LASTNAME, DATEOFBIRTH, and AGE of the class PERSON were mapped being respectively populated with JOHN, SMITH, Jul. 20, 1990, and 16.

FIG. 8D also shows that cells of the viewer to which get property methods have been mapped may be overridden. By way of example, FIG. 8D shows that if the cell to which the get property method DATEOFBIRTH is mapped is overridden, then it will cause the overriding of the output of the producer whose output is currently populating that cell, invocation of a global execute command (which would result in a reexecution of the producer whose output is currently populating the cell to which the get property method AGE is mapped), and any necessary updating of the display.

FIG. 8E illustrates an exemplary screenshot and usage of table creation with the configurable interactive producer output layout graphical user interface module 840 according to one embodiment of the invention. FIG. 8E shows a zone and orientation selection 864 operation is performed to identify a three row vertical table directly under the cells with free text FIRST NAME, LAST NAME, DATE OF BIRTH, AND AGE (illustrated with a thick dashed line around these cells). Different embodiments of the invention may support the user performing this operation any number of ways (including: 1) selection of an area with an input device like a mouse; and 2) selection between a vertical, horizontal, or pivot table with an interface like a popup menu—assuming multiple orientations are supported). FIG. 8E also shows a set of mappings 866 of selected get property methods of the class PERSON to different cells of the viewer. Specifically, the mappings 866 show that the get property methods FIRSTNAME, LASTNAME, DATEOFBIRTH, and AGE of the class PERSON are respectively mapped to the cells directly beneath the cells with corresponding free text.

FIG. 8F illustrates another exemplary screenshot and usage of table creation with the configurable interactive producer output layout graphical user interface module 840 according to one embodiment of the invention. The mappings 866 results in the automatic population of the columns of the table, to which the get property methods of the class PERSON were mapped, with the outputs of the corresponding get property methods of the instances of that class. This populating of the table based on the instances of the class PERSON is labeled 868. In the example of FIG. 8D, the columns to which the get property methods FIRSTNAME, LASTNAME, DATEOFBIRTH, and AGE of the class PERSON were mapped being populated with the following rows of data: 1) STEVE, COLLINS, Jul. 20, 1990, and 16; 2) JENNIFER, ADAMS, Jul. 20, 1990, and 16; and 3) JOHN, SMITH, Jul. 20, 1985, and 21.

As in FIG. 8D, FIG. 8F shows that cells of the viewer to which get property methods have been mapped may be overridden. By way of example, FIG. 8F shows that if the cell of the second row of the column to which the get property method DATEOFBIRTH is mapped is overridden, then it will cause the overriding of the output of the producer whose output is currently populating that cell, invocation of a global execute command (which would result in a reexecution of the producer whose output is currently populating the cell to which the get property method AGE is mapped), and any necessary updating of the display.

FIGS. 8C-F illustrate exemplary screens generated by the configuration and mapping graphical user interface module 842. The screens generated by the rendering and interactive graphical user interface module 846 are the same, with the exception that the list of classes (with their get property methods) 852 the configuration and mapping viewer 854 are replaced by a rendering and interactive viewer (not shown) that contains the same image as the configuration and mapping viewer 854 displayed (the difference being the mapping feature is no longer available).

Exemplary Runtime Distribution Schemes

FIGS. 9A-C illustrate various schemes for distributing a runtime with producer graph oriented programming support. It should be understood that these distribution schemes are exemplary, and thus other schemes are within the scope of the invention.

FIG. 9A is a block diagram illustrating a first scheme for distributing a runtime with producer graph oriented programming support according to one embodiment of the invention. In FIG. 9A, object-oriented source code 905 (which would include producer dependency declarations) is shown on top of a runtime with producer graph oriented programming support 910, which is on top of a runtime with class loading, dynamic class instantiation, dynamic single method invocation, and class/method introspection 915, which is on top of an operating system 920. In FIG. 9A, the runtime 910 works with the runtime 915. While any number of mechanisms may be used to allow runtime 910 to work with runtime 915, a metadata facility is described by way of example. A metadata facility allows additional information to be added to source code, which information is used by development tools. For example, the Metadata Facility for Java specification defines an API for annotating fields, methods, and classes as having particular attributes that indicate they should be processed in special ways by development tools, deployment tools, or run-time libraries (Java Specification Request 175). In this example, a programmer programming the object-oriented source code 905 would add annotations to methods in the form of the producer dependency declarations. Since these annotations are handed off by the runtime 915 to the runtime 910, the runtime 910 dictates the syntax of the producer dependency declarations. In FIG. 9A, the runtimes 910 and 915 may be developed and/or distributed by different organizations.

FIG. 9B is a block diagram illustrating a second scheme for distributing a runtime with producer graph oriented programming support according to one embodiment of the invention. In FIG. 9B, object-oriented source code 925 (which would include producer dependency declarations) is shown on top of a runtime (with class loading, dynamic class instantiation, dynamic single method invocation, and class/method introspection, as well as producer graph oriented programming support) 930, which is on top of an operating system 935. In comparison to FIG. 9A, the runtime 910 and 915 have been combined into a single runtime 930. As a result of this combination, the runtime 930 dictates the syntax of the producer dependency declarations. Thus, a programmer programming the object-oriented source code 925 would add the producer dependency declarations in the required syntax.

FIG. 9C is a block diagram illustrating a third scheme for distributing a runtime with producer graph oriented programming support according to one embodiment of the invention. In FIG. 9C, object-oriented source code 940 (which would include producer dependency declarations) is shown on top of an operating system runtime (with class loading, dynamic class instantiation, dynamic single method invocation, and class/method introspection, as well as producer graph oriented programming support) 945. In comparison to FIG. 9B, the runtime 920 and operating system 935 have been combined into a single entity. As a result of this combination, the operating system runtime 945 dictates the syntax of the producer dependency declarations. Thus, a programmer programming the object-oriented source code 940 would add the producer dependency declarations in the required syntax.

While embodiments are described in which the runtime has class loading, dynamic class instantiation, dynamic single method invocation, and class/method introspection, alternative embodiments may include more or less features (e.g., instance cloning, dynamic proxies, primitive type conversions, etc.)

Exemplary Advantages

In one embodiment of the invention, producer dependencies are declared for methods as a way to specify method invocation sequencing using the appropriate instances (where the appropriate instances include the instances to use as arguments, the instances to be used by instance methods, and the meta class instances used by class methods) without using manual invocation sequencing code. Effectively, the work of generating some or all of manual invocation sequencing code is replaced with: 1) work done by the application programmer to write the producer dependency declarations; and 2) work done by the runtime to discover and build the producer graph(s) and execute the producers of those producer graph(s). In other words, the logic that was previously contained in the manual invocation sequencing code is discoverable by the runtime during run time based on the producer dependency declarations. Thus, the producer dependency declarations inform the runtime what methods of what instances with what arguments to execute, and when for synchronization purposes. Although the effort to write the runtime is relatively great, it needs only be written once in that it can be used to execute any object-oriented applications written for the runtime; in contrast, for a typical application, the effort to write the producer dependency declarations is relatively low in comparison to writing manual invocation sequencing code.

Reducing Programming Mistakes

Producer graph oriented programming typically reduces the costs associated with the debugging and/or performance tuning of the manual invocation sequencing code. This is true for at least the reason that the infrastructure of an application program is conceptually a set of non-formalized graphs of transformation methods of objects (the output of one method associated with an object is the input to another, and so on) that operate on specific inputs. The producer dependency declarations and the runtime with producer graph oriented programming support formalizes these graphs as producer graphs. Thus, for each opportunity for data to change, the application programmer need not consider its effect and write manual invocation sequencing code to cause the appropriate transformation methods of the appropriate instances to be invoked in the appropriate order with the appropriate inputs. In other words, for each opportunity for data to change, an application programmer need not consider which graphs are affected, as well as which transformation methods of instances within those graphs are affected. Rather, the automated producer graph generation module discovers and builds the producer graphs and the producer graph execution module reexecutes the producer graphs as needed to reflect changes in the data. This automation helps application programmers avoid mistakes such as: 1) invoking the appropriate transformation methods of the appropriate instances in the wrong order; 2) forgetting to include commands to cause the one or more required transformation methods of instances in a graph to be invoked responsive to some data being changed; 3) including commands to cause unnecessary transformation methods of instances to be invoked responsive to some data being changed (e.g., including commands to invoke transformation methods of instances that are not part of a graph affected by the change in data; including commands to invoke transformation methods of instances that are part of a graph affected by the change in the data, but are not themselves affected; etc.).

Synchronization

As previously described, the caching of producer outputs during execution allows for synchronization. Thus, in terms of comparison to the observer pattern, the producer dependency declarations notify a runtime with producer graph oriented programming support of the dependencies, and the runtime determines what producers and when to call back.

Ability to Fully Explain any Result

In one embodiment of the invention, a drilling/viewing module (not shown) is included as part of the runtime. The drilling/viewing module provides a graphical user interface which, through interaction by an end user, allows for drilling down into the producer graph (walking down a producer graph from the root node) to view the outputs of the various producers of the producer graph. This allows an end user to see the various outputs that contributed to the output of the producer of interest, including the data values and dependencies (returned by dependency determination producers). Further, in one embodiment of the invention, this drilling/viewing module provides the ability for the end user to view the code inside the methods of the producers, the values of the instances of the producers, and/or the content of the classes of the producers.

Thus, the drilling/viewing module provides for a variety of post processing activities, including debugging, explanation of outputs, etc.

Exemplary Practical Application/Technical Effect/Industrial Applicability

There are a variety of exemplary practical applications of the different aspects and embodiments of the invention. For example, the runtime, as part of executing application programs, causes the retrieval of information from a machine storage media (e.g., accessing the object-oriented source code, including the producer dependency declarations), the storage of information to a machine storage media (e.g., storing data structures like the producer graph(s) structure, etc.), the operation of hardware processing resources, the provision of the outputs of the producer(s) of interest (e.g., through a graphical user interface, storage to machine storage media, transmission, etc.), etc. In one sense, preprocessing activity includes the writing of such an application program and/or the provision of data (which data may represent any number of physical and/or practical items, such as financial values, geographical values, meteorological values, actuarial values, statistical values, physical measures, machine state values, etc.), while post processing activity includes the provision of results (which results may represent any number of physical and or practical items, such as financial analysis, geographical analysis, meteorological analysis, actuarial analysis, statistical analysis, industrial measures, machine control information, etc. By way of specific example, post processing activity may be provided by: 1) the producer graph viewer module 1062 of FIG. 10 for graphically displaying a representation of the current producer graph(s) generated by the runtime; and/or 2) the configurable interactive producer output layout graphical user interface module 840 (see also, configurable interactive producer output layout graphical user interface module 1085 of FIG. 10) for graphically displaying outputs from and interacting with the producer graphs.

As another example, the application program with producer dependency declarations itself, when executed by the runtime, represents the physical/practical items and causes the operations described above. By way of specific example, these producer dependency declarations cause data structures to be formed in machine storage media responsive to their execution by the runtime. Also, the producer dependency declarations are stored and retrieved from machine storage media along with the application program. Further, these producer dependency declarations represent relationships between producers, while producers represent operations to be performed (methods) and instances. The instances in object-oriented programming may be used to represent physical and/or practical items, while the producers represent operations to be performed on these representations.

By way of another example, a set of one or more application programs and the runtime implement cross-asset risk management software covering foreign exchange, equity, interest rate, credit, inflation, commodity, and cross-asset composite products. These products range from cash and physical plain vanilla products to exotic and complex derivative products. Also included is a set of mathematical valuation models for these products, and their associated market data, payment and accounting entries generation routines and their associated observables, calibration models and their associated raw inputs.

By way of another example, a set of one or more application programs and the runtime may implement a word processor, a spreadsheet, a communication/e-mail software, a photo viewing software, a virus scan software, a media player, a database server, a game, an industrial application, a computer aided design tool application, and/or an operating system. Of course, application programs can be implemented to perform a variety of other tasks.

Exemplary Implementations

By way of illustration, exemplary embodiments of the invention will be described that support dependencies, dynamic dependencies (including contingent dependencies and subscription dependencies), explicit dependency determination producers for shortcut declared dependencies and for non-shortcut declared dependencies, on the fly dependency determination producers for shortcut declared dependencies, class keys, instance keys, method keys, producer override/unoverride commands (which are types of set commands), and global execute commands. In addition, the exemplary embodiments optionally support a producer graph interactive viewer module and incremental execution. Of course, alternative embodiments of the invention may implement more, less, and/or different features.

Figure 10:
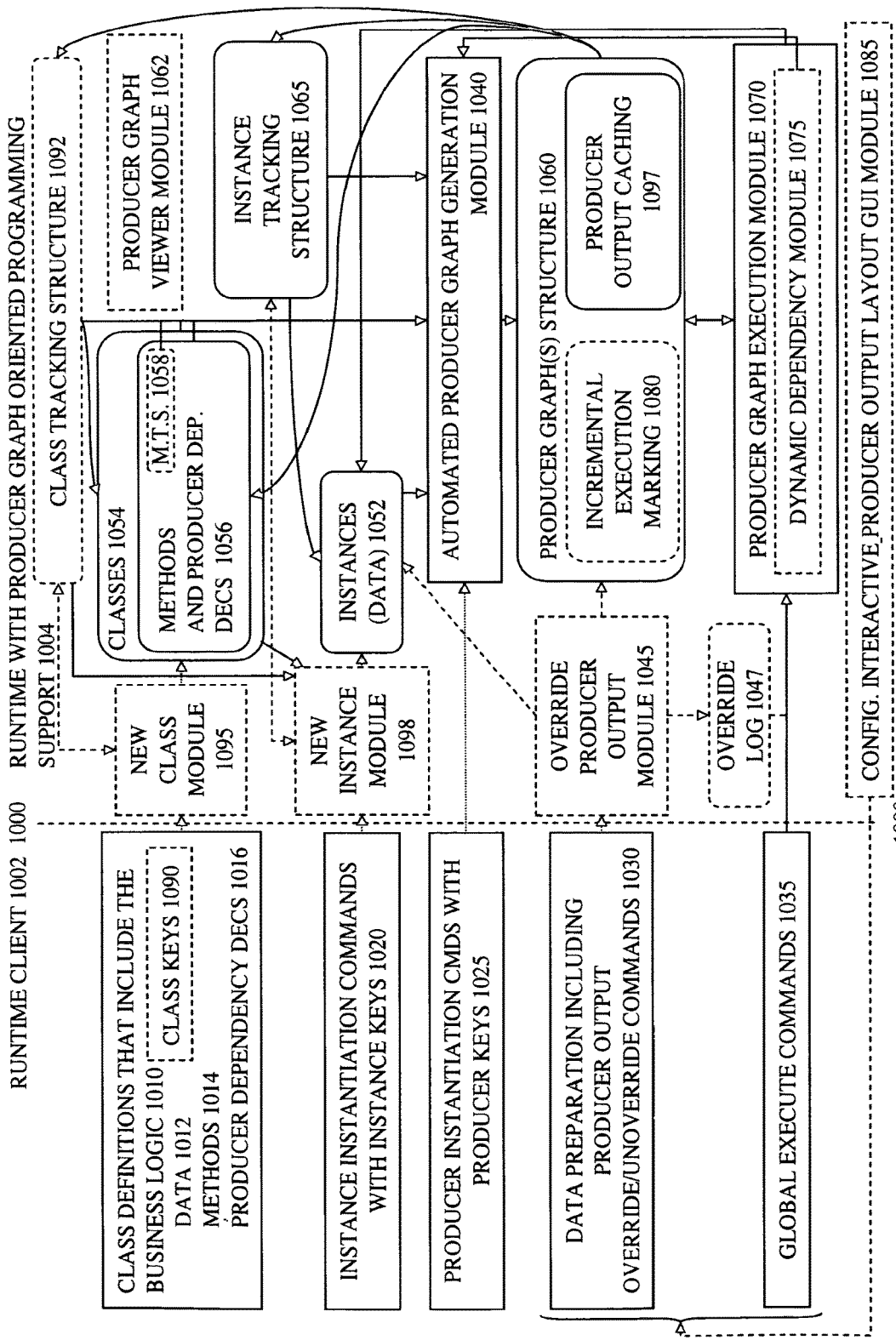
FIG. 10 is a block diagram of an exemplary implementation according to one embodiment of the invention.

FIG. 10 is a block diagram of an exemplary implementation according to one embodiment of the invention. In FIG. 10, dashed dividing line 1000 separates a runtime client 1002 from a runtime with producer graph oriented programming support 1004.

The logical execution flow of the runtime client 1002 includes blocks 1010, 1020, 1025, 1030, and 1035, and the runtime with producer graph oriented programming support 1004 includes respectively corresponding blocks 1095, 1098, 1040, 1045, and 1070; while a solid arrowed line represents a direct causal relationship from block 1035 of the logical execution flow of the runtime client 1002 to block 1070 of the runtime with producer graph oriented support 1004, dotted arrowed lines illustrate a causal relationship from blocks 1010, 1020, 1025, and 1030 of the runtime client 1002 to blocks 1095, 1098, 1040, and 1045 of the runtime with producer graph oriented programming support 1004. Depending on the embodiment of the invention, these later causal relationships may be direct or indirect. For example, similar to FIG. 6, an optional indirect causation through the use of a command log (not shown) and/or override log 1047 may be used. Further blocks 1095 and 1098 are dashed because they may optionally be part of a different block depending on the embodiment of the invention (e.g., block 1095 may be part of block 1098; block 1098 may be part of block 1040; blocks 1095 and 1098 may be part of block 1040). Similarly, block 1045 is dashed because it may be optionally part of a different block depending on the embodiment of the invention (e.g., block 1045 may be part of block 1070).

In FIG. 10, the runtime 1002 includes class definitions that include business logic 1010 having data 1012, methods 1014, producer dependency declarations 1016, and optionally class keys 1090. The class definitions 1010 are classes in an object-oriented programming language, and thus include definitions for data 1012 and methods 1014. In addition, these class definitions 1010 include producer dependency declarations 1016 for the method 1014 as previously described. Further, in one embodiment of the invention, each class has a class key 1090 for tracking purposes.

The new class module 1095 of the runtime 1004 loads and introspects the class definitions 1010 (e.g., responsive to new class commands). This loading and introspecting may be done using any number of well known or future developed techniques, including those to selectively load classes for optimization purposes. The loading of the classes by the new class module 1095 is illustrated by classes 1054 of the runtime 1004. As part of loading and introspecting the classes 1054, the new class module 1095 also loads and introspects the producer dependency declarations 1016 as illustrated by methods and producer dependency declarations 1056 in the classes 1054. The new class module 1095 also maintains a class tracking structure 1092 that is used for tracking the classes using the class keys. Thus, the class tracking structure 1092 maintains a correspondence between class keys and references into the classes 1054. Further, the new class module 1095 also maintains a method tracking structure 1058 that is used for tracking methods using the method keys. Thus, the method tracking structure 1058 maintains a correspondence between method keys and references to the methods, as well as information regarding the producer dependency declarations.

The runtime client 1002 also includes instance instantiation commands with instance keys 1020. The new instance module 1098 of the runtime 1004 instantiates the instances designated by the instance instantiation commands with instance keys 1020 (e.g., responsive to new instance commands). This instantiating of instances may be done using any number of well known or future developed techniques, including those to selectively instantiate instances for optimization purposes. As part of this instantiating of instances, the new instance module 1098 accesses the class tracking structure 1092 using a class key to access the appropriate class from the classes 1054. The instantiating of instances by the new instance module 1098 is illustrated by instances 1052 of the runtime 1004. The new instance module 1095 also maintains an instance tracking structure 1065 that is used for tracking the instances using the instance keys. Thus, the instance tracking structure 1065 maintains a correspondence between instance keys and references into the instances 1052. As previously indicated, the new class module 1095 may be part of the new instance module 1098 in that the classes 1054 may be instantiated responsive to the instance instantiation commands 1020, as opposed to separate new class commands.

The runtime client 1002 also includes producer instantiation commands with producer keys 1025. The automated producer graph generation module 1040 of the runtime 1004 instantiates producers designated by the producer instantiation commands with producer keys 1025 (e.g., responsive to new producer commands designating the current set of producers of interest). In addition, the automated producer graph generation module 1040 also discovers, builds, and optionally resolves the producer graph(s) responsive to the current set of producers of interest as previously described. In one embodiment of the invention, a producer key is comprised of a class key, instance key, and method key. As part of this instantiating of producers, the automated producer graph generation module 1040: 1) accesses the class tracking structure 1092 using the class key to access the appropriate class from the classes 1054; 2) accesses the instance tracking structure 1065 using the instance key to access the appropriate instance from the instances 1052; and 3) accesses the method tracking structure using the method key to access the appropriate producer dependency declaration statement. The instantiating of the producers designated by the producer instantiation commands with producer keys 1025 and instantiating of the any discovered producers and building the producer graph is illustrated by producer graph(s) structure 1060 of the runtime 1004. Thus, in one embodiment of the invention, the producer keys identified by the producer instantiation commands with producer keys 1025 and those discovered through producer graph generation are stored in the producer graph(s) structure 1060, along with additional information to represent the current producer graph(s).

As previously described, the block 1095 and 1098 may be part of block 1040, and thus, the decision regarding which classes, instances, and producers to load/instantiate is driven by what producers are in the current producer graph(s). In such an embodiment of the invention, the loading/instantiating of class, instances, and producers is optimized and is producer centric.

The runtime client 1002 also includes data preparation commands, including producer output override/unoverride commands 1030. The override/unoverride commands include the producer key of the producer to be overridden/unoverridden, as well as the override values when being overridden. The override producer output module 1045 of the runtime 1004 causes producers designated by the producer override/unoverride commands to be overridden/unoverridden. This causation may be indirect or direct.

In the case of indirect causation, the override producer output module 1045 populates the override log 1047 for consumption by the producer graph execution module 1070. In the case of direct causation, the override producer output module 1045 accesses the producer output caching 1097 of the producer graph(s) structure 1060 and the instances 1052. Specifically, as described with reference to the override producer output module 390, in one embodiment, producers can be classified as property producers or method producers; thus, the override producer output module 1045 may include an override property producer output module (not shown) for overridden property producers and an override method producer output module (not shown) for overridden method producers; the overriding of a property method causes the overridden value to be stored in the producer output caching 1097 of the producer graph(s) structure 1060 and to be stored in the data of the appropriate instance of the instances 1052, whereas the overriding of a method producer causes the overridden value to be stored in the producer output caching 1097.

In one embodiment of the invention producers may not be overridden before a producer graph of which they will be part has been initially executed (thus, the producer will already be instantiated as a result of being designated as a producer of interest or as a result of being discovered by the automated producer graph generation module 1040). However, in the embodiment shown in FIG. 10, producers may be overridden before the initial execution by being instantiated and overridden with a producer override command. Such an overridden producer will typically eventually become part of a producer graph through the discovery process (e.g., when a dynamic dependency is resolved). In some embodiments of the invention, this data preparation may also include other types of set commands. The override producer output module 1045 is shown as a dashed box because it may not be present in alternative embodiments of the invention.

The producer graph(s) structure 1060 also optionally includes incremental execution marking 1080 for some embodiments of the invention that support incremental execution. As previously described with reference to the incremental execution marking 382 of FIG. 3B, the incremental execution markings 1080 is used to assist with incremental execution of the producer graph(s) on execution beyond that of the initial execution. Different embodiments of the invention that use the incremental execution marking 382, use them in different ways. For example, in one such embodiment of the invention that has a command log, the log is used to track which producers have been added and/or modified, and the incremental execution marking 382 are used to mark those producers that are affected (ancestors of the modified or added producers, and thus dependent on them). As another example, in one such embodiment of the invention that does not have a command log, the incremental execution marking 382 are used to mark those producers that are added or modified, as well as those that are ancestors of the modified or added producers (and thus dependent on them). As another example, in one such embodiment of the invention that does not have a command log, modifications and additions of producers are done immediately and the incremental execution marking 382 are used to mark those producers that are ancestors of the modified or added producers (and thus dependent on them). While embodiments of the invention have been described that support incremental execution and use incremental execution marking, other embodiments of the invention support incremental execution that do not use incremental execution marking (e.g., a command log is used to track which producers were added or modified, and a list of execution start producers is maintained in an execution start log; where the producer graph execution module 1070 starts from the execution start producers and works its way up the ancestors of the producer graph(s) to the top; by way of example and not limitation, this embodiment of the invention is described later herein with regard to FIGS. 15-25).

The runtime client 1002 also includes global execution commands 1035. The producer graph execution module 1070 of the runtime 1004 executes the producer graph(s). As such, the producer graph execution module 1070 modifies the producer output caching 1097 (in the case of property producers and method producers), uses the incremental execution marking 1080 (if present), and modifies the data of the instances 1052 (in the case of property methods). Various techniques have been previously discussed for executing the producers of the producer graph and are applicable here. For instance, in embodiments in which a command log is implemented, the command log is consumed and then the producer graph(s) are executed. Further, in embodiments of the invention that support the possibility of unresolved dependencies, producer graph execution module 1070 includes dynamic dependency module 1075, which can invoke the automated producer graph generation module 1040.

FIG. 10 also shows an optional producer graph viewer module 1062 that provides a mechanism (e.g., a graphical user interface) by which a programmer/user can view the producer graph(s) and producer outputs of the producer graph(s) structure. Further, FIG. 10 shows an optional configurable interactive producer output layout graphical user interface module 1085 to provide for a graphical user interface (including dynamic invocation of blocks 1030, and 1035) that represents the configurable interactive producer output layout graphical user interface module 840.

In embodiments of the invention that use a command log, different triggers may be use to trigger different actions. For instance, the producer instantiation commands may be logged and batch processed responsive to an explicit command (start logging and end logging), an explicit global execute command (logging starts automatically at startup and after each explicit global execute command, and each log is processed responsive to the following explicit global execute command), an explicit data preparation command, etc. Similarly, the data preparation commands may be logged and batch processed responsive to an explicit global execute command, a first get command, every get command, etc.

Exemplary Tracking Structures

FIGS. 11A-D are block diagrams illustrating exemplary content of the data structures of FIG. 10 according to one embodiment of the invention. While FIGS. 11A-D illustrate these data structures as tables, it should be understood that any suitable data structure may be used (e.g., a hash map, a set, a list).

FIG. 11A is a block diagram of an example of the class tracking structure 1092 of FIG. 10 according to one embodiment of the invention. In FIG. 11A, a class key column 1110 and a class reference column 1115 are shown to respectively store the class keys and corresponding references to the loaded classes.

FIG. 11B is a block diagram of an example of the instance tracking structure 1065 of FIG. 10 according to one embodiment of the invention. In FIG. 11B, an instance key column 1120 and an instance reference column 1125 are shown to respectively store the instance keys and corresponding references to the instances. In embodiments of the invention in which instance keys need not be unique across all classes, the instance tracking structure also include the class key or reference for the class of the instance.

FIG. 11C is a block diagram of an example of the producer graph(s) structure 1060 of FIG. 10 according to one embodiment of the invention. In FIG. 11C, a class reference column 1135, an instance reference column 1140, and a method reference column 1145 are shown to respectively store references that make up the current producers of the current producer graph(s). These references may take a variety of forms. For example, these columns may respectively store references into the classes 1054 (or alternatively 1092), instances 1052 (or alternatively 1065), and methods 1056 (or alternatively 1058). While in one embodiment of the invention these columns store references, in alternative embodiment of the invention one or more of these columns store keys.

In addition, FIG. 11C includes a parent producer(s) link(s) column 1150 (including for each link a parent producer reference, and a dependency determination producer reference) and a child producer(s) link(s) column 1160 (including for each link, child producer reference(s), a dependency determination producer reference, a link mode, and a sticky link indicator). Each producer may have zero or more child producer links in column 1160. Each child producer link in column 1160 includes: 1) child producer reference(s) which are references to other rows of the producer graph(s) structure to represent a producer dependency according to the producer dependency declaration; 2) a dependency determination producer reference which is a reference to another row of the producer graph(s) structure and represents the dependency determination producer that has created the child link; and 3) a link mode with a producer dependency type that identifies whether the producer dependency is a result of an argument, a field, or a sequencing dependency (see discussion regarding FIGS. 7A-F), and if an argument, the argument ID of the producer dependency; and 4) a sticky indicator to indicate that the link mode is the result of an upwardly declared dependency (in embodiments of the invention that support upwardly declared dependencies) or the result of a sticky subscription (in embodiments of the invention that support sticky subscriptions) and should not be modified through the producer argument dependency declaration of this producer (i.e., the producer stored in the row of the column containing the sticky indicator). Each producer may have zero or more parent producer links in column 1150. Each parent producer link in column 1150 includes: 1) a parent producer reference that stores back a reference in accordance with a child producer reference of another producer (i.e., a reference to another row of the producer graph(s) structure to represent a parent producer dependent on this producer); and 2) a dependency determination producer reference which is a reference to another row of the producer graph(s) structure and represents the dependency determination producer which has created the parent link. Thus, when a link is created, the parent producer link column of the child producer's row and the child producer link column of the parent producer's row are modified to represent the link (and the dependency determination producer reference is the same in both). In one embodiment of the invention, since multiple paths in a producer graph or different producer graphs may include a given producer, there may be multiple parent producer links for a given producer.

Further, FIG. 11C includes a producer output caching and override producer output modification column 1170 to store the current producer outputs, as well as an indication of whether the producer is overridden and the overridden output value. Also, FIG. 11C includes an incremental execution marking column 1180 to store incremental execution markings as previously described.

FIG. 11D is a block diagram of an example of the method tracking structure 1058 of FIG. 10 according to one embodiment of the invention. In FIG. 11D, a method key column 1190 and a method reference column 1192 are shown to respectively store the method keys and corresponding references to the methods of the loaded classes. In addition, FIG. 11D also includes an ArgumentDependencies column 1194, a FieldDependencies column 1196, a SequencingDependencies column 1195, an UpwardDependencies column 1193, a WeaklyConstrainedDependencies column 1199, an output class column 1197, and an optional additional annotations column 1198. The ArgumentDependencies column 1194, the SequencingDependencies column 1195, the UpwardDependencies column 1193, the WeaklyConstrainedDependencies column 1199, and the FieldDependencies column 1196 store producer dependency information parsed from the producer dependency declaration statement of the method (e.g., see 705 of FIG. 7A), while the output class column 1197 stores information regarding the output class of the output of the method (determinable by the method's signature—e.g., see 710 of FIG. 7A). Exemplary contents of the ArgumentDependencies column 1194, FieldDependencies column 1196, SequencingDependencies column 1195, UpwardDependency column 1193, and WeaklyConstrainedDependencies column 1199, used in some embodiments of the invention are provided later herein.

Dynamic Producer Dependencies

As previously described, one embodiment of the invention supports non-dynamic and dynamic producer dependencies. While different embodiments may support different types of dynamic producer dependencies, one embodiment of the invention supports contingent and subscription types of dynamic producer dependencies. Thus, a non-contingent, non-subscription dependency is a non-dynamic (static) dependency.

Figure 12:
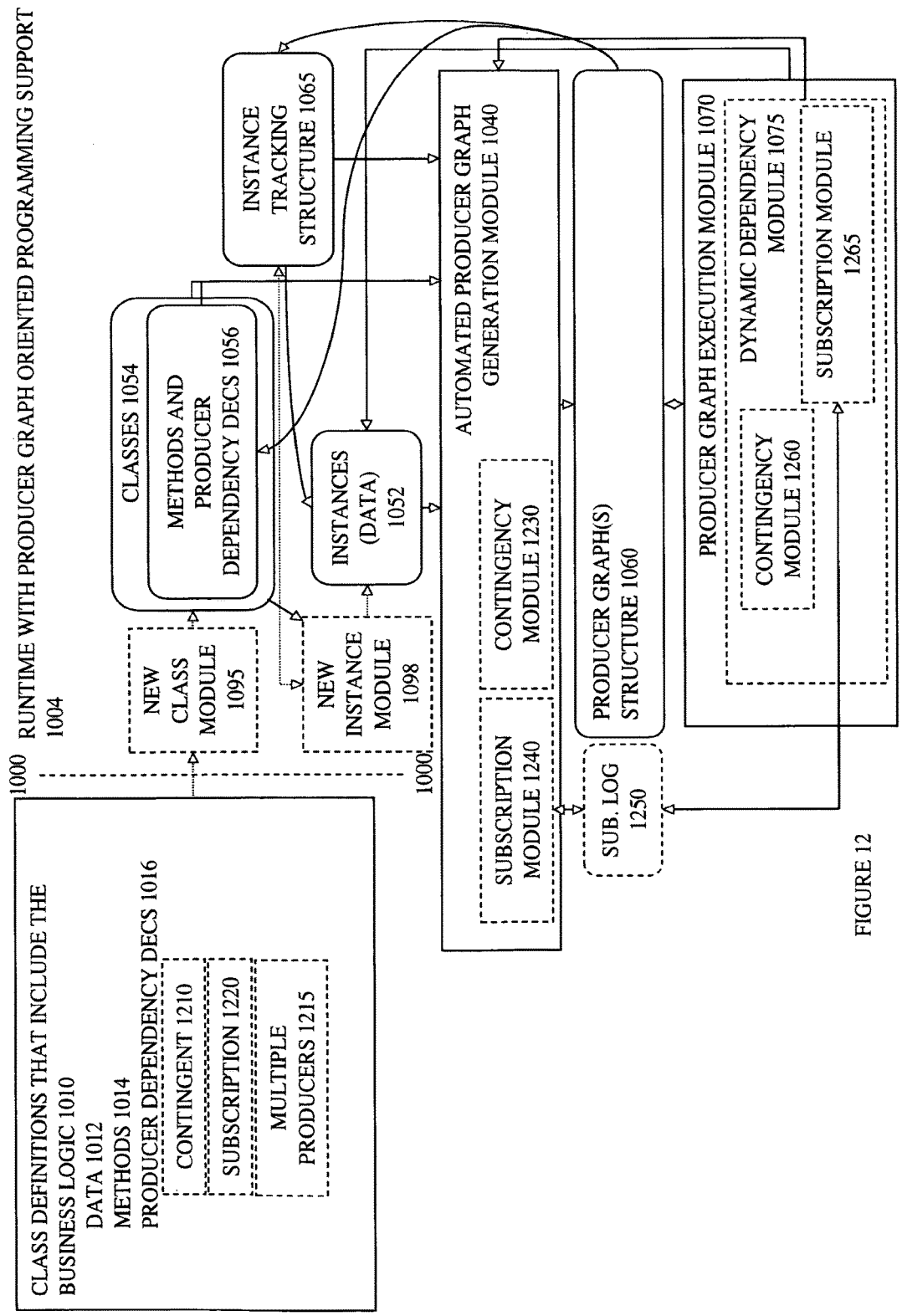
FIG. 12 is a block diagram illustrating additional detail of FIG. 10 to support contingent and subscription type dynamic producer dependencies according to one embodiment of the invention.

FIG. 12 is a block diagram illustrating additional detail of FIG. 10 to support contingent and subscription type dynamic producer dependencies according to one embodiment of the invention. FIG. 12 includes from FIG. 10 the dashed dividing line 1000, the class definitions that include business logic 1010 (which include data 1012, methods 1014, and producer dependency declarations 1016), the new class module 1095, the classes 1054 (including methods and producer dependency declarations 1056), the new instance module 1098, the instances 1052, the instance tracking structure 1065, the automated producer graph generation module 1040, the producer graph(s) structure 1060, and the producer graph execution module 1070 (including the dynamic dependency module 1075).

FIG. 12 shows that the producer dependency declarations 1016 optionally include contingent dependencies 1210, subscription dependencies 1220, and multiple producers 1215. Here, multiple producers 1215 refers to the ability of a producer dependency to return a collection of producers. In addition, FIG. 12 includes a subscription module 1240 and a contingency module 1230 in the automated producer graph generation module 1040 to process the contingent dependencies 1210 and subscription dependencies 1220. FIG. 12 also shows that the subscription module 1240 accesses a subscription log 1250. Further, the dynamic dependency module 1075 includes a contingency module 1260 and a subscription module 1265 to process the contingent dependencies 1210 and subscription dependencies 1220. The subscription module 1265 accesses the subscription log 1250.

The following description of contingent and subscription dependencies is done in the context of an embodiment of the invention that uses a class DEP (an abbreviation for dependency), from which an instance is returned by dependency determination producers and is analyzed by the runtime with producer graph oriented programming support. The class DEP includes the following fields: 1) TYPE which can be set to subscription, non-subscription downwardly declared (child producers that are not subscriptions), or non-subscription upwardly declared (parent producers that are not subscriptions); 2) PROD which is used for non-subscription downwardly declared dependencies and is a collection of child producers (as such, it can store zero or more producers); 3) SUB TYPE which is used for subscription dependencies and is set to indicate the type of subscription dependency (used in embodiments of the invention that support multiple types of subscription; while the embodiment of the invention described here supports two types—sticky and absorbing, alternative embodiments may support more, less, and/or different subscription types; 4) SUB CRIT which is used for subscription dependencies and is set to indicate the subscription criteria; 5) PAR LINK MODE which is used for sticky subscription dependencies and non-subscription upwardly declared dependencies and is set to indicate what the link mode of the parent producer should be; 6) PAR CLASS which is used for sticky subscription dependencies and non-subscription upwardly declared dependencies and is set to indicate what the class of the parent producer (e.g., the class key) should be; 7) PAR METHOD which is used for sticky subscription dependencies and non-subscription upwardly declared dependencies and is set to indicate what the method of the parent producer (e.g., the method key) should be; and 8) PAR INSTANCE which is used for sticky subscription dependencies and non-subscription upwardly declared dependencies and is set to indicate what the instance of the parent producer (e.g., the instance key) should be (If PAR INSTANCE is left blank, the instance key of the child producer is then used for the parent producer). An alternative embodiment could use a collection of parent producers (each item of the collection holding a PAR_CLASS, PAR_INSTANCE, PAR_METHOD, PAR_LINK MODE) in the case of sticky subscription dependencies and/or non-subscription upwardly declared dependencies. Of course, other alternative embodiments of the invention could use a different structure to return dependencies.

Contingent Dependencies

In one embodiment of the invention, both non-contingent and contingent producer dependencies are supported. A non-contingent producer dependency is one that is independent of the output of other producers, while a contingent producer dependency is one that is dependent on the output of other producers. While one embodiment of the invention supports both non-contingent and contingent producer dependencies, alternative embodiments support only non-contingent or contingent (which contingent producer dependencies may be initially driven by default values).

As previously discussed, a producer can be viewed as a set of multiple identifiers, one identifier for each additional level of granularity specified. In one embodiment of the invention, a contingent producer dependency can be contingent in the sense that any one or all of the set of identifiers can be conditionally determined based on current data values. For instance, a first contingent producer dependency may have only the instance identifier be conditionally determined (the class and method identifiers are fixed), while a second contingent producer dependency may have the class, instance, and method identifiers be conditionally determined. While in one embodiment of the invention, all of the plurality of identifiers of a contingent producer dependency may be conditional, alternative embodiments of the invention may be implemented differently (e.g., only allow a subset of the plurality of identifiers to be conditional).

FIGS. 13A-J are block diagrams illustrating pseudo code and exemplary producers according to one embodiment of the invention. In addition, the embodiments shown in FIG. 13A-J use the same dependency determination mechanism for both contingent and non-contingent dependencies. As such, for explanation purposes, some of the examples in FIGS. 13A-J are examples of non-contingent producer dependencies, while the others are examples of contingent producer dependencies. Further, a non-contingent producer dependency is one in which the dependency is to a dependency determination producer that is an independent producer (e.g., in one embodiment of the invention, the dependency type is identifiable because its producer dependency declaration is empty); while a contingent producer dependency is one in which the dependency is to a dependency determination producer that is a dependent producer (e.g., in one embodiment of the invention, the dependency type is identifiable because its producer dependency declaration is non-empty).

Further, circled numbers and letters are used in FIGS. 13A-J to illustrate the order in which operations are performed according to one embodiment of the invention. Also, a notation X::Y::Z is used in FIGS. 13A-J to represent a producer key made up of a class key (X), an instance key (Y), and a method key (Z). Further dashed circles and arrowed lines represent operations that are not performed in some embodiments of the invention. In particular, where the execution of an independent dependency determination producer for a given dependency will always return the same dependency (e.g., an independent dependency determination producer), such dependency determination producer in some embodiments of the invention is executed but not instantiated and linked in the producer graph(s).

Explicit Dependency Determination Producers

FIG. 13A illustrates pseudo code of producer dependency declarations for methods using a non-shortcut declared, non-dynamic (non-contingent, non-subscription) dependency according to one embodiment of the invention; while FIG. 13B is a block diagram of producers illustrating an exemplary non-shortcut declared, non-dynamic (non-contingent, non-subscription) producer dependency according to one embodiment of the invention. FIG. 13A shows: 1) a producer dependency declaration statement 1300 for a method alpha 1305, where the producer dependency declaration statement 1300 includes a producer dependency to a producer CW::IY::BETA; and 2) a producer dependency declaration statement 1310 for a method beta 1315, where the producer dependency declaration statement 1310 is empty, and where the method beta 1315 returns as an argument an instance of the class DEP. The method beta 1315 includes producer dependency declaration code 1320 that sets DEP.TYPE to non-subscription downwardly declared, sets DEP.PROD to producer 13, and returns DEP.

In FIG. 13A, a circled 1 indicates that the producer dependency declaration 1300 is accessed (e.g., as a result of designation of a producer based on the method alpha 1305 as a producer of interest, as a result of automated discovery of a producer based on the method alpha 1305, as a progeny of a producer of interest, etc.). A circled 2 in FIG. 13B shows that a producer C0::I0::ALPHA is instantiated based on the method alpha 1305. A circled 3 in FIG. 13A indicates that the producer dependency to producer CW::IY::BETA is processed to determine the producer dependency, and as a result, a circled 4 indicates that the producer dependency declaration 1310 is accessed. A dashed circled 5 in FIG. 13B shows that a producer CW::IY::BETA is instantiated as a dependency determination producer 1380. A dashed circled 6 in FIG. 13B indicates that the producer C0::I0::ALPHA is linked in the producer graph to indicate that producer CW::IY::BETA is a child producer. A circled 7 in FIG. 13B indicates that the producer CW::IY::BETA is executed and returns DEP to identify producer 13. A circled 8 indicates producer 13 is instantiated, while a circled 9 indicates the producer 13 being linked as a child producer in the producer graph to the producer C0::I0::ALPHA. In FIG. 13B, producer C0::I0::ALPHA and producer 13 are standard producers 1385 (they are not dependency determination producers).

FIG. 13C illustrates pseudo code of producer dependency declarations for methods using a non-shortcut declared, contingent, non-subscription producer dependency according to one embodiment of the invention; while FIG. 13D is a block diagram of producers illustrating an exemplary non-shortcut declared, contingent, non-subscription producer dependency according to one embodiment of the invention. In addition, FIG. 13D refers to the producers 5, 7A, and 7B of FIG. 5A and the resolution of the dynamic dependency of producer 5 to the producer 7A.

FIG. 13C shows: 1) a producer dependency declaration statement 1300 for a method alpha 1305, where the producer dependency declaration statement 1300 includes a producer dependency to a producer CW::IY::BETA; 2) a producer dependency declaration statement 1325 for a method beta 1315, where the producer dependency declaration statement 1325 includes a producer dependency to a producer CU::IV::DELTA, and where the method beta 1315 returns as an argument an instance of the class DEP; 3) a producer dependency declaration statement 1332 for a method delta 1334, where the producer dependency declaration statement 1332 is empty, and where the method delta 1334 returns as an argument an instance of the class DEP; and 4) a producer dependency declaration statement 1338 for a method gamma 1340, where the producer dependency declaration statement 1338 is empty, and where the method gamma 1340 returns a variable X (where X is from an external source, a default value (explicit or constant in the class)). The method beta 1315 includes producer dependency declaration code 1330 that sets DEP.TYPE to non-subscription downwardly declared, sets DEP.PROD to producer 7A or 7B depending on the output of producer CX::IZ::GAMMA, and returns DEP. The method delta 1332 includes producer dependency declaration code 1336 that sets DEP.TYPE to non-subscription downwardly declared, sets DEP.PROD to the producer CX::IZ::GAMMA, and returns DEP.PROD.

In FIG. 13C, a circled 1 indicates that the producer dependency declaration 1300 is accessed (e.g., as a result of designation of a producer based on the method alpha 1305 as a producer of interest, as a result of automated discovery of a producer based on the method alpha 1305 as a progeny of a producer of interest, etc.). A circled 2 in FIG. 13D shows that the producer 5 is instantiated based on the method alpha 1305. A circled 3 in FIG. 13C indicates that the producer dependency to producer CW::IY::BETA is processed to determine the producer dependency, and as a result, a circled 4 indicates that the producer dependency declaration 1325 is accessed. A circled 5 in FIG. 13D shows that a producer CW::IY::BETA is instantiated as a dependency determination producer 1380. A circled 6 in FIG. 13D indicates that the producer 5 is linked in the producer graph to indicate that producer CW::IY::BETA is a child producer.

A circled 7 in FIG. 13C indicates that the producer dependency to producer CU::IV::DELTA is processed to determine the producer dependency, and as a result, a circled 8 indicates that the producer dependency declaration 1332 is accessed. A dashed circled 9 in FIG. 13D shows that a producer CU::IV::DELTA is instantiated as a dependency determination producer 1380. A dashed circled 10 in FIG. 13D indicates that the producer CW::IY::BETA is linked in the producer graph to indicate that producer CU::IV::DELTA is a child producer. A circled 11 in FIG. 13D indicates that the producer CU::IV::DELTA is executed and returns DEP to identify CX::IZ::GAMMA. A circled 12 indicates that the producer CX::IZ::GAMMA is instantiated, while a circled 13 indicates the producer CX::IZ::GAMMA being linked as a child producer in the producer graph to the producer CW::IY::BETA.

In FIG. 13D, a circled A indicates that the producer CX::IZ::GAMMA is executed and returns X to producer CW::IY::BETA, while a circled B indicates that the producer CW::IY::BETA returns DEP to identify producer 7A; a circled C indicates that the unresolved remainder (method beta) 1390 is now resolved and producer 7A is instantiated, while a circled D indicates the linking of the producer 5 to the producer 7A. In FIG. 13D, producers CX::IZ::GAMMA, 5, and 7A are standard producers 1385.

On the Fly Dependency Determination Producers

FIG. 13E illustrates pseudo code of producer dependency declarations for methods using both a non-shortcut declared, contingent, non-subscription producer dependency and a shortcut declared, contingent, non-subscription producer dependency according to one embodiment of the invention; while FIG. 13F is a block diagram of producers illustrating a non-shortcut declared, contingent, non-subscription producer dependency and a shortcut declared, contingent, non-subscription producer dependency according to one embodiment of the invention. Similar to FIG. 13D, FIG. 13F refers to the producers 5, 7A, and 7B of FIG. 5A and the resolution of the dynamic dependency of producer 5 to the producer 7A.

FIGS. 13E-F are the same as FIGS. 13C-D, with the exceptions: 1) a producer dependency declaration statement 1342 replaces the producer dependency declaration statement 1325; 2) a method fly 1344 replaces the method delta 1334; and 3) a producer CW::IY::FLY replaces the producer CU::IV::DELTA. The producer dependency declaration statement 1342 includes a shortcut declared producer dependency to the CX::IZ::GAMMA. Thus, the circled 4 in FIG. 13E now indicates that the producer dependency declaration 1342 is accessed. The circled 7 in FIG. 13E now indicates that the shortcut declared producer dependency to producer CX::IZ::GAMMA is processed to determine the producer dependency, and as a result, the runtime invokes the dependency determination producer CW::IY::FLY on the fly based on the method fly 1344. The circled 8 now indicates that the producer dependency declaration 1332 is accessed. The dashed circled 9 in FIG. 13F now shows that the producer CW::IY::FLY is instantiated. The dashed circled 10 in FIG. 13F indicates that the producer CW::IY::BETA is linked in the producer graph to indicate that producer CW::IY::FLY is a child producer. The circled 11 in FIG. 13F indicates that the producer CW::IY::FLY is executed and returns DEP to identify CX::IZ::GAMMA. The remainder of FIGS. 13E-F is the same as FIGS. 13C-D.

The on the fly generation by the runtime of the dependency determination producer CW::IY::FLY alleviates the application programmer from having to write explicit producer dependency declaration code and instantiate a dependency determination producer based thereon. Further, it allows the application programmer to directly specify the dependency on producer CX::IZ::GAMMA in the producer dependency declaration statement for the method beta 1315, as opposed to specifying the dependency determination producer CU::IV::DELTA.

The shortcut technique can be used in a variety of situations, and may additionally have a variety of formats. For example, while in FIGS. 13E-F the shortcut declared dependency is for a non-contingent dependency (it directly identifies the child producer) and is in a producer dependency declaration statement for a method on which a dependency determination producer is based, other situations and formats are shown as follows: 1) FIGS. 13G-H illustrate the use of two shortcuts, where one is contingent and is part of a producer dependency declaration statement for a method on which a standard producer is based and the other is non-contingent and is part of a producer dependency declaration statement for a method on which a dependency determination producer is based; and 2) figures I-J illustrate the use of a shortcut that is non-contingent and that is in a producer dependency declaration statement for a method on which a standard producer is based.

Figures 13G, 13H:
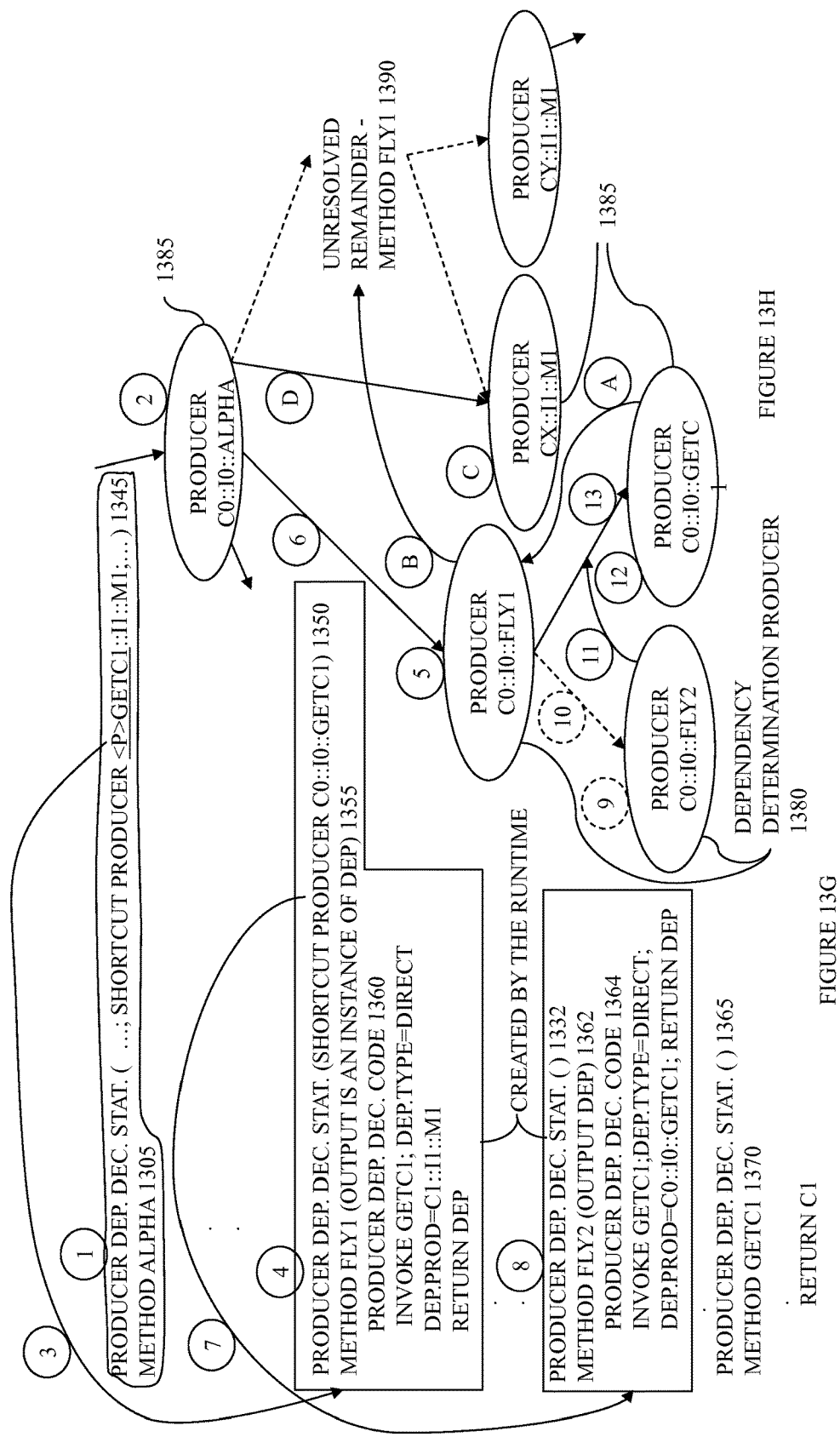
FIG. 13G illustrates pseudo code of producer dependency declarations for methods using a shortcut declared, contingent, non-subscription producer dependency and a shortcut declared, non-contingent, non-subscription producer dependency according to one embodiment of the invention.
FIG. 13H is a block diagram of producers illustrating an exemplary shortcut declared, contingent, non-subscription producer dependency and a shortcut declared, non-contingent, non-subscription producer dependency according to one embodiment of the invention.

FIG. 13G illustrates pseudo code of producer dependency declarations for methods using a shortcut declared, contingent, non-subscription producer dependency and a shortcut declared, non-contingent, non-subscription producer dependency according to one embodiment of the invention; while FIG. 13H is a block diagram of producers illustrating an exemplary shortcut declared, contingent, non-subscription producer dependency and a shortcut declared, non-contingent, non-subscription producer dependency according to one embodiment of the invention. FIG. 13G shows: 1) a producer dependency declaration statement 1345 for the method alpha 1305, where the producer dependency declaration statement 1345 includes a shortcut declared, contingent producer dependency to a producer <P>GETC1::I1:: M1; 2) a producer dependency declaration statement 1350 for a method fly1 1355, where the producer dependency declaration statement 1350 includes a shortcut declared, non-contingent producer dependency to a producer C0::I0:: GETC1, and where the method fly1 1355 returns as an argument an instance of DEP; 3) the producer dependency declaration statement 1332 for a method fly2 1362, where the method fly2 1362 returns as an argument an instance of DEP; and 4) the producer dependency declaration statement 1365 for a method getc1 1370, where the method getc1 1370 returns C1 with a value of CX or CY.

The method FLY1 1355 and its producer dependency declaration statement 1350 are provided by the runtime responsive to the shortcut declared dependency <P>GETC1::I1::M1 (which indicates that the shortcut is being used for the class key). The method fly1 1355 includes producer dependency declaration code 1360 that sets DEP.TYPE to non-subscription downwardly declared, sets DEP.PROD to producer CX::I1::M1 or CY::I1::M1 depending on the value of C1 output by the producer C0::I0:: GETC1, and returns DEP. While in the example of FIG. 13H, a <P> is used to designate that it is the class key of the producer that is contingent, alternative embodiments of the invention could use other syntaxes. Further, while in the example of FIG. 13H, a <P> is used to designate that it is the class key of the producer that is contingent, one embodiment of the invention supports having more and/or different ones of the identifiers that make up the producer key be indicated as contingent in this manner.

In FIG. 13G, a circled 1 indicates that the producer dependency declaration 1345 is accessed (e.g., as a result of designation of a producer based on the method alpha 1305 as a producer of interest, as a result of automated discovery of a producer based on the method alpha 1305 as a progeny of a producer of interest, etc.). A circled 2 in FIG. 13H shows that the producer C0::I0::ALPHA is instantiated based on the method alpha 1305. A circled 3 in FIG. 13G indicates that the shortcut declared producer dependency is processed to determine the producer dependency and the runtime provides the method fly1 1355; and as a result, a circled 4 indicates that the producer dependency declaration 1350 is accessed.

A circled 5 in FIG. 13H shows that a producer C0::I0:: FLY1 is instantiated as a dependency determination producer 1380. A circled 6 in FIG. 13H indicates that the producer C0::I0::ALPHA is linked in the producer graph to indicate that producer C0::I0::FLY1 is a child producer. A circled 7 in FIG. 13G indicates that the shortcut declared producer dependency to producer C0::I0::GETC1 is processed to determine the producer dependency and the runtime provides the method fly2 1362, and as a result, a circled 8 indicates that the producer dependency declaration 1332 is accessed. A dashed circled 9 in FIG. 13H shows that a producer C0::I0::FLY2 is instantiated. A dashed circled 10 in FIG. 13H indicates that the producer C0::I0::FLY1 is linked in the producer graph to indicate that producer C0::I0::FLY2 is a child producer.

A circled 11 in FIG. 13H indicates that the producer C0::I0::FLY2 is executed and returns DEP to identify producer C0::I0::GETC1. A circled 12 indicates that the producer C0::I0::GETC1 is instantiated, while a circled 13 indicates that the producer C0::I0::GETC1 being linked in the producer graph to the producer C0::I0::FLY1 as a child producer.

In FIG. 13H, a circled A indicates that the producer C0::I0::GETC1 is executed and returns C1=CX to producer C0::I0::FLY1, while a circled B indicates that the producer C0::I0::FLY1 is executed and returns DEP to identify producer CX::I1::M1; a circled C indicates that the unresolved remainder (method fly1) 1390 is now resolved, and a circled D indicates the linking of the producer C0::I0::ALPHA to the producer CX::I1::M1. In FIG. 13H, producers C0::I0:: GETC1, C0::I0::ALPHA, and CX::I1::M1 are standard producers 1385.

The on the fly generation by the runtime of the dependency determination producer C0::I0::FLY1 and C0::I0:: FLY2 alleviates the application programmer from having to write explicit producer dependency declaration code and instantiate dependency determination producers based thereon. Further, it allows the application programmer to directly specify the contingent dependency on a producer **::I1::M1 through the method getC1 in the producer dependency declaration statement for the method alpha 1305, as opposed to specifying the dependency determination producer CW::IY::BETA.

FIG. 13I illustrates pseudo code of producer dependency declarations for methods using a shortcut declared, non-dynamic (non-contingent, non-subscription) producer dependency according to one embodiment of the invention; while FIG. 13J is a block diagram of producers illustrating an exemplary shortcut declared, non-dynamic producer dependency according to one embodiment of the invention. FIG. 13I shows: 1) a producer dependency declaration statement 1372 for a method alpha 1305, where the producer dependency declaration statement 1372 includes a shortcut declared producer dependency to a producer 10; and 2) a producer dependency declaration statement 1374 for a method fly 1376, where the producer dependency declaration statement 1374 is empty, and where the method fly 1376 returns as an argument an instance of DEP. The method fly 1776 and its producer dependency declaration statement 1374 are provided by the runtime responsive to the shortcut declared dependency. The method fly 1376 includes producer dependency declaration code 1378 that sets DEP.TYPE to non-subscription downwardly declared, sets DEP.PROD to producer 10, and returns DEP.

In FIG. 13I, a circled 1 indicates that the producer dependency declaration 1372 is accessed (e.g., as a result of designation of a producer based on the method alpha 1305 as a producer of interest, as a result of automated discovery of a producer based on the method alpha 1305 as a progeny of a producer of interest, etc.). A circled 2 in FIG. 13J shows that a producer C0::I0::ALPHA is instantiated based on the method alpha 1305. A circled 3 in FIG. 13I indicates that the shortcut declared producer dependency is processed to determine the producer dependency and the runtime provides the method fly 1376; and as a result, a circled 4 indicates that the producer dependency declaration 1374 is accessed. A dashed circled 5 in FIG. 13J shows that a producer C0::I0::FLY is instantiated as a dependency determination producer 1380. A dashed circled 6 in FIG. 13J indicates that the producer C0::I0::ALPHA is linked in the producer graph to indicate that producer C0::I0::FLY is a child producer.

A circled 7 in FIG. 13J indicates that the producer C0::I0::FLY is executed and returns DEP to identify producer 10. A circled 8 indicates producer 10 is instantiated, while a circled 9 indicates the producer C0::I0::ALPHA being linked in the producer graph to indicate that producer 10 is a child producer. In FIG. 13J, producer C0::I0::ALPHA and producer 10 are standard producers 1385.

It should be understood that the runtime programmer, in one embodiment of the invention, writes a single fly method to interpret all supported syntaxes and combinations (e.g., the method fly 1334, the method fly1 1355, the method fly2 1362, the method fly 1376) and includes it in the runtime. This not only allows applications programmers to avoid writing code for dependency determination producers where a fly method may be used, the runtime programmer need only write the generic fly method (the single fly for all supported situations) once. Further, it should be understood that shortcut declared dependencies allow for a runtime that uses dependency determination producers while at the same time allowing an application programmer to indicate standard producers in the producer dependency declarations (e.g., FIGS. 13G-J).

Method Tracking Structure

Referring back to the method tracking structure of FIG. 11D, exemplary contents of the ArgumentDependencies column 1194, FieldDependencies column 1196, SequencingDependencies column 1195, UpwardDependencies column 1193, and WeaklyConstrainedDependencies column 1199 used in some embodiments of the invention will now be described. Specifically, the ArgumentDependencies column 1194 stores a collection of items, one for each ArgumentDependency. In one embodiment of the invention, each item includes the following: 1) the argument ID; 2) a class key nature identifier, being one of explicit class, same class, and contingent class; 3) an explicit class key identifier populated when the class key nature identifier indicates explicit class; 4) contingent class determination method key identifier populated when the class key nature identifier indicates contingent class; 5) an instance key nature identifier, being one of explicit instance, same instance, and contingent instance; 6) an explicit instance key identifier populated when the instance key nature identifier indicates explicit instance; 7) contingent instance determination method key identifier populated when the instance key nature identifier indicates contingent instance; 8) a method key nature identifier, being one of explicit method, same method, and contingent method; 9) an explicit method key identifier populated when the method key nature identifier indicates explicit method; 10) contingent method determination method key identifier populated when the method key nature identifier indicates contingent method; and 11) a shortcut identifier that indicates if the producer dependency declaration for the argument in the producer dependency declaration statement contained an indication of shortcut (i.e., the producer dependency declaration statement directly identifies a standard child producer instead of a dependency determination producer).

The " . . . explicit" indication of the various key nature identifiers is used where the explicit key is provided for the producer dependency in the producer dependency declaration statement. By way of example, the producer dependency "CW::IY::BETA" of the producer dependency declaration statement 1300 of FIG. 13A provides an explicit class, instance, and method key.

In some embodiments of the invention, a shorthand technique is supported for the producer dependency declaration statements such that: 1) if a class is not provided for a given producer dependency, then the same class as the parent producer is used; and 2) if a class and instance are not provided for a given producer dependency, then the same class and instance as the parent producer are used. In other embodiments of the invention, a syntax is used to allow any combination of class, instance, and method, to be the same as the parent (with the exception of all being the same) (e.g., a separator is used to designate each of class, instance, and method, and an absence of such a separator indicates same as parent—by way of specific example, the syntax may be "#C:", "#I:", and "#M:", such that a producer dependency in a producer dependency declaration statement may be #C:"class key"::#t"instance key"::#M:"method key".) (where quotes indicate a placeholder for a value or variable) The " . . . same" indication of the various key nature identifiers is used where this shorthand technique is used in the producer dependency declaration statement.

As previously indicated, in some embodiments of the invention an indication of a contingent producer dependency is supported through a syntax (e.g., <P>) used in the producer dependency declaration statement itself (see 1345 of FIG. 13G), and such syntax can be used on one or more of the class, instance, and method of a producer dependency. The " . . . contingent" indication of the various key nature identifiers is used to identify when such a contingent producer dependency occurs, while the "contingent . . . determination method key identifier" indicates the method key of the child producer (the class and the instance are the same as that of the parent producer). By way of example, the producer dependency "<P>GETC1::I1::M1" for the producer dependency declaration 1345 of FIG. 13G provides a contingent class (where the contingent class determination method key is GETC1), an explicit instance key, and an explicit method key.

The SequencingDependencies column 1195, the UpwardDependencies column 1193, and the WeaklyConstrainedDependencies column 1195 each store a collection of items, one for each SequencingDependency, UpwardDependency, and WeaklyConstrainedDependency. In one embodiment of the invention, each such item has the same structure as an item of the collection for the ArgumentDependencies, except that it does not include an argument ID. Further, although FIGS. 13A-J illustrated non-subscription downwardly declared dependencies originating from dependency determination producers, it should be understood that in the case of an upwardly declared dependency or weakly constrained dependency the dependency determination producer may return the other dependencies discussed with reference to FIG. 7F-G.

The FieldDependencies column 1196 stores a collection of items, one for each FieldDependency. While in one embodiment of the invention each item includes the property method key, in alternative embodiments of the invention may have the same structure as an item of the collection from SequencingDependencies.

Subscription Dependencies

In one embodiment of the invention, both non-subscription and subscription producer dependencies are supported. When a subscription producer dependency is declared for a given method and a given producer is instantiated from that given method, the runtime can resolve during run time (based upon the existence of other producers) the set of zero or more producers that meet the criteria of the subscription. While one embodiment of the invention supports both non-subscription and subscription producer dependencies, alternative embodiments support only non-subscription. In addition, while in one embodiment of the invention two types of subscription dependencies are supported (absorbing and sticky), alternative embodiments of the invention support more, less, and/or different types of subscription producer dependencies.

Figures 14A, 14B, 14C:
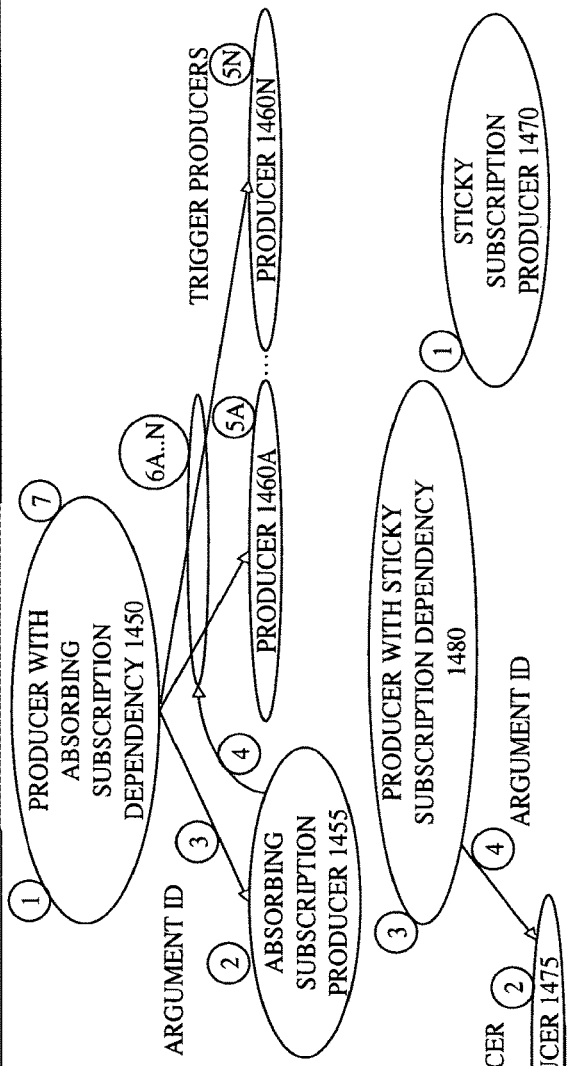
FIG. 14A is a block diagram of an example of the subscription log 1250 of FIG. 12 according to one embodiment of the invention.
FIG. 14B is a block diagram of exemplary producers illustrating a non-contingent, absorbing subscription producer dependency according to one embodiment of the invention.
FIG. 14C is a block diagram of exemplary producers illustrating a non-contingent, sticky subscription producer dependency according to one embodiment of the invention.

FIGS. 14A-C are block diagrams illustrating absorbing and sticky subscriptions according to one embodiment of the invention. FIG. 14A is a block diagram of an example of the subscription log 1250 of FIG. 12 according to one embodiment of the invention. While FIG. 14A illustrates this log structure as a table, it should be understood that any suitable data structure may be used (e.g., a hash map). FIG. 14B is a block diagram of exemplary producers illustrating a non-contingent, absorbing subscription producer dependency according to one embodiment of the invention. FIG. 14C is a block diagram of exemplary producers illustrating a non-contingent, sticky subscription producer dependency according to one embodiment of the invention. Two rows are shown in the table of FIG. 14A populated with content used in the examples of FIGS. 14B-C. Circled numbers are used in FIGS. 14B-C to illustrate the order in which operations are performed according to one embodiment of the invention.

In FIG. 14A, a subscriber's producer key column 1400, a subscription type column 1405, and a subscription criteria for trigger producer's column 1410 are shown to respectively store the content corresponding to the column name. In addition, FIG. 14A shows a parent link mode column 1425 to store the link mode for the parent producer of the subscription dependency; this information will be described in more detail with regard to FIGS. 14B-C.

FIG. 14A also shows a matching producers column 1415 and a completed column 1420 used for absorbing subscriptions. The matching producer's column 1415 is used to store the producer keys of the trigger producers that meet the subscription criteria of the absorbing subscription, while the completed column 1420 is used to track whether the absorbing subscription has been completed during a given execution of the current set of producer graphs. The matching producers column 1415 and the completed column 1420 provide an additional optional optimization that allows for the work of scanning the instantiated producers to be divided between the automated producer graph generation and the producer graph execution as described later herein.

FIG. 14A also shows a parent class column 1430, a parent method column 1435, and a parent instance column 1437 used for sticky subscriptions. The parent class column 1430, the parent method column 1435, and the parent instance column 1437 respectively store the class key, method key, and instance key of the parent producer to be created for the sticky subscription. In addition, FIG. 14A shows a dependency determination producer reference column 1421 store a reference to the dependency determination producer creates the subscription.

Absorbing Subscription

In an absorbing subscription producer dependency, the dependency is to the collection of all producers of the current producer graph(s) structure that meet the absorbing subscription criteria. With reference to FIG. 14B, a circled 1 indicates a producer 1450 is instantiated (e.g., as a result of designation of the producer 1450 as a producer of interest, as a result of automated discovery of the producer 1450 as a progeny of a producer of interest, etc.). The producer 1450 is based on a method for which the producer dependency declaration includes a producer dependency (e.g., with argument ID X). A circled 2 indicates the producer dependency of the producer 1450 is processed to identify a producer 1455.

A circled 3 indicates that the producer 1450 is linked (in the above example, through argument ID X) in the producer graph to producer 1455 as a child producer. A circled 4 indicates execution of the producer 1455. The producer 1455 is a dependency determination producer that includes producer dependency declaration code indicating an absorbing subscription producer dependency and indicating the absorbing subscription criteria. As such, the execution of the producer 1455 results in populating the subscription log. With regard to the example in the first row of FIG. 14A, the subscriber's producer key column 1400, the subscription type column 1405, the subscription criteria for trigger producers column 1410, the parent link mode column 1425, and the dependency determination producer reference column 1421 are respectively populated with the producer key of the producer 1450, an indication that the subscription is of the absorbing type, the absorbing subscription criteria contained within the producer 1455, the link mode of the producer 1450 linked to the producer 1455 (which, in the case of an absorbing subscription will be an argument dependency and include an argument ID, but whose sticky indicator will indicate not sticky—in the above example, argument ID X), and a reference to the producer 1455 (the dependency determination producer that cerates the subscription).

Circled 5A-N indicates the instantiation of producer's 1460A-N. In this example, the producer's 1460A-N meet the absorbing subscription criteria, and thus are trigger producers. As such, circled 6A-N indicates the linking of the producer 1450 to the producer's 1460A-N (in the above example, through argument ID X). A circled 7 indicates that the absorbing subscription dependency is completed for the current execution of the producer graph(s), and the producer 1450 is then executed.

In one embodiment of the invention, the absorbing subscription criteria can be one or more of any of the keys making up a producer key. Thus, in embodiments of the invention where a producer key comprises a class key, instance key, and a method key, the subscription criteria could be one or more such keys. By way of example with reference to FIG. 11C, a scan through the instantiated producers for those that meet the subscription criteria is a scan through one or more of the first three columns of the producer graph(s) structure to determine if the keys of the instantiated producers match the keys of the absorbing subscription criteria. While in one embodiment of the invention the absorbing subscription criteria can be one or more of any of the keys making up a producer key, in alternative embodiments of the invention the absorbing subscription criteria is limited to a subset of the keys making up a producer key.

Sticky Subscription

In a sticky subscription producer dependency, the dependency causes a parent producer to be instantiated for each producer that meets the sticky subscription criteria. With reference to FIG. 14C, a circled 1 indicates a producer 1470 is instantiated (e.g., as a result of designation of the producer 1470 as a producer of interest, as a result of automated discovery of the producer 1470 as a progeny of a producer of interest through a sequencing dependency (e.g., as a result of a SequencingDependency or WeaklyConstrainedDependency, etc.). The producer 1470 is a dependency determination producer that includes producer dependency declaration code indicating a sticky subscription, the sticky subscription criteria for the trigger producers, and the sticky subscription characteristics for the parent producer to be created.

Execution of the producer 1470 results in populating the subscription log. With regard to the example in the second row of FIG. 14A, the subscriber's producer key column 1400, the subscription type column 1405, and the subscription criteria for trigger producers column 1410 are respectively populated with the producer key of the producer 1470, an indication that the subscription is of the sticky type, and the sticky subscription criteria for the trigger producers contained within the producer 1470. In addition, the parent class column 1430, the parent method column 1435, the parent instance column 1437, and the link mode column 1425 of the parent producer to be linked to the trigger producer are populated with the sticky subscription characteristics for the parent producer to be created—in this embodiment of the invention, respectively the class of the parent producer to be instantiated, the method of the parent producer to be instantiated, the instance of the parent producer to be instantiated (if left blank, would be equal to the instance key of the trigger producer), the link mode (which, in the case of sticky subscription, may be: 1) argument, field, or sequencing dependency; 2) argument ID if an argument dependency—the argument ID of the parent producer to be linked to the trigger producer (e.g., argument ID Y). In addition, the dependency determination producer reference column 1421 is populated with a reference to the dependency determination producer that created the subscription (in FIG. 14C, the producer 1470).

With reference to FIG. 14C, a circled 2 indicates a producer 1475 is instantiated (e.g., as a result of designation of the producer 1475 as a producer of interest, as a result of automated discovery of the producer 1475 as a progeny of a producer of interest, etc.). In addition, it is determined if the producer 1475 meets the sticky subscription criteria for a trigger producer. A circled 3 indicates that responsive to the trigger producer 1475, a producer 1480 is instantiated based on the sticky subscription characteristics for the parent producer to be created. With reference to the exemplary second row of FIG. 14C, the class key, method key, instance key, and link mode are accessed from the parent class column 1430, the parent method column 1435, the instance column 1437, and the parent link mode column 1425, respectively. The parent producer has a producer key comprising the accessed class key, the accessed instance key (if left blank, the instance key of the trigger producer (in FIG. 14C, the producer 1475)), and the accessed method key—in the example of FIG. 14C, this is producer 1480. A circled 4 indicates that the instantiated parent producer 1480 is linked in the producer graph to the child trigger producer 1475 through the accessed link mode (in the above example, link mode type=argument dependency; link mode argument ID=Y). Also at circled 4, in the case of an argument dependency, the sticky indicator is set to indicate sticky—that the producer dependency in that position of the producer dependency declaration statement for the method on which the instantiated parent producer 1480 is based should be ignored for the producer 1480—this prevents the link created by the sticky subscription producer dependency from being overwritten by later automated producer graph generation operations.

In one embodiment of the invention, the sticky subscription criteria for trigger producers can be one or more of the keys making up a producer key. Thus, in embodiments where a producer key comprises a class key, instance key, and a method key, the sticky subscription criteria for the trigger could be one or more of the class, instance, and method keys. By way of example with reference to FIG. 11C, a scan through the instantiated producers for those that meet the sticky subscription criteria for trigger producers is a scan through one or more of the first-third columns of the producer graph(s) structure to determine if the keys of the instantiated producers match the keys of the sticky subscription criteria for trigger producers. While in one embodiment of the invention the sticky subscription criteria for trigger producers can be one or more of the keys making up a producer key, in alternative embodiments of the invention the absorbing subscription criteria can be a more limited number of the keys making up a producer key.

FIGS. 14D-E illustrate the choice of a parent producer based upon a parent dependency determination producer according to one embodiment of the invention. While FIGS. 14D-E are described with reference to argument dependencies, embodiments of the invention may support the use of sequencing and field dependencies.

FIG. 14D illustrates the choice of a parent producer based upon a parent dependency determination producer created by a sticky subscription according to one embodiment of the invention. Like FIG. 14C, FIG. 14D shows the sticky subscription producer 1470 and the trigger producer 1475; however, rather than the producer 1480, FIG. 14D shows a dependency determination producer 1480 created through the sticky subscription of sticky subscription producer 1470. Further, FIG. 14D shows that the link mode of the sticky subscription is argument dependency, argument ID=X, and sticky indicator=sticky. As illustrated by the dashed curved line from the producer 1475 to the dependency determination producer 1480, the DEP returned by the dependency determination producer may be based on the output of the producer 1475 itself (the argument of argument ID=X). In FIG. 14D, the dependency determination producer 1480 returns an non-subscription upwardly declared producer dependency on a producer 1482, with the link mode indicating argument dependency and argument ID=Y. While the argument IDs of X and Y are used in FIG. 14D to show that they may differ, it should be understood that they may be equal.

FIG. 14E illustrates the choice of a parent producer based upon a parent dependency determination producer created by a child dependency determination producer, which child dependency determination producer is linked by a sequencing dependency, according to one embodiment of the invention. FIG. 14E is similar in structure to FIG. 14D; specifically, the producer 1475, 1480, and 1482 are replaced with producers 1486, 1496, and 1498. However, rather than the sticky subscription producer 1470 creating the link between the producers 1480 and 1475, the producer 1486 has a sequencing dependency on a dependency determination producer 1494 (e.g., created through an UpwardDependency or a WeaklyConstrainedDependency), which creates the dependency determination producer 1496 through a non-subscription upwardly declared dependency.

It is worth nothing that sticky subscriptions and non-subscription upwardly declared dependencies (e.g., created through UpwardDependencies and/or WeaklyConstrainedDependencies) cause a bottom up building of a producer graph (as opposed to the top down building described earlier herein). Further, this bottom up building is not limited to the building of a single level, but may be multiple level (e.g., if, due to a sticky subscription or non-subscription upwardly declared dependency, a parent producer is instantiated, that same parent producer may also be a trigger producer for a sticky subscription or may include a non-subscription upwardly declared dependency and cause the instantiation of another parent producer, and so on). In this sense, sticky subscriptions, as well as non-subscription upwardly declared dependencies, reverse producer graph building.

While in some embodiments of the invention the parent producers identified by the sticky subscription characteristics are standard producers (see FIG. 14C), alternative embodiments may be implemented to support the identification of other types of producers. For example, in embodiments of the invention that allow the sticky subscription characteristics to identify a dependency determination producer (see FIG. 14D), such a dependency determination producer may access the output of the trigger producer and may, based on that output, trigger the creation of a particular producer as a parent producer that needs to stick on the child (this parent producer might already exist or not; If it already exists, it is simply linked, and the child producer is added to its argument; If is does not exist yet, it is created). The case where the dependency determination producer returns a constant producer mimics an absorbing subscription. The case where the dependency determination producer returns a producer whose instance key is unique per trigger producer (e.g., returns a producer whose instance key is the producer key of the trigger producer) results in a separate parent producer per child producer and is referred to as a pure sticky subscription. The case where the dependency determination producer returns an instance key which is neither constant nor unique per trigger producer can mix the behaviors of pure sticky subscriptions and absorbing subscriptions and is referred to as a non-pure sticky subscription.

Exemplary Advantages

As previously described, in one embodiment of the invention, producer dependencies are declared for methods as a way to specify method invocation sequencing using the appropriate instances (where the appropriate instances include the instances to use as arguments, the instances to be used by instance methods, and the meta class instances used by class methods) without using manual invocation sequencing code; effectively, the work of generating some or all of manual invocation sequencing code is replaced with: 1) work done by the application programmer to write the producer dependency declarations; and 2) work done by the runtime to discover and build the producer graph(s) and execute the producers of that producer graph(s). Although the effort to write the runtime is relatively great, it needs only be written once in that it can be used to execute any object-oriented applications written for the runtime; in contrast, for a typical application, the effort to write the producer dependency declarations is relatively low in comparison to writing manual invocation sequencing code.

Non-dynamic producer dependencies provide for a way to specify unconditional method invocation sequencing code, and thus avoid the need for writing unconditional manual invocation sequencing code. Contingent producer dependencies provide for a way to specify conditional processing, and thus replace the need for writing conditional manual invocation sequencing code. Supporting producer dependencies that allow for a collection of producers to be returned provides for a way to specify the filling of a collection before it is passed as a parameter, and thus avoid the need for writing multiple calls in manual invocation sequencing code to fill a collection before it is passed as a parameter. Supporting subscriptions provides an environment in which a programmer need not write specific listening code for each type of object to be listened to (e.g., in a producer graph oriented programming spreadsheet, an absorbing subscription may be used to compute an average of a range of cells (each cell being a producer) by having the absorbing subscription criteria identify cells within the range, and re-computing the average every time a new producer is added to the absorbing subscription; in a producer graph oriented programming spreadsheet, a sticky subscription may be used as a currency converter by having the sticky subscription criteria identify cells holding currency content and sticky subscription characteristics of sticky producer(s) to be instantiated that perform currency conversion (the producers (holding the converted amounts) created by the sticky subscriptions would then be available for display in other cells).

Operation

New Instance Commands

Figure 15:
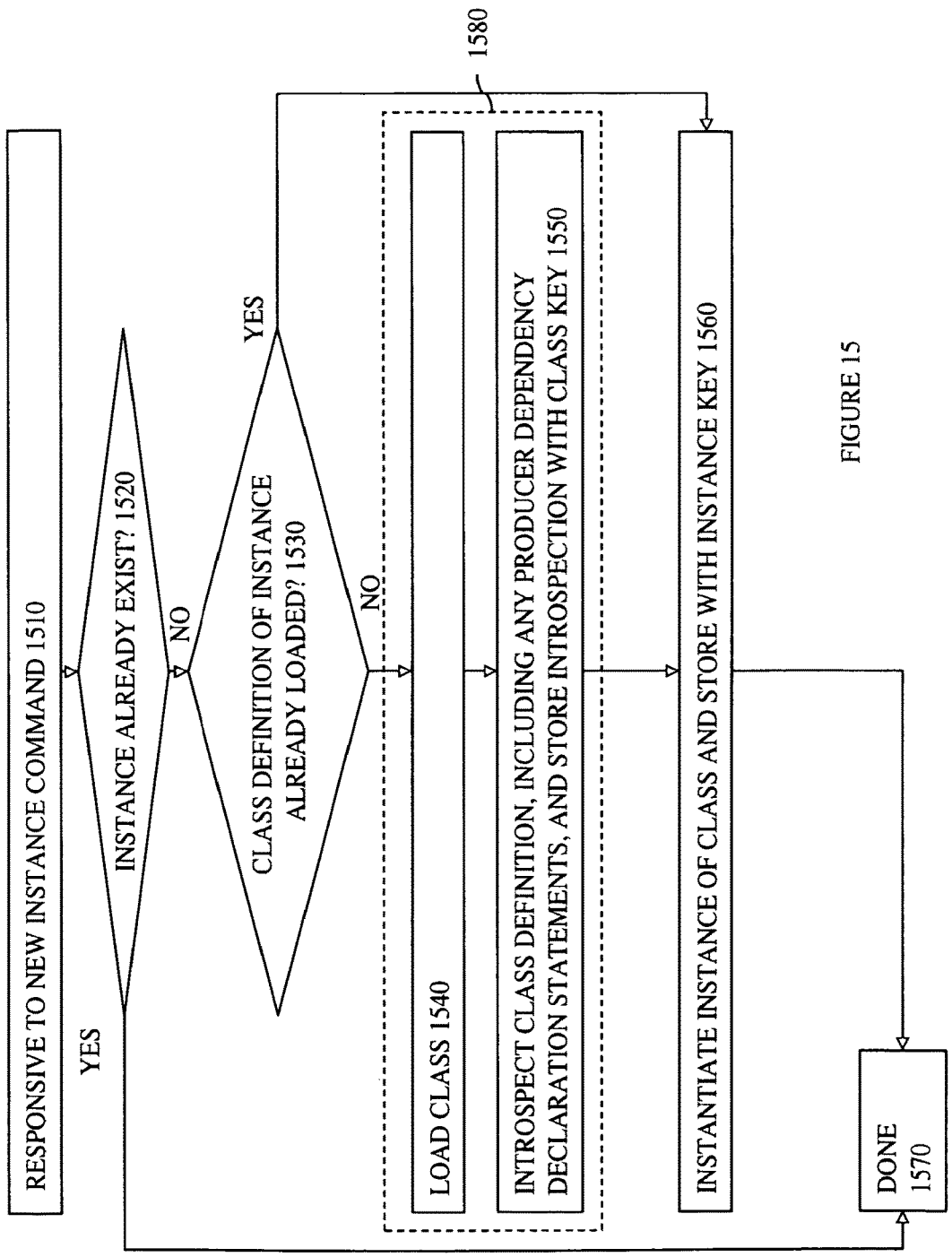
FIG. 15 is a flow diagram for instantiating new instances according to one embodiment of the invention.

FIG. 15 is a flow diagram for instantiating new instances according to one embodiment of the invention. As previously described with reference to FIG. 10, the new class module 1095 of FIG. 10 may be implemented as part of the new instance module 1098. The flow diagram of FIG. 15 assumes such an embodiment and is performed by the new instance module 1098; the part of the flow diagram of FIG. 15 representing the new class module 1095 is shown as the dashed block 1580, which includes blocks 1540 and 1550.

Responsive to a new instance command (block 1510), control passes to block 1520. In block 1520, it is determined if the instance already exists. If not, control passes to block 1530, otherwise, the instance need not be instantiated and control passes to block 1570 in which the flow diagram ends. In one embodiment that supports instance keys, block 1520 is performed by accessing the instance tracking structure 1065 of FIG. 10 for the instance key (and class key if instance keys need not be unique across classes) provided as part of the new instance command.

In block 1530, it is determined if the class definition of the instance is already loaded. If not, control passes to block 1540; otherwise, control passes to block 1560. In one embodiment that supports class keys, block 1540 is performed by accessing the class tracking structure 1092 of FIG. 10 for the class key provided as part of the new instance command.

In block 1540, the class is loaded and control passes to block 1550. In block 1550, the class definition would be stored according to the class key and introspected, including any producer dependency declaration statements (stored by method key within the class—see FIG. 11D). From block 1550, control passes to block 1560. With reference to FIG. 10, the following is performed in blocks 1540 and 1550: 1) the class would be loaded from the class definitions that include business logic 1010 into the classes 1054 (this loading results in the methods and producer dependency declarations of the class being stored in the method and producer dependency declarations 1056); 2) the class would be added to the class tracking structure 1092; and 3) the methods would be added to the method tracking structure 1058. Further, the output classes of the methods would be loaded.

In block 1560, an instance of the class would be instantiated and stored according to the instance key. With reference to FIG. 10, the instance would be instantiated into the instances 1052; and the instance would be added to the instance tracking structure 1065. From block 1550, control passes to block 1570 in which the flow diagram ends. In some embodiments of the invention in which an object-relational mapping technique is used, data may be loaded from an external data source to populate the field of the instance as part of block 1560.

In some embodiments of the invention, classes and instances may be loaded/instantiated in a manner in which the runtime with producer graph oriented programming support is not aware (e.g., in FIG. 9A, if the runtime 915 loads/instantiates without runtime 910 being aware). In such cases, embodiments of the invention which also support the instance key being an instance of the class InstanceKey (which holds two elements: an instance key nature indicating if the key identifier is a reference to the instance or another object (such as a string), and a key identifier which can either be a reference to the instance, or another object (such as a string)), blocks 1520 and 1530 inquire whether the instance and class were instantiated/loaded in a manner in which the runtime with producer graph oriented programming support is aware. In cases where the runtime with producer graph oriented programming support is not aware of an already loaded class, the class would not be loaded, but the class would be added to the class tracking structure 1092 and the methods would be added to the method tracking structure 1058. In cases where the runtime with producer graph oriented programming support is not aware of an already instantiated instance, the instance would not be instantiated, but the instance would be added to the instance tracking structure 1065.

New Producer and Unoverride Commands

Figure 16:
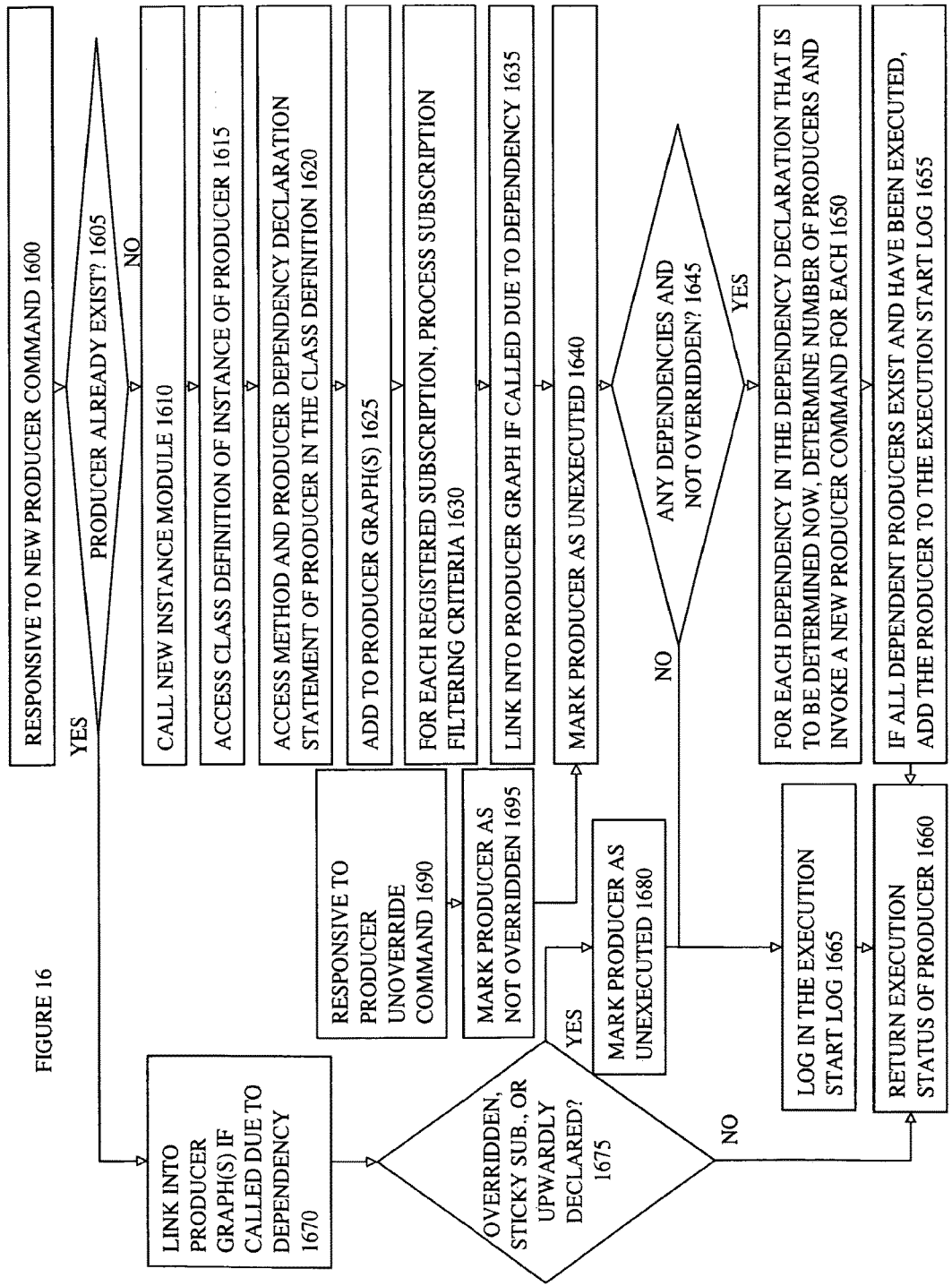
FIG. 16 is a flow diagram for instantiating new producers and unoverriding producers according to one embodiment of the invention.

FIG. 16 is a flow diagram for instantiating new producers and unoverriding producers according to one embodiment of the invention. With reference to FIG. 10, the flows of FIG. 15 are performed by the automated producer graph generation module 1040 and the override producer module 1045 (or, as described with reference to alternative embodiments regarding FIG. 10, the module that handles overrides and unoverrides).

Responsive to a new producer command (block 1600), control passes to block 1605. In one embodiment of the invention, a new producer command may execute responsive to a variety of situations. Table 2 below identifies the various situations and parameters passed according to one embodiment of the invention.

TABLE 2

| Situations | Caller Producer | Called Producer (to be created if does not already exist) | Call type | Link mode | Dependency determination producer reference |
|---|---|---|---|---|---|
| Producer of interest | N/A | Producer of interest to be created | Of interest | N/A | N/A |
| Non-subscription downwardly declared | Parent | Child | Non-subscription downwardly declared | Caller parent producer link mode | Dependency determination producer providing the dependency |
| Sticky subscription | Child | Parent (parent class, method, and instance key from sticky subscription characteristics for parent producer to be created; if instance key is blank, instance key of existing child caller producer) | Sticky | Called parent producer link mode from sticky subscription characteristics for parent producer to be created | Dependency determination producer providing the dependency |
| Override | N/A | Producer to be overridden | Overridden | N/A | N/A |
| Non-subscription upwardly declared | Child | Parent | Non-subscription upwardly declared | Called parent producer link mode | Dependency determination producer providing the dependency |

In block 1605, it is determined if the producer already exists. If not, control passes to block 1610; otherwise, control passes to block 1670. Block 1605 is performed by accessing a class, instance, and method identified (e.g., by key and/or reference) as part of the new producer command. In one embodiment that supports producer keys, block 1605 is performed by accessing the producer graph(s) structure 1060 of FIG. 10 for the producer key provided as part of the new producer command (the producer key in the called producer column of Table 2).

In block 1610, the new instance module is called with a new instance command and control passes to block 1615. In one embodiment of the invention, block 1610 is performed by calling the flow diagram of FIG. 15 using the instance key from the producer key in the called producer column of Table 2.

In block 1615, the class definition of the instance of the producer is accessed and control passes to block 1620. With reference to FIG. 10, block 1615 is performed by using the class key from the producer key in the called producer column of Table 2 to access the appropriate one of the classes 1054 according to the class tracking structure 1092.

In block 1620, the method and producer dependency declaration statement of the producer is accessed and control passes to block 1625. With reference to FIG. 10, block 1620 is performed by using the method key from the producer key in the called producer column of Table 2 to access the appropriate one of the methods and producer dependency declarations 1056 from the class located in block 1615.

In block 1625, the producer is added to the producer graph and control passes to block 1630. With reference to the embodiment of the invention in FIG. 11C, the first three columns are populated.

In block 1630, for each registered subscription, the subscription filtering criteria is processed to determine if the producer matches. With reference to the embodiment of the invention in FIG. 14A, a subscription is considered registered when it is added to the subscription log. Exemplary operations to register subscription are described later herein. Block 1630 is an optional optimization that allows for the work of scanning the instantiated producers to be divided between automated producer graph generation and producer graph execution. As such, an alternative embodiment of the invention may not perform block 1630.

In block 1635, the producer is linked into the producer graph(s) if called due to a dependency. From block 1635, control passes to block 1640. The manner of performing block 1635 depends on the situation which resulted in the new producer command being executed (see FIG. 20). For example, if the situation is that this is a producer of interest or a producer being overridden, then it was not called due to a dependency and nothing is done. In contrast, if the situation is non-subscription downwardly declared, then it was called due to a non-subscription downwardly declared dependency; and with reference to the embodiment of the invention in FIG. 11C, the following is performed: 1) the parent producer(s) link(s) in column 1150 of the called child producer (the called producer column of table 2) is modified with a parent producer reference to the row of the parent caller producer (the caller producer column of table 2) and the dependency determination producer reference (the dependency determination producer reference column of Table 2); and 2) the child producer(s) link(s) column 1160 of the row of the parent caller producer (the caller producer column of table 2) is modified with a child producer reference to the row of the called child producer (the called producer column of Table 2), a dependency determination producer reference (the dependency determination producer reference column of Table 2), and a link mode (set according to the link mode column of Table 2).

In contrast, if the situation is a sticky subscription, then it was called due to a trigger producer being identified; and with reference to the embodiment of the invention in FIG. 11C, the following is performed: 1) the parent producer(s) link(s) column 1150 of the caller child producer (the caller producer column of table 2) is modified with a parent producer reference to the row of the parent called producer (the called producer column of table 2) and the dependency determination producer reference (the dependency determination producer reference column of Table 2); and 2) the child producer(s) link(s) 1160 of the row of the parent called producer (the called producer column of table 2) is modified with a child producer reference to the row of the caller child producer (the caller producer column of Table 2), a dependency determination producer reference (the dependency determination producer reference column of Table 2), a link mode (set according to the link mode column of Table 2) and a sticky indicator set to indicate sticky. In this respect, the situation of a non-subscription upwardly declared is handled is a similar fashion to sticky subscription.

In block 1640, the producer is marked as unexecuted and control passes to block 1645. With reference to the embodiment of the invention in FIG. 11C, the incremental execution marking column 1180 of the appropriate row is populated with an unexecuted indication.

In block 1645, it is determined if the producer has any dependencies and is not overridden. If so, control passes to block 1650; otherwise, control passes to block 1665. Block 1645 is performed by checking the producer dependency declaration accessed in block 1620 and the call type column of Table 2.

In block 1650, for each dependency in the producer dependency declaration that is to be resolved now, the number of producers is determined and a new producer command is invoked for each. From block 1650, control passes to block 1655. Different embodiments of the invention determine different types of dependency at different times; the manner of performing block 1650 in one exemplary embodiment of the invention will be described later herein.

In block 1655 the producer is added to the execution start log if all its dependent producers exist and have been executed. From block 1655, control passes to block 1660. When, for a given producer instantiated as part of the current iteration of this flow, block 1655 is performed, then the invocation of another iteration of this flow for a producer the given producer depends on will return the execution status of that producer (see block 1660) (e.g., with regard to the embodiment of the invention of FIG. 11C, the status from the incremental execution marking column 1180 of the appropriate row(s)). If all the dependent producer(s) exist and the execution status of all of the dependent producers is executed, then the producer of the current iteration is added to the execution start log.

In block 1660, the execution status of the producer is returned as a parameter.

In block 1670, similar to block 1635, the producer is linked into the producer graph(s) if called due to a dependency. From block 1670, control passes to block 1675. Block 1670 may be reached for a variety of reasons. For example, block 1670 may be reached because the producer was previously instantiated responsive to a producer override command, but not linked into the producer graph. As another example, block 1670 may be reached because the producer is already part of a producer graph and is being added to another (e.g., previously instantiated responsive to being a producer of interest, a progeny of a producer of interest, etc.).

In block 1675, it is determined if the new producer flow is called due to an override, to a sticky subscription dependency, or a non-subscription upwardly declared dependency. If so, control passes to block 1680; otherwise, control passes to block 1660. Block 1675 is performed by checking the call type column of Table 2 to see if this is a call for an overridden producer, a sticky subscription dependency, or a non-subscription upwardly declared dependency.

In block 1680, similar to block 1640, the producer is marked as unexecuted and control passes to block 1665. Block 1680 may be reached for a variety of reasons.

In block 1665, the producer is added to the execution start log, if not already present, and control passes to block 1660.

Responsive to a producer unoverride command (block 1690), control passes to block 1695. In block 1695, the producer is marked as not overridden and control passes to block 1640. With reference to the embodiment of the invention of FIG. 11C, the producer output caching and override producer output indications column 1170 of the row of the producer are accessed and altered to indicate that the producer is no longer overridden. Continuing this flow, block 1640 would lead to block 1645, and if the producer had any dependencies, to block 1650, which would cause the producer graph under the producer to be discovered and built if it was not already. If the producer graph under the producer is already discovered and built, then the invoking of the new producer command will result in flows going from 1600, to 1605, to 1670, and so on; further, the returning of the execution status of the producers of the graph under the producer in block 1660 will determine if the producer is added to the execution start log in block 1655. However, if the producer graph under the producer is not discovered and built, then the invoking of the new producer command will result in it being discovered and build with flows going from 1600, to 1605, to 1610, and so on.

Figure 17:
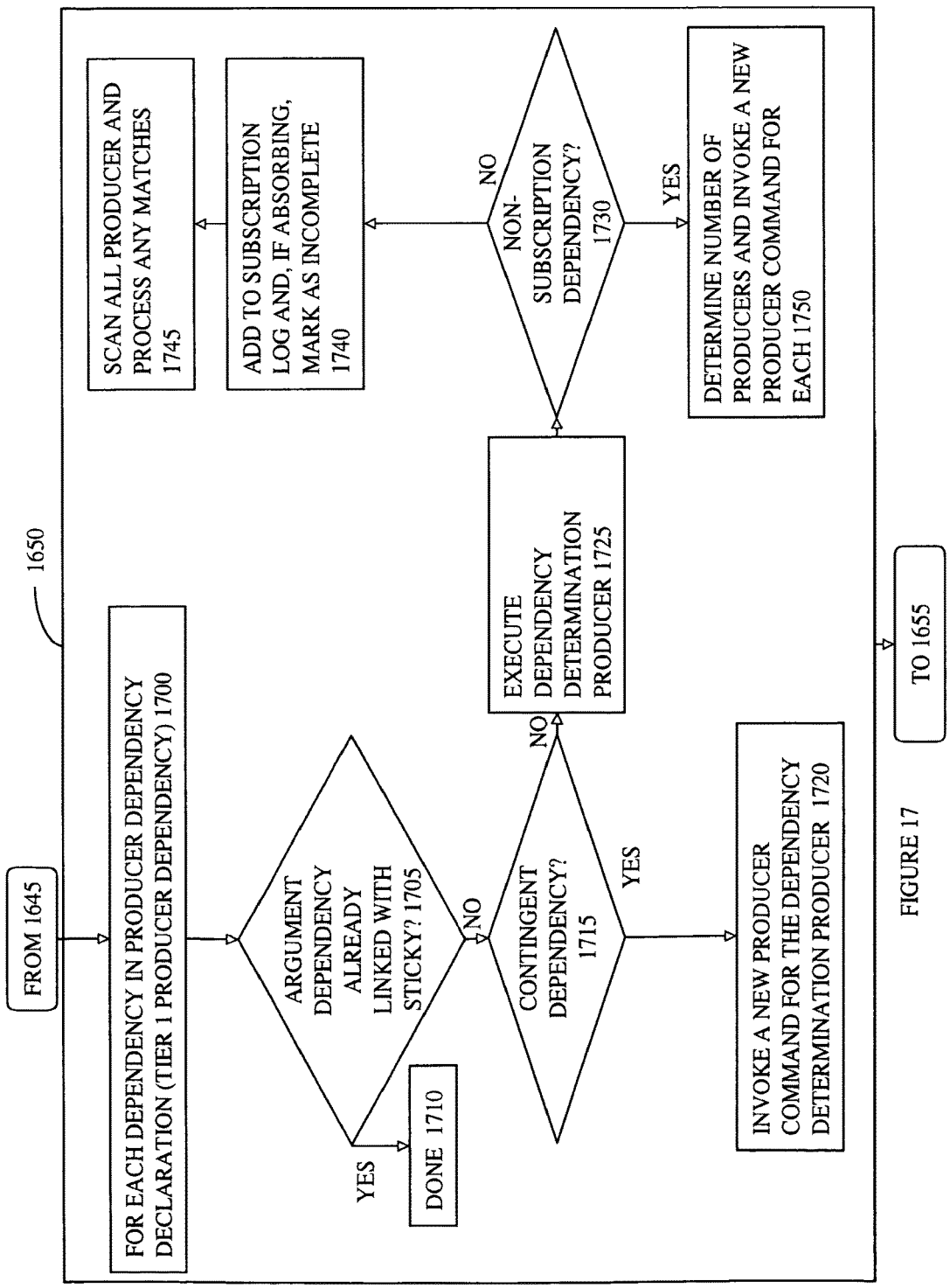
FIG. 17 is a flow diagram for block 1650 of FIG. 16 according to one embodiment of the invention.

FIG. 17 is a flow diagram for block 1650 of FIG. 16 according to one embodiment of the invention. Thus, control flows from block 1645 to block 1700 in block 1650. In block 1700, for each dependency in the producer dependency declaration of the producer (one for each ArgumentDependency, FieldDependency, SequencingDependency, UpwardDependency, and WeaklyConstrainedDependency), the following blocks 1705-1745 are performed. With reference to the FIGS. 10 and 11D, the method tracking structure is accessed to determine information regarding the producer dependency. It should also be understood that blocks 1715, 1725, 1730, 1740, 1745, and 1750 are an optimization when performed prior to execution of the producer graph.

In block 1705, it is determined if the dependency is an argument dependency linked already due to a sticky dependency. If so, control passes to block 1710 where the flow is complete for this dependency; otherwise, control passes to block 1715. With regard to the embodiment of the invention show in FIG. 11C, the sticky indicator is checked to determine if the argument ID of this dependency is subject to a sticky subscription argument dependency or an upwardly declared argument dependency.

In block 1715, it is determined if the dependency is a contingent dependency. If so, control passes to block 1720; otherwise, control passes to block 1725. Block 1715 is performed by checking the producer dependency declaration of the child producer identified by the dependency to determine if it is empty (the child producer is and independent producer). With regard to FIGS. 13A-J, this would be true for producers with dashed circled numbers (e.g., in FIG. 13D, producer CU::IV::DELTA), but not true for the other producers (e.g., in FIG. 13D, producer CW::IY::BETA). Thus, with reference to FIG. 13D, block 1715 is represented by circled 1, 4, and 8. Block 1715 and the flow from it through blocks 1725-1750 is an optimization that both avoid adding/linking the producers with dashed circled numbers to the producer graph, as well as dividing the work of executing producers between the automated producer graph generation and producer graph execution.

In block 1720, a new producer command for the dependency determination producer is invoked and the flow ends. For example, with reference to FIG. 13D, block 1720 causes what is represented by circled 5, 6, and 7.

In block 1725, the dependency determination producer is executed and control passes to block 1730. For example, with reference to FIG. 13D, block 1725 is represented by circled 11 (thus, the flow of FIG. 17 illustrated the previously described embodiment in which circled 9 and 10 of FIG. 13D are not performed).

In block 1730, it is determined if the dependency is a non-subscription dependency. If so, control passes to block 1750; otherwise control passes to block 1740. In other words, in block 1725, the producer dependency determination code in the method of the dependency determination producer, which is part of the producer dependency declaration of the parent producer, is executed. Having executed this producer dependency declaration code, which code would identify if this dependency is a subscription dependency, the type of producer dependency of the parent producer is determined. With regard to the example in FIG. 13D, circled 11 would result in the flow of FIG. 17 passing from block 1730 to block 1750.

In block 1750, the number of producers returned by the execution of the dependency determination producer in block 1725 is determined and a new producer command is invoked for each, using the arguments described in Table 2, including the dependency determination producer reference executed in 1725. For example, with reference to FIG. 13D, block 1750 would cause circled 12 and 13 and circled C and D.

With reference to the absorbing subscription example of FIG. 14B, block 1725 represents circled 4; which causes the flow to pass through block 1730 to block 1740.

In block 1740, the subscription is added to the subscription log, and if the subscription is absorbing, it is marked as incomplete. From block 1740, control passes to block 1745. With reference to the embodiment of the invention shown in FIG. 14A, the subscription log is populated with the subscription as previously described.

In block 1745, all of the instantiated producers are scanned to see if they match the criteria of the subscription (and thus are a trigger producer), and any matches are processed.

Figure 18:
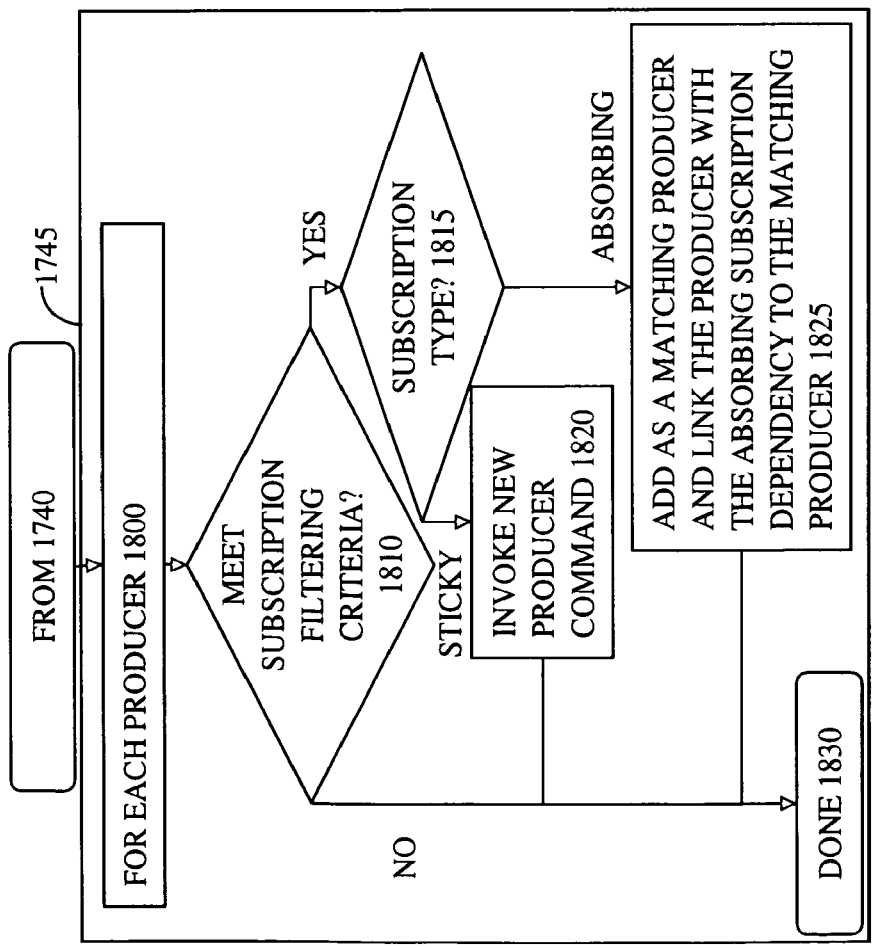
FIG. 18 is a flow diagram for block 1745 of FIG. 17 according to one embodiment of the invention.

FIG. 18 is a flow diagram for block 1745 of FIG. 17 according to one embodiment of the invention. Thus, control flows from block 1740 to block 1800 in block 1745. In block 1800, for each instantiated producer, the following blocks 1810-1830 are performed.

In block 1810, it is determined if the producer meets the criteria of the subscription. If so, control passes to block 1815; otherwise, control passes to block 1830 where the flow ends for the producer currently being processed. With reference to the embodiments of the invention shown in FIGS. 11C and 14A, the producer graph(s) are accessed to determine whether they include producers that meet the criteria of the subscription.

The manner of processing a matching producer depends on the type of subscription being processed. With reference to block 1815, if the subscription is of the absorbing type, control passes to block 1825; otherwise, control passes to block 1820. Block 1815 would be performed responsive to the type of subscription added in block 1740 or 2235.

In block 1825, the matching producer is added to the subscription log and the producer with the absorbing subscription is linked to the matching producer. From block 1825, control passes to block 1830. With reference to the embodiments of the invention shown in FIGS. 11C and 14A-B, the following is performed: 1) the subscription criteria from the subscription criteria for trigger producers column 1410 was used in block 1810 and a matching producer was located (e.g., one of producer 1460A-N); 2) the matching producer is added to the matching producer column 1415 at the row of the subscription; and 3) the producer with the absorbing subscription (e.g., producer 1450) is linked to the matching producer (e.g., the one of the producers 1460A-N) in the producer graph(s) structure of FIG. 11C (using the dependency determination producer reference extracted from the dependency determination producer reference column 1421 of the subscription log 14A for the given absorbing subscription).

In block 1820, a new producer command is invoked for the parent producer to be created. From block 1820, control passes to block 1830 where the flow diagram ends for the current produced selected in block 1800. With reference to the embodiments of the invention shown in FIGS. 14A and 14C, the following is performed: 1) the subscription criteria from the subscription criteria for trigger producers column 1410 was used in block 1810 and a matching producer was located (e.g., producer 1475); and 2) a new producer command is invoked with the parameters of table 2 set as follows: a) call type is sticky subscription; b) caller producer is the producer key of the caller child producer (e.g., producer 1475); c) called producer is the producer key of the called parent producer to be created (e.g., producer 1480), that producer key being formed using the parent class, instance, and method key from the sticky subscription characteristics for the parent producer to be created (FIG. 14A, columns 1430, 1435, and 1437) (if the instance key is empty, the instance key of caller child producer is used); d) the link mode for the called parent producer (FIG. 14A, link mode column 1425); and e) the dependency determination producer reference extracted from the dependency determination producer reference column 1421 of the subscription log 14A for the given sticky subscription.

FIG. 19 is a flow diagram for block 1630 of FIG. 16 according to one embodiment of the invention. Thus, control flows from block 1625 to block 1900 in block 1630. FIG. 19 is very similar to FIG. 18. Specifically, blocks 1910, 1915, 1920, and 1930 of FIG. 19 are identical to blocks 1810, 1815, 1820, and 1830; while block 1900 and 1925 differ from blocks 1800 and 1825. As such, only the difference will be described here.

Block 1900 indicates the flow is performed for each registered subscription, whereas block 1800 indicates the flow is performed for each instantiated producer. Thus, where the flow of FIG. 18 is centered on a single subscription and scanning all producers, the flow of FIG. 19 is centered on a single producer and scanning all subscriptions.

Block 1925 is the same as block 1825, with the exception that the absorbing subscription is marked as incomplete. With reference to the embodiment of the invention shown in FIG. 14A, the completed column 1420 at the appropriate row is updated to indicate incomplete.

FIG. 20 is a flow diagram for blocks 1635 and 1670 of FIG. 16 according to one embodiment of the invention. Thus, control flows from block 1605 and block 1630 to block 2005 in blocks 1635 and 1670. In block 2005, it is determined if this iteration of the flow diagram of FIG. 16 was invoked due to a dependency (e.g., from block 1630 (block 1920) or 1650 (blocks 1720, 1750 or 1745/1820) of a prior iteration). If not, control passes to block 1640 or 1675 depending from where the flow was entered (from block 1630 or 1605).

In block 2010, it is determined if the flow was called due to a sticky subscription or non-subscription upwardly declared situation. If not, control passes to block 2015; otherwise, control passes to block 2020. Block 2010 is performed by checking the call type parameter from Table 2 (i.e., whether the call type is sticky subscription or non-subscription upwardly declared or not). With reference to the embodiments of the invention shown in FIGS. 18 and 19, if the new producer command was invoked from blocks 1820 or 1920.

In block 2020, the current parent producer is linked to the caller child producer. With reference to the embodiments of the invention shown in FIGS. 11C and 14C, the called parent producer (e.g., producer 1480) identified by the parameter from the called producer column of table 2 is linked in the producer graph(s) structure of FIG. 11C to the caller child producer (e.g., producer 1475) identified by the parameter from the caller producer column of table 2, using the link mode and dependency determination producer reference identified by the parameter from the link mode and dependency determination producer reference columns of table 2. If the parent existed previously, the behavior of block 2020 mimics the behavior of an absorbing subscription dependency in the sense that a single argument can be mapped to zero or more child producers.

In block 2015, the caller parent producer is linked to the current called child producer. With reference to the embodiment of the invention shown in FIG. 11C, the caller parent producer identified by the parameter from the caller producer column of table 2 is linked in the producer graph(s) structure of FIG. 11C to the called child producer identified by the parameter from the called producer column of table 2, using the dependency determination producer reference identified by the dependency determination producer reference column of table 2. From blocks 2015 and 2020, control passes to block 1640 or 1675 depending for where the flow was entered (from block 1605 or 1630).

FIG. 21 is a flow diagram for overriding producers according to one embodiment of the invention. With reference to FIG. 10, the flow of FIG. 21 is performed by the override producer module 1045 (or, as described with reference to alternative embodiments regarding FIG. 10, the module that handles overrides and unoverrides).

Responsive to an override producer command (block 2110), control passes to block 2120. In block 2120, a new producer command is invoked for the producer identified by the override producer command and control passes to block 2130. Block 2120 is performed in one embodiment of the invention in case the producer to be overridden has not yet been instantiated, as well as to mark the producer as unexecuted (block 1640 or 1680) and log it on the execution start log (block 1665). An alternative embodiment of the invention that does not allow the overriding of a producer that is not yet instantiated would perform an additional check between blocks 1605 and 1610 to determine if this new producer command was called responsive to an override producer command, and to indicate an error if this new producer command was called responsive to an override producer command.

In block 2130, the output in the producer output cache (and in the instance if a field) is set and the producer is marked as overridden.

Global Execute Commands

Figure 22B:
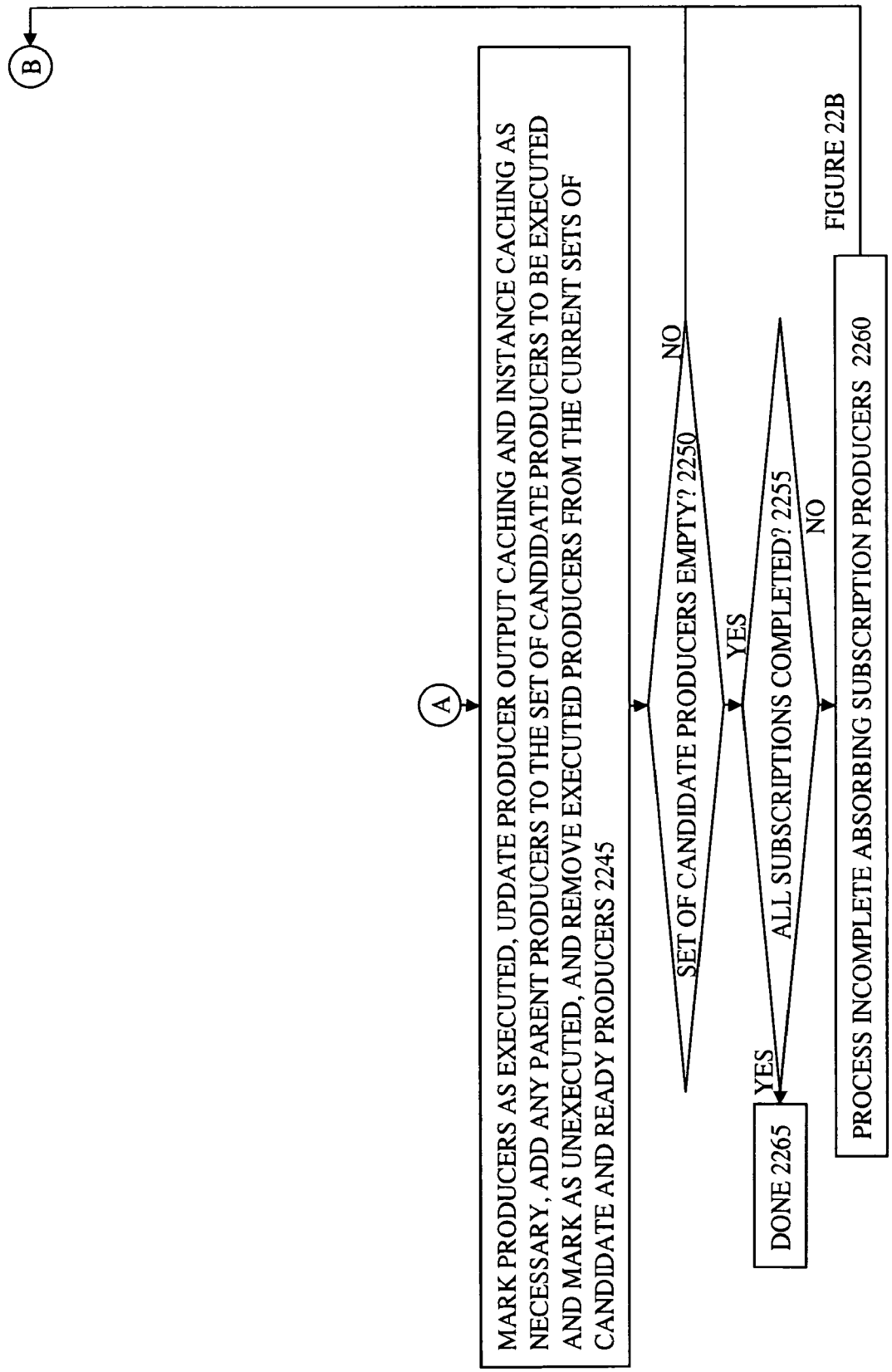
FIG. 22B is another part of a flow diagram for execution of the current producer graph(s) according to one embodiment of the invention.

FIG. 22A is a part of a flow diagram for execution of the current producer graph(s) according to one embodiment of the invention; while FIG. 22B is another part of a flow diagram for execution of the current producer graph(s) according to one embodiment of the invention. With reference to FIG. 10, the flow of FIG. 22 is performed by the producer graph execution module 1070.

Responsive to a global execute command, block 2200 shows that a set of candidate producers is selected to be executed based on the producers on the execution start log and control passes to block 2205. In one embodiment of the invention the overridden producers are marked as unexecuted and execution thereof returns their overridden result (as opposed to causing their method to be executed), the current set of candidate producers is the producers on the execution start log. While one embodiment of the invention is described above in which overridden producers are marked as unexecuted and execution thereof returns their overridden result (as opposed to causing their method to be executed), alternative embodiments may operate differently (e.g., mark overridden producers as executed and when selecting the current set of candidate producers, the independent producers of the execution start log and the parents of overridden producers on the execution start log are selected).

In block 2205, a subset of producers ready for execution is selected from the set of candidate producers and control passes to block 2210. An exemplary manner of performing block 2205 is described later herein.

In block 2210, the producers of the current set of ready producers are sorted by type—standard producers go the block 2215 and dependency determination producers go to block 2225. In one embodiment of the invention, block 2210 is performed by checking the return class of the producer. With reference to the FIGS. 10 and 11D, the method tracking structure is accessed to determine if the output class of the producer is DEP, and thus this producer is a dependency determination producer.

In block 2215, any standard producers in the current set of ready producers are executed and control passes to block 2220. In one embodiment of the invention, block 2215 is performed by calling the method with any input parameters mapped from the outputs of any child producers resulting from argument dependencies (for arguments, the argument ID of the link mode is used to map the output of the appropriate child producer to the appropriate input argument of the method being executed). In some embodiments of the invention, such execution may result in execution of code in the method of a child producer that writes an output to a given mechanism (such as set a global variable, sets a field in an instance which is not the producer output, impacts an external data source, etc.) or code in the method of the parent producer that read that output from the given mechanism). In block 2220, for those parents, if any, that have an absorbing subscription on any of these executed standard producers, the subscription is marked as incomplete. From block 2220, control passes to block 2245. With reference to FIG. 14A, the appropriate row of the completed column 1420 is set to indicate incomplete.

In block 2225, any dependency determination producers in the current set of ready producers are prepared for execution and control passes to block 2230. An exemplary manner of performing block 2225 is described later herein.

In block 2230, any dependency determination producers in the current set of ready producers are executed and control passes to block 2235. In one embodiment of the invention, block 2230 is performed in similar fashion to block 2215.

In block 2235, a new producer command is executed for any discovered producers, and subscription logging and processing is performed for any subscriptions. The new producer command part of block 2235 is performed in similar manner to block 1750, while the subscription logging and processing is performed in similar manner to blocks 1740 and 1745.

In block 2240, add to the set of candidate producers newly added to the execution start log. From block 2240, control passes to block 2245. Block 2240 is performed in similar manner to block 2200, except only producers newly added to the execution start log as a result of blocks 2230 and 2235 are added to the set of candidate producers.

In block 2245, the producers that were executed are marked as executed, the producer output caching (and instance caching) are updated as necessary, any parent producers of the producers that were executed are added to the current set of candidate producers, and the producers that were executed are removed from the current set of candidate and ready producers. From block 2245, control passes to block 2250.

In block 2250, it is determined if the set of candidate producers is empty. If not, control passes back to block 2205; otherwise, control passes to block 2255.

In block 2255, it is determined in all subscriptions have been completed. If so, control passes to block 2265 where the flow diagram ends; otherwise, control passes to block 2260. With reference to the embodiment of the invention in FIG. 14A, the subscription type column 1405 and the complete column 1420 are scanned for any absorbing subscriptions that are not completed.

In block 2260, the incomplete absorbing subscriptions are processed and control passes back to block 2205. An exemplary manner of performing block 2260 is described later herein.

Figure 23:
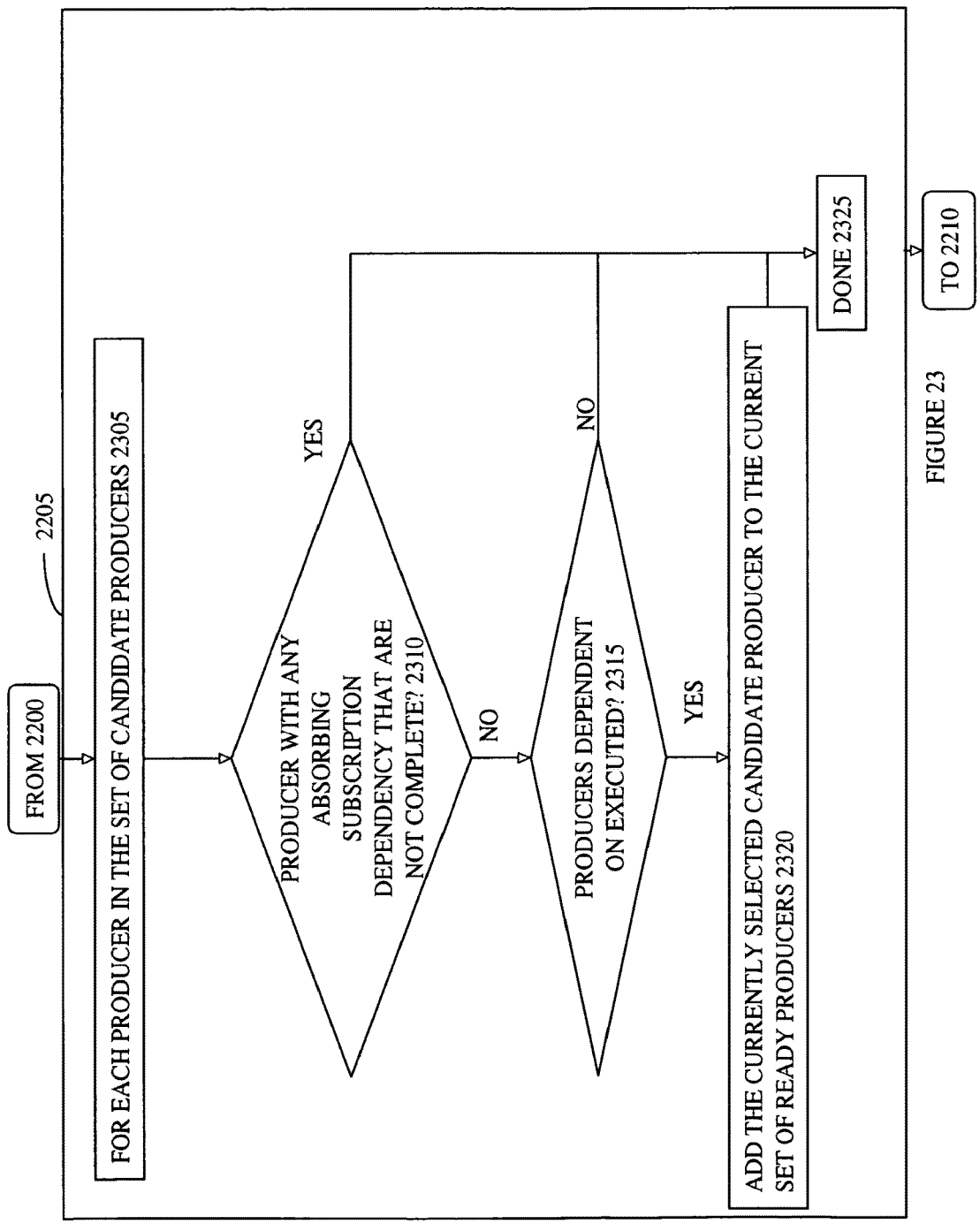
FIG. 23 is a flow diagram for block 2205 of FIG. 22 according to one embodiment of the invention.

FIG. 23 is a flow diagram for block 2205 of FIG. 22 according to one embodiment of the invention. Thus, control flows from block 2200 to block 2305 in block 2205. In block 2305, for each producer in the set of candidate producers, the following blocks 2310-2325 are performed.

In block 2310, it is determined if the producer has any absorbing subscription dependency that is incomplete. If so, control passes to block 2325; otherwise, control passes to block 2315. With reference to the embodiment of FIG. 14A, the subscriber's producer key column 1400 and subscription type column 1405 is scanned for a matching to the current selected producer and absorbing subscription type; and if a match is found, the completed column 1420 at the appropriate row is checked to determine the status of that absorbing subscription dependency.

In block 2315, it is determined if the producers on which the currently selected producer depends are executed. If not, control passes to block 2325; otherwise, control passes to block 2320. With regard to the embodiment of the invention shown in FIG. 11C, the incremental execution markings column 1180 for the rows of the child dependencies are checked to determined the execution status of the currently selected producer's children.

In block 2320, the currently selected candidate producer is added to the current set of ready producers and control passes to block 2325.

In block 2325, the flow ends for the current produced selected in block 2305.

FIG. 24 is a flow diagram for block 2225 of FIG. 22 according to one embodiment of the invention. Thus, control flows from block 2210 to block 2405 in block 2225. In block 2405, for each dependency determination producer, the following blocks 2410-2430 are performed.

In block 2410, the type of any previous dependencies generated by the currently selected dependency determination producer is determined. If the type of the dependency is non-subscription, then control passes to block 2420; if the type is absorbing subscription, then control passes to block 2415; whereas, if the type is sticky subscription, then control passes to block 2425. Block 2410 is determined by checking the current output of the producer stored in the producer output caching. With reference to the class DEP, the output would indicate non-subscription, absorbing subscription, and sticky subscription.

In both blocks 2415 and 2425, the entry is removed from the subscription log. With reference to the embodiment of the invention shown in FIGS. 14A-C, the following is performed: 1) for absorbing subscriptions (block 2415), the dependency determination producer (e.g., producer 1455) is used to determine its parent producer (e.g., producer 1450) in the producer graph(s), and then the parent producer is looked up in the subscription log and its entry removed; and 2) for sticky subscriptions (block 2425), the dependency determination producer (e.g., producer 1470) is looked up in the subscription log and its entry removed. From block 2415, control passes to block 2420; from block 2425, control passes to block 2420.

In block 2420, the links already created by the currently selected dependency determination producer are cleared from the producer graph(s) and control passes to block 2430. With reference to the embodiment of the invention shown in FIG. 11C, the following is performed. It is first determined if the dependency determination producer has "sticked" on an existing producer. This is done by scanning the dependency determination producer's child producer links column in FIG. 11C, and checking if one of the links has the sticky indicator indicating sticky.

If the dependency determination producer has not sticked on an existing producer, then: 1) for a dependency determination producer that has produced non-subscription downwardly declared dependencies (argument, field, or sequencing dependencies), the parent of the dependency determination producer is accessed in the producer graph through the parent producer reference(s) column 1150 at the row of the currently selected dependency determination producer, and in this parent producer entry, the child producer(s) link(s) column 1160 is accessed to match the dependency determination producer reference, and all references of child producers having that dependency determination producer reference are cleared; 2) for a dependency determination producer that has produced non-subscription upwardly declared dependencies, the parent of the dependency determination producer is accessed in the producer graph through the parent producer link(s) column 1150 at the row of the currently selected dependency determination producer, and in this parent producer entry, the parent producer link(s) column 1150 is accessed to match the dependency determination producer reference, and all references of parent producers having that dependency determination producer reference are cleared; 3) for a dependency determination producer that has produced an absorbing subscription, the same behavior as non-subscription downwardly declared dependencies is performed; and 4) for a dependency determination producer that has produced a sticky subscription, the dependency determination producer reference extracted from column 1421 of the subscription log 14A prior to the removal of the subscription is looked up in the producer graph(s) structure in the parent producer link(s) column 1150, and all references of parent producers having that dependency determination producer reference are cleared.

If the dependency determination producer has sticked on an existing producer, as a result of a non-subscription upwardly declared dependency or a sticky subscription, then the child producer that the dependency determination producer has sticked on is accessed (the child producer in column 1160 with a sticky indicator indicating sticky), and in this child producer entry, the parent producer link(s) column 1150 is accessed to match the dependency determination producer reference, and all references of parent producers having that dependency determination producer reference are cleared.

In block 2430, the flow ends for the dependency determination producer selected in block 2405.

FIG. 25 is a flow diagram for block 2260 of FIG. 22 according to one embodiment of the invention. Thus, control flows from block 2255 to block 2505 in block 2260. In block 2505, for each producer with an absorbing subscription dependency that is incomplete, the following blocks 2510-2525 are performed.

In block 2510, it is determined if all matching producers have been executed. If so, control passes to block 2515; otherwise, control passes to block 2525. With reference to the embodiments of FIGS. 11C and 14A, the matching producer's column 1415 at the appropriate row is accessed to determine the matching producers, and the incremental execution column 1180 at the appropriate rows is checked for each of the matching producers.

In block 2515, the absorbing subscription is marked as complete and control passes to block 2520. With reference to the embodiments of FIG. 14A, the complete column 1420 at the appropriate row is set to indicate complete.

In block 2520, the producer selected in block 2505 is added to the current set of candidate producers and control passes to block 2525.

In block 2525, the flow ends for the producer selected in block 2505.

Procedural Languages

As previously indicated, properly written procedural language, non-reflective object-oriented language, and non-reflective object-based language code may be transformed into reflective object-oriented language code. By way of example, a class may be emulated through a data structure and a set of static functions having as a first parameter a pointer to an instance of the data structure. Among these functions are the constructor and the destructor. The constructors are invoked by the runtime after allocation of a pointer to a data structure and provide defaults for elements in the data structure, and the destructors are invoked by the runtime before the release of a pointer to the data structure. Each class has its description through a file that includes: 1) the data structure; 2) another structure describing the class, holding the size of the structure and a set of pointers to functions; 3) a list of static functions, with their code (for non-reflective object-oriented languages and non-reflective object-based languages, the code of static functions would be generated automatically by scanning methods of the real class, and creating for each method a static function that performs the effective invocation of the related method); and 4) annotations on top of each function (comments hold producer dependency declarations), along with their type (constructor, destructor, property, etc.) In addition to this definition of a class in the procedural, non-reflective object-oriented, or non-reflective object-based language, dynamic invocation is also implemented. Specifically, a compiler generates the following initialization code for each class, code that is called once (by the new class module) to: 1) instantiate the structure describing the class, fill the pointers to functions with the effective static functions; 2) register the instance of this structure with a map of classes (the class tracking structure) with a key corresponding to the class name; and 3) register all pointers to functions in a map of functions (the method tracking structure) with a key corresponding to the function name (along with ArgumentDependencies, SequencingDependencies, FieldDependencies, UpwardDependencies, WeaklyConstrainedDependencies, output class key, and additional annotations). The mapping allows for implements in the runtime of generic invocation functions capable of: 1) instantiating an instance of a class by name (by the new instance module) (specifically, the runtime: a) allocates memory according to the size of the data structure, and adds a header to the pointer in order to store a pointer to the structure describing the class, and implements therefore smart pointers (e.g., pointers capable of querying their types); and b) invokes the proper constructor functions after retrieval of the relevant pointer to the static function from the map); and 2) invoking a method by name provided all parameters are passed properly after retrieval of the relevant pointer to the static function from the map. Passing properly parameters to functions identified by pointers to functions would be done through assembly language, pushing and popping elements on/from the stack for input and output parameters. The method described above assumes the existence of the notion of data structures and the existence of the notion of pointers to functions in the procedural, non-reflective object-oriented, or non-reflective object-based language.

Exemplary Object-Oriented Source Code Syntax

A. Client Code

In one embodiment of the invention, the client code takes on the following syntax (shown in header form:

```
ProducerKey
    New    (String ClassKey, InstanceKey InstanceKey,
    String MethodKey);
Runtime
    New              ()
    AddProducerOfInterest      (ProducerKey ProducerOfInterestKey);
    SetProducerOutput   (ProducerKey ProducerToOverrideKey, Object
        ProducerOutputInstance);
    Execute              ( );
```

ProducerKey and Runtime are classes, while New, AddProducerOfInterest, SetProducerOutput, and Execute are methods. AddProducerOfInterest causes invocation of the new producer command with the appropriate values for the producer of interest situation in Table 2. ProducerOutputInstance is an instance of the overridden producer output class. It is thus instantiated through the corresponding producer output class constructor.

B. Statements

1. Dependency Declaration Statement Syntax

```
argumentDependency = "Argument1Dependency;Argument2Dependency;
    ...";
fieldDependency = "FieldDependency1;FieldDependency2;...";
sequencingDependency =
    "SequencingDependency1;SequencingDependency2; ...";
upwardDependency = "UpwardDependency1;UpwardDependency2; ...";
weeklyConstrainedDependency =
    "WeeklyConstrainedDependency1;-
        WeeklyConstrainedDependency2;...";
unConstrainedDependency =
    "unConstrainedDependency1;unConstrainedDependency2;...";
```

2. Dependency Syntax

```
    a. fieldDependencyX, sequencingDependencyX,
        upwardDependencyX, weeklyConstrainedDependencyX,
        unConstrainedDependencyX syntax:
    #C:'ClassKey'::#I:'InstanceKey'::#M:'MethodKey'
    b. argumentXDependency syntax:
    ArgumentID::#C:'ClassKey'::#I:'InstanceKey'::#M:'MethodKey'
```

In one embodiment of the invention, the ArgumentID is omitted in the syntax, and the order in which the argumentDependencies have been declared represents the ArgumentID. The ArgumentID is thus added to enhance readability.

3. Shortcut and Non-Shortcut

The syntax is the same as for a non-shortcut, but usage of #S:: prior to the producer key indicates a shortcut.

```
    a. fieldDependencyX, sequencingDependencyX,
        upwardDependencyX, weeklyConstrainedDependencyX,
        unConstrainedDependencyX syntax:
    #S::#C:'ClassKey'::#I:'InstanceKey'::#M:'MethodKey'
    b. argumentXDependency syntax:
    ArgumentID::#S::#C:'ClassKey'::#I:'InstanceKey'::#M:'MethodKey'
```

In this case, the producer key indicated by the dependency is not a dependency determination producer. Other syntax implementations may assume that the shortcut is the default dependency for a certain dependency type (such as field), and omit the #S:: In that case a #DDP may be used to indicate the presence of a DDP.

4. Contingent and Non Contingent

As previously described, a <P> may be placed prior to a contingent element.

```
    a. Example of contingent class and method:
        1) fieldDependencyX, sequencingDependencyX, upwardDependencyX,
            weeklyConstrainedDependencyX, unConstrainedDependencyX syntax:
    #C:<P>'ClassDeterminationMethodKey'::#I:'InstanceKey'::#M:
        <P>'MethodDeterminationMethodKey'
        2) argumentXDependency syntax
    ArgumentID::#C:<P>'ClassDeterminationMethodKey'::#I:'InstanceKey'::#M:
        <P>'MethodDeterminationMethodKey'
    b. Example of contingent method
        1) fieldDependencyX, sequencingDependencyX, upwardDependencyX,
            weeklyConstrainedDependencyX, unConstrainedDependencyX syntax:
    #C:'ClassKey'::#I:'InstanceKey'::#M: <P>'MethodDeterminationMethodKey'
        2) argumentXDependency syntax:
    ArgumentID:: #C:'ClassKey'::#I:'InstanceKey'::#M:
        <P>'MethodDeterminationMethodKey'
    c. Example of contingent instance
        1) fieldDependencyX, sequencingDependencyX, upwardDependencyX,
            weeklyConstrainedDependencyX, unConstrainedDependencyX syntax:
    #C:'ClassKey'::#I: <P>'InstanceDeterminationMethodKey'::#M: 'MethodKey'
        2) argumentXDependency syntax
    ArgumentID::#C:'ClassKey'::#I: <P>'InstanceDeterminationMethodKey'::#M:
        'MethodKey'
```

5. Shorthand Technique

Elements such as class, instance, or method that are considered to be identical to the parent producer elements are omitted. This is typically the case for shortcut fields. The examples given hereunder combine the shorthand technique and a shortcut declaration (the shortcut is illustrated by a #S::)

```
a. Example where class and instance are omitted
    1) fieldDependencyX, sequencingDependencyX,
       upwardDependencyX, weeklyConstrainedDependencyX,
       unConstrainedDependencyX syntax:
#S::#M:'MethodKey'
    2) argumentXDependency syntax:
ArgumentID::#S:: #M:'MethodKey'
b. Example where class is omitted
    1) fieldDependencyX, sequencingDependencyX,
       upwardDependencyX, weeklyConstrainedDependencyX,
       unConstrainedDependencyX syntax:
#S:: #I:'InstanceKey'::#M:'MethodKey'
    2) argumentXDependency syntax:
ArgumentID::#S:: #I:'InstanceKey':: #M:'MethodKey'
```

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus for executing object-oriented code, said apparatus comprising:
a computer with:
a runtime, executed by a processor, including:
an automated producer graph generation module to receive a designation of a producer of interest, to instantiate the producer of interest if not yet instantiated, to add the producer of interest as part of a producer graph, and to automatically generate a remainder of the producer graph through iteratively parsing producer dependency declarations for the added producers to identify other producers that need to be added, instantiating any of the other producers that are not already instantiated, and adding them to the producer graph, wherein each of the producers is a runtime construct that identifies a respective combination of a particular instance of a class and one particular method of that class, wherein there is one of the producer dependency declarations for each of the methods identified by the producers to identify at run time execution relationships between the producers, and
a producer graph execution module to execute the producers in the producer graph in an order indicated by the producer graph, wherein execution of each of the producers in the producer graph results in the one particular method identified by that respective producer being executed on the particular instance identified by that producer.

2. The apparatus of claim 1, wherein said automated producer graph generation module may not initially be able to complete generation of the producer graph until some producers of the producer graph are executed, and wherein said producer graph execution module may invoke the automated producer graph generation module with needed producer outputs during execution of the producer graph to complete unresolved remainders of the producer graph.

3. The apparatus of claim 1, wherein the runtime supports at least one of said producer dependency declarations identifying at run time at least one producer to be executed before the execution of the producer that identifies the method of that producer dependency declaration.

4. The apparatus of claim 1, wherein said producer graph represents appropriate sequencing of execution as identified by the producer dependency declarations of the methods identified by the producers in the producer graph.

5. The apparatus of claim 1, wherein the runtime supports at least one of said producer dependency declarations for a given one of said methods identifying at run time at least one producer with an output that is a direct input to the given method.

6. The apparatus of claim 1, wherein the producer graph represents direct input to output dependencies of the producers on each other from the producer of interest to those of the producers that are end nodes of the producer graph.

7. The apparatus of claim 1, wherein the runtime further comprises:
an override producer output module to receive current modifications to the current output of one or more of the producers in a current version of the producer graph;
a producer graph structure, coupled to the automated producer graph generation module, to store the current version of the producer graph and the current output of each of the producers in the current version of the producer graph; and
said producer graph execution module, coupled to the override producer output module and the producer graph structure, to make the current modifications so as to form overridden outputs, to track which producers in the current version of the producer graph need to be executed because they are indirectly affected by any of the current modifications, and to execute only the producers of the current version of the producer graph that currently need to be reexecuted to maintain the consistency of the current version of the producer graph.

8. The apparatus of claim 7, wherein the producer graph structure further comprises:
an incremental execution marking structure to assist the producer graph execution module with tracking which producers in the current version of the producer graph need to be reexecuted due to any current modifications.

9. The apparatus of claim 7, further comprising:
an override log, coupled to the override producer output module and the producer graph execution module, to collect multiple of the current modifications to the current output of one or more of the producers in the current version of the producer graph for batch processing.

10. The apparatus of claim 7, wherein the override producer output module is also to receive indications that one or more overridden outputs are to be unoverridden.

11. The apparatus of claim 1, wherein the runtime further comprises:
a command log, coupled to the automated producer graph generation module, to collect multiple commands together for batch processing.

12. The apparatus of claim 1, wherein the producer dependency declarations are part of class definitions for the classes.

13. The apparatus of claim 1, wherein any method may have one of said producer dependency declarations.

14. The apparatus of claim 1, wherein the runtime replaces the need for manual invocation sequencing code, and wherein the method identified by each of the producers is a transformation method and the runtime discovers sequencing for these transformation methods from the producer dependency declarations.

15. The apparatus of claim 1, wherein end nodes of the producer graph are independent producers.

16. The apparatus of claim 1, wherein the runtime further comprises:
an instance tracking structure, coupled to the automated producer graph generation module and the producer graph execution module, to store references to the instances identified by the producers in the producer graph; and
a method tracking structure, coupled to the automated producer graph generation module and the producer graph execution module, to store references to the methods identified by the producers in the producer graph and information regarding their producer dependency declarations.

17. The apparatus of claim 16, wherein the runtime further comprises:
a new instance module, coupled to said instance tracking structure, to receive the designation of and to instantiate, if necessary, the currently designated producer of interest;
a class tracking structure to track references to the classes; and
a new class module, coupled to the class tracking structure, to load and introspect class definitions of the classes.

18. The apparatus of claim 1, wherein the runtime further comprises:
a producer graph viewer module to graphically display a representation of the producer graph.

19. The apparatus of claim 1, wherein the runtime further comprises:
a configurable interactive producer output layout graphical user interface module to graphically display outputs from and allow interaction with the producer graph.

20. The apparatus of claim 1, wherein the producer graph execution module includes:
a dynamic dependencies module to resolve dynamic producer dependencies, wherein each of the producer dependency declarations may include a dynamic producer dependency, wherein the dynamic producer dependencies cause the runtime to dynamically select producers the producer dependency declarations identify during run time, and wherein the dynamic selection can cause the selection of different producers during different executions of the producer graph.

21. The apparatus of claim 20, wherein the runtime is also to resolve dynamic producer dependencies that are contingent producer dependencies, wherein the contingent producer dependencies are dependencies on dependency determination producers that themselves are dependent on an output of one or more other of the producers.

22. The apparatus of claim 20, wherein the runtime is also to resolve dynamic producer dependencies that are subscriptions, wherein the subscriptions identify criteria by which the producers are compared to determine if they are trigger producers, wherein the subscriptions identify dependencies on the trigger producers.

23. The apparatus of claim 22, wherein said runtime supports absorbing subscriptions, wherein the absorbing subscriptions cause the runtime to dynamically include any of the trigger producers the producer dependency declaration identifies during run time.

24. The apparatus of claim 22, wherein said runtime supports sticky subscriptions, wherein the sticky subscriptions also identify characteristics for parent producers, and wherein the sticky subscriptions cause the runtime, for each of the trigger producers, to instantiate a parent producer meeting the identified characteristics and add it to the producer graph as having a producer dependency on that trigger producer.

25. The apparatus of claim 1, wherein the runtime supports at least some of the producers being dependency determination producers whose execution returns identifications of dependencies of one or more of the producers on one or more other of the producers.

26. The apparatus of claim 25, wherein the runtime supports execution of dependency determination producers returning upwardly declared dependencies.

27. The apparatus of claim 1, wherein the runtime supports at least some dependencies represented by the producer graph being designated as argument dependencies, and wherein the argument dependencies cause the runtime to map outputs of child producers in the producer graph as input parameters to parent producers in the producer graph.

28. The apparatus of claim 27, wherein the runtime supports at least some of the dependencies represented by the producer graph being designated as field dependencies, and wherein the field dependencies indicate uses of fields of instances.

29. The apparatus of claim 1, wherein the runtime supports at least some dependencies represented by the producer graph being designated as field dependencies, and wherein the field dependencies indicate uses of fields of instances.

30. The apparatus of claim 1, wherein the runtime supports at least some dependencies represented by the producer graph being designated as sequencing only dependencies.

* * * * *